(12) United States Patent
Bechhoefer

(10) Patent No.: US 8,380,447 B2
(45) Date of Patent: Feb. 19, 2013

(54) QUANTIFICATION OF CONDITION INDICATORS IN THE PRESENCE OF SYNCHRONOUS NOISE

(75) Inventor: Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 345 days.

(21) Appl. No.: 12/798,938

(22) Filed: Apr. 14, 2010

(65) Prior Publication Data

US 2011/0257901 A1    Oct. 20, 2011

(51) Int. Cl.
*G01B 3/44* (2006.01)
(52) U.S. Cl. ........................................ 702/34
(58) Field of Classification Search .................. 702/34, 702/35, 181, 185, 191, 195
See application file for complete search history.

(56) References Cited

U.S. PATENT DOCUMENTS

| | | | |
|---|---|---|---|
| 5,210,704 A * | 5/1993 | Husseiny | 702/34 |
| 6,651,012 B1 | 11/2003 | Bechhoefer | |
| 6,711,523 B2 | 3/2004 | Bechhoefer et al. | |
| 6,728,658 B1 | 4/2004 | Bechhoefer | |
| 6,754,569 B2 | 6/2004 | Bechhoefer | |
| 6,847,917 B2 | 1/2005 | Bechhoefer | |
| 7,136,794 B1 | 11/2006 | Bechhoefer | |
| 7,945,397 B2 * | 5/2011 | Kar | 702/34 |
| 2008/0255776 A1 * | 10/2008 | Beard | 702/35 |
| 2011/0125419 A1 * | 5/2011 | Bechhoefer et al. | 702/34 |

OTHER PUBLICATIONS

E. Bechhoefer et al., "Quantification of condition indicator performance on a split torque gearbox," J. Intell. Manuf., Springer, Nov. 13, 2009, 8 pp.
I. Y. Turner and E. M. Huff, "On the Effects of Production and Maintenance Variations on Machinery Performance," J. Quality in Maintenance Engineering, 2002, 11 pp.
T. Kailath, "The Innovations Approach to Detection and Estimation Theory," Proceedings of the IEEE, vol. 58, No. 5, May 1970, pp. 680-695.

* cited by examiner

*Primary Examiner* — Jonathan C Teixeira Moffat
*Assistant Examiner* — Xiuquin Sun
(74) *Attorney, Agent, or Firm* — Muirhead and Saturnelli, LLC

(57) ABSTRACT

Determining health of a component includes using at least one processor to perform processes including acquiring a plurality of measured values corresponding to the condition indicators. Synchronous noise components are removed from the measured values to provide revised measured values, and the revised measured values are used to determine noise-filtered condition indicator values. The noise-filtered condition indicator values may be used in algorithms to determine the health of the component. Removing synchronous noise components may include determining a predicted value thereof using covariance and autocovariance of the measured values. The component may be a split torque gearbox.

20 Claims, 28 Drawing Sheets

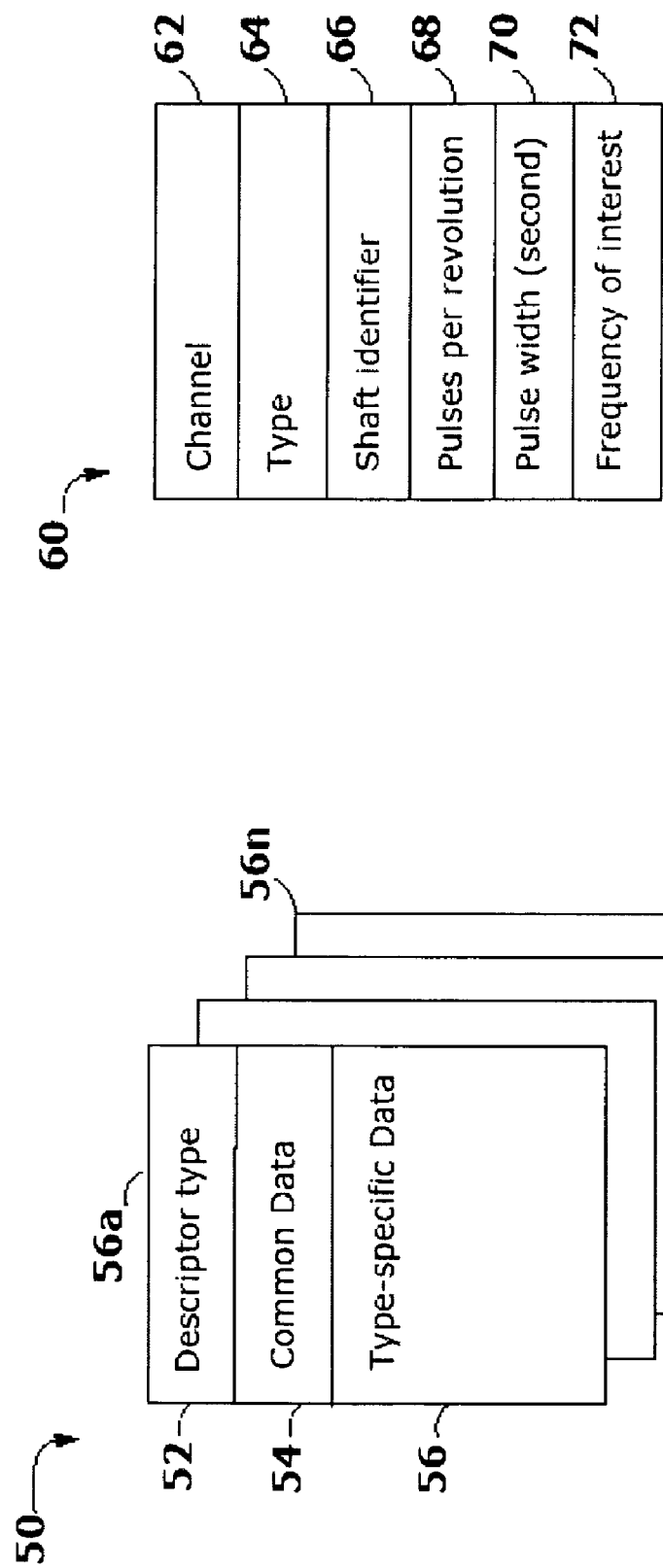

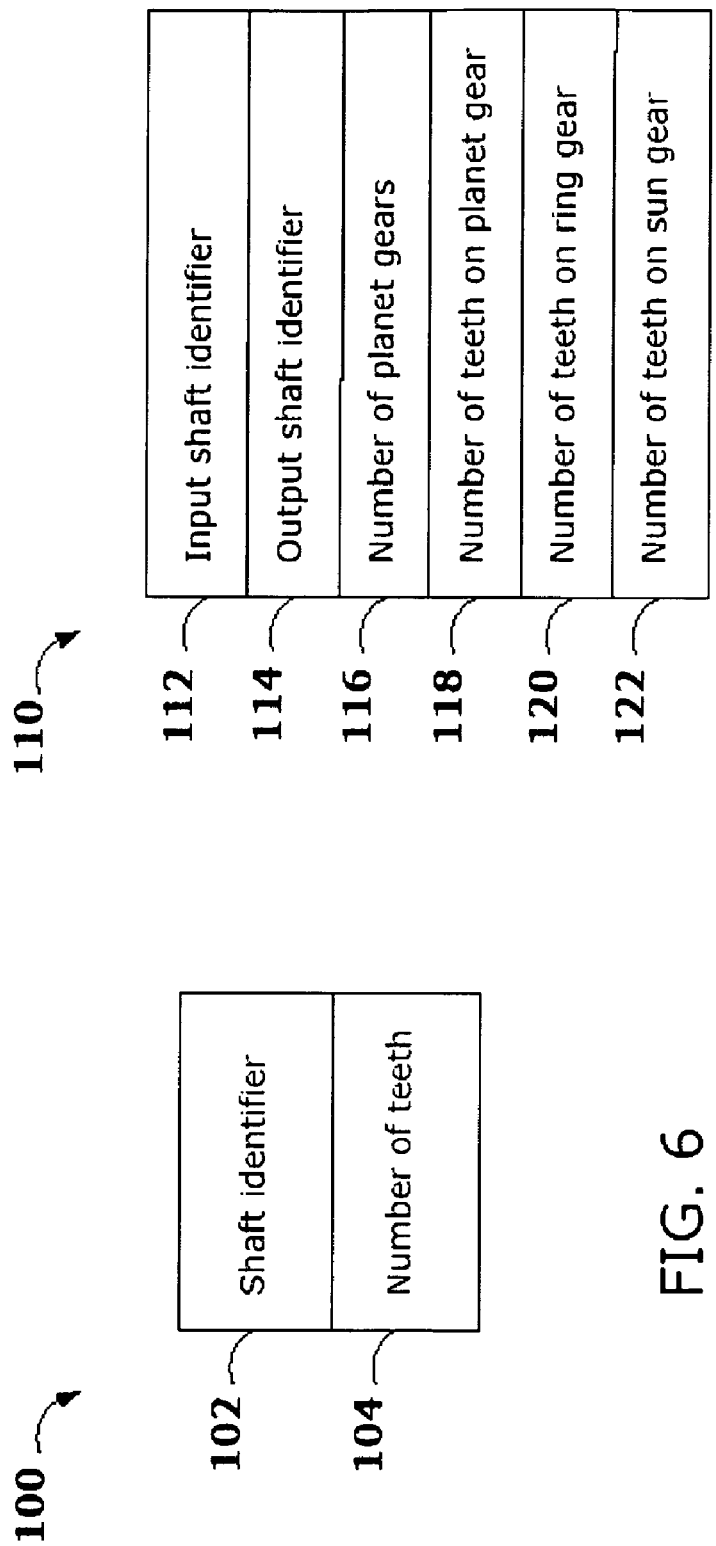

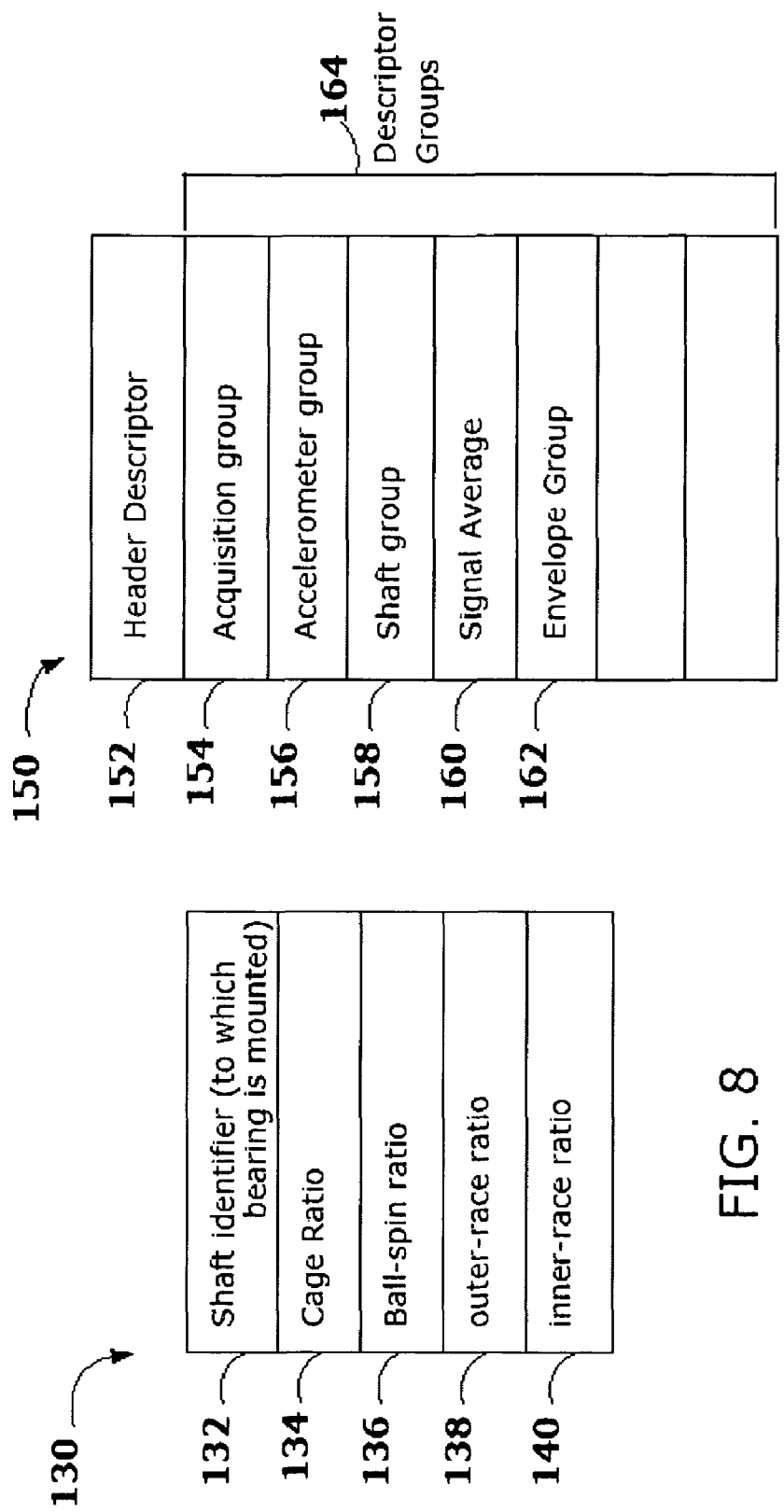

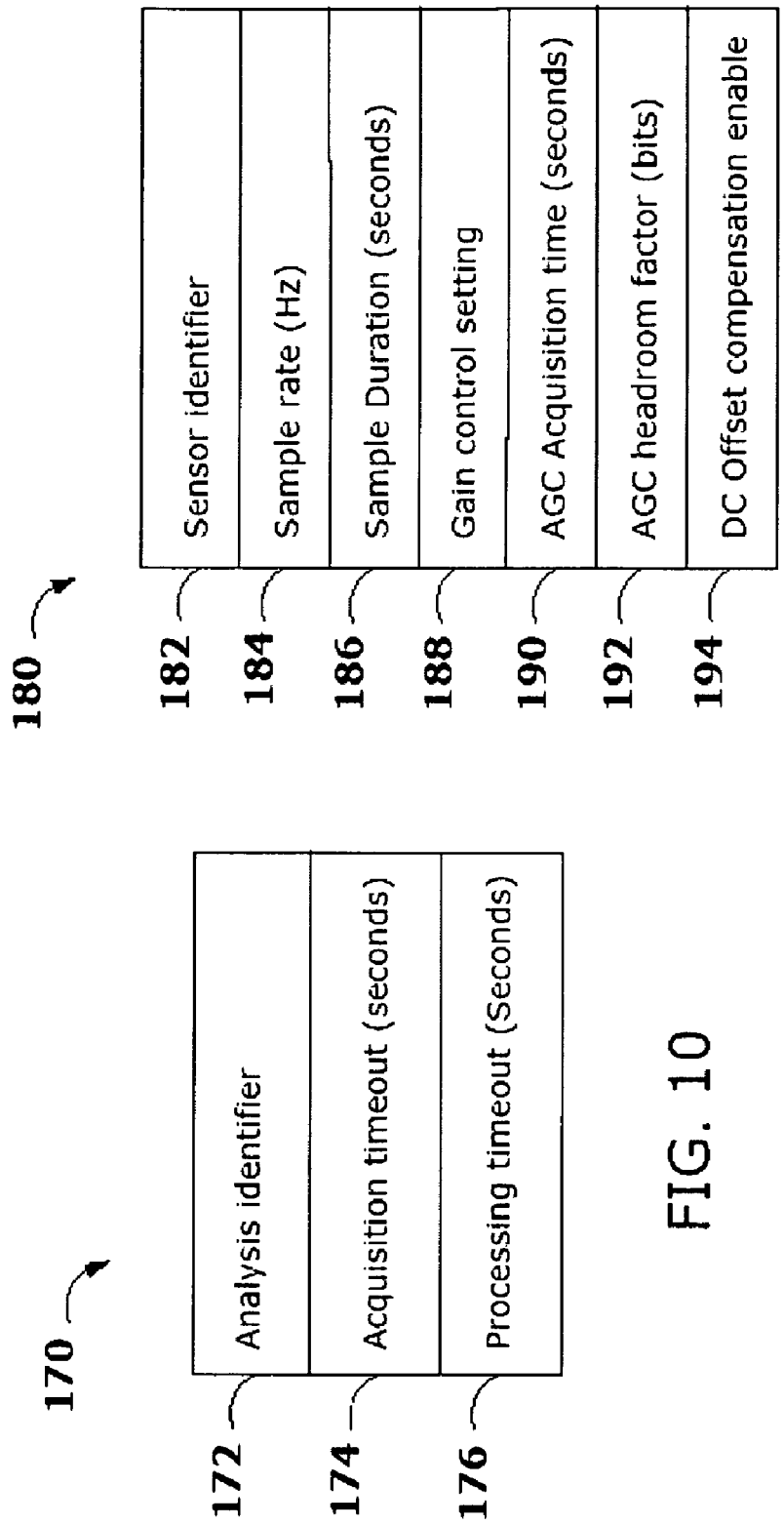

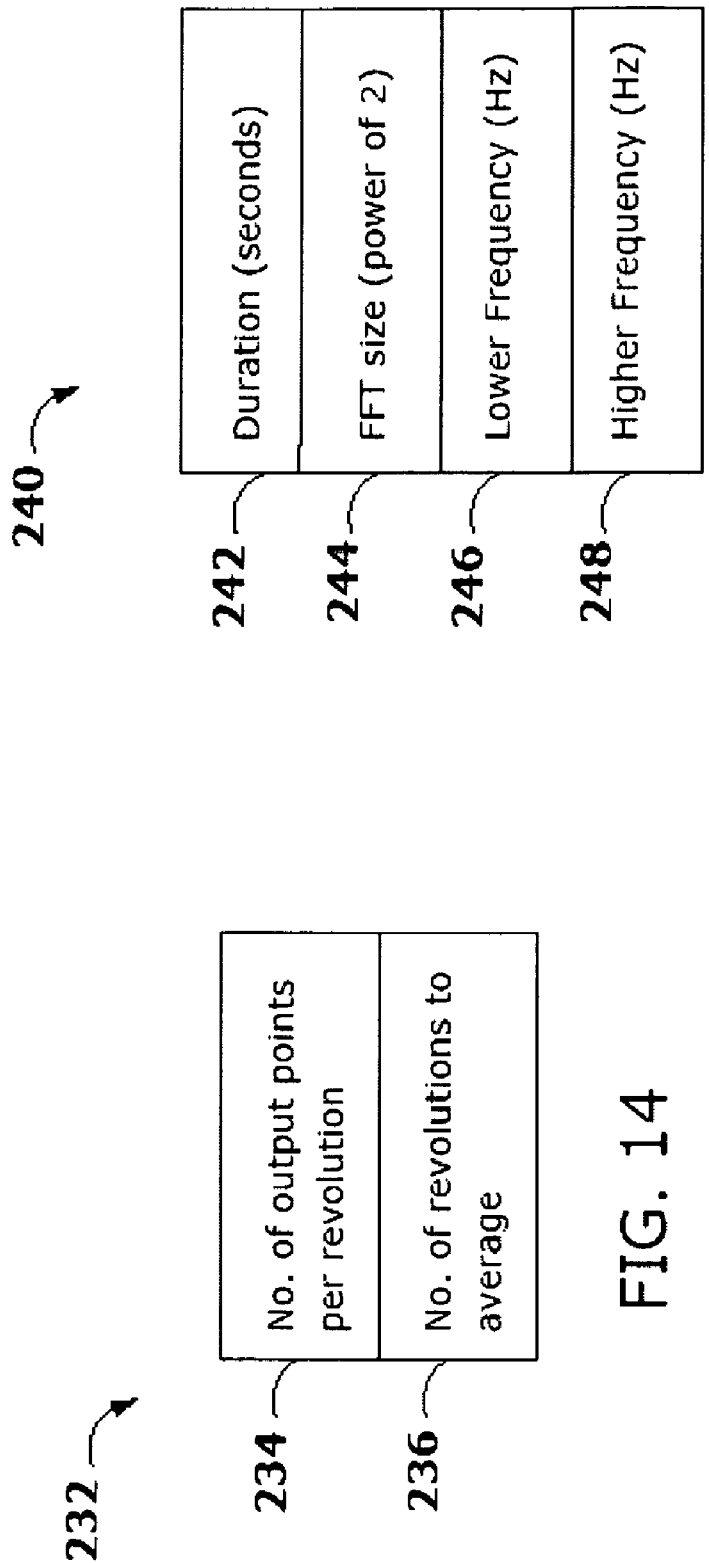

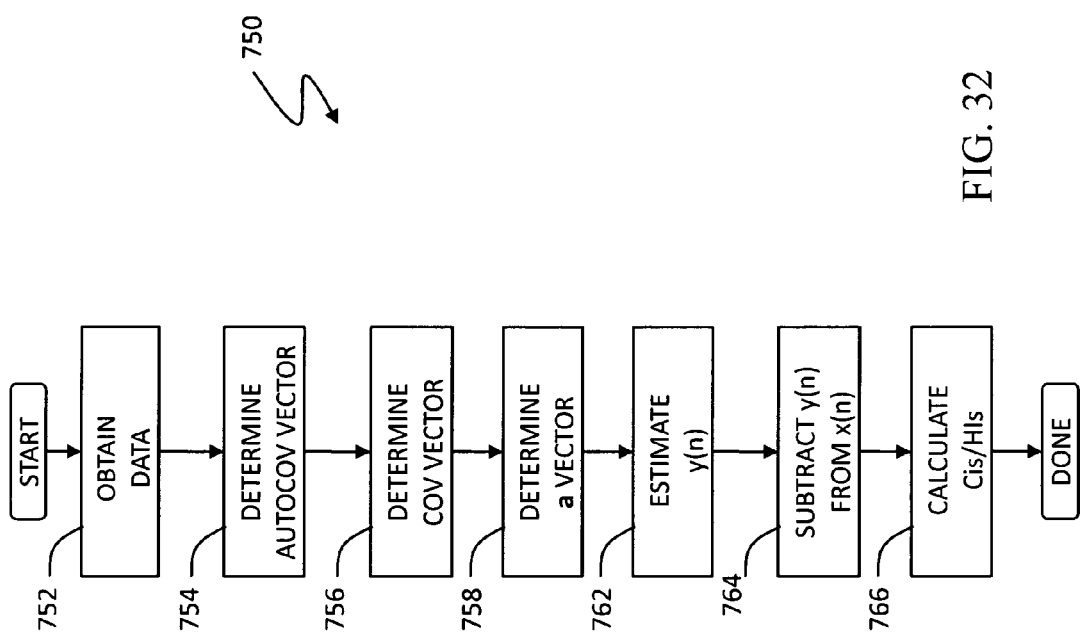

QUANTIFICATION OF CONDITION INDICATORS IN THE PRESENCE OF SYNCHRONOUS NOISE

BACKGROUND OF THE INVENTION

1. Field of the Invention

This application relates to the field of vibration analysis and more particularly to performing vibration analysis for the purpose of device monitoring.

2. Description of Related Art

The transmission of power to rotors which propel helicopters and other shafts that propel devices within the aircraft induce vibrations in the supporting structure. The vibrations occur at frequencies that correspond to the shaft rotation rate, mesh rate, bearing passing frequency, and harmonics thereof. The vibration is associated with transmission error (TE). Increased levels of TE are associated with transmission failure. Similar types of vibrations are produced by transmissions in fixed installations as well.

Parts, such as those that may be included in a helicopter transmission, may be replaced in accordance with a predetermined maintenance and parts replacement schedule. These schedules provide for replacement of parts prior to failure. The replacement schedules may indicate replacement time intervals that are too aggressive resulting in needless replacement of working parts. This may result in incurring unnecessary costs as airplane parts are expensive. Additionally, new equipment may have installed faulty or defective parts that may fail prematurely.

Furthermore, in some cases synchronous components, such as gears or bearings, may generate an exceptionally strong signal at the synchronous frequency and harmonics thereof. A number of these synchronous components that are physically close to a sensor may significantly reduce the fault signal (reduce signal to noise ratio) and therefore reduce the effectiveness of current analysis algorithms.

Thus it may be desirable to provide for an efficient technique for detecting part and device degradation without unnecessarily replacing parts even in instances where there are a number of synchronous components.

SUMMARY OF THE INVENTION

According to the system described herein, determining health of a component includes using at least one processor to perform processes including mapping a plurality of condition indicator functions for condition indicator values into a health indicator function for the health indicator value, determining a probability distribution function for the health indicator function based on the probability distribution functions for the condition indicator functions, acquiring a plurality of measured values corresponding to the condition indicator values, removing synchronous noise components from the measured values to provide revised measured values, and using the revised measured values to determine condition indicator values. Removing synchronous noise components may includes determining a predicted value thereof using covariance and autocovariance of the measured values. Determining health of a component may also include determining an autocovariance vector r where $r=x(n-D)\cdot x(n)$ and where x represents the measured data and D represents a delay, determining a covariance vector R where $R=x(n-D)\cdot x(n-D)$ and where x represents the measured data and D represents a delay, determining a vector a where $a=-r\cdot R^{-1}$ and where $R^{-1}$ is the inverse of R, estimating the synchronous noise using $a^t x(n-D)$, where $a^t$ represents the transpose of the a vector and D represents a delay, and removing the synchronous noise by subtracting $a^t x(n-D)$ from $x(n)$ to provide a residual signal that captures impulse signals indicative of component fault. D may be selected from the group consisting of one or two. The probability distribution function for the health indicator function may be determined mathematically. The condition indicator functions may be made independent by dividing each of the condition indicator functions by an inverse covariance thereof. The condition indicator functions may be Rayleigh or Gaussian distribution functions. The component may be a split torque gearbox or a planetary based gearbox. The probability distribution function for the health indicator function may have a Nakagami distribution. The condition indicator functions may be correlated.

According further to the system described herein, a computer readable storage medium stores software that determines health of a component, a plurality of condition indicator functions for condition indicator values being mapped into a health indicator function for the health indicator value. The software includes executable code that determines a probability distribution function for the health indicator function based on the probability distribution functions for the condition indicator functions, executable code that acquires a plurality of measured values corresponding to the condition indicator values, executable code that removes synchronous noise components from the measured values to provide revised measured values, and executable code that uses the revised measured values to determine condition indicator values. Executable code that removes synchronous noise components may include executable code that determines a predicted value thereof using covariance and autocovariance of the measured values. The software may also include executable code that determines an autocovariance vector r where $r=x(n-D)\cdot x(n)$ and where x represents the measured data and D represents a delay, executable code that determines a covariance vector R where $R=x(n-D)\cdot x(n-D)$ and where x represents the measured data and D represents a delay, executable code that determines a vector a where $a=-r\cdot R^{-1}$ and where $R^{-1}$ is the inverse of R, executable code that estimates the synchronous noise using $a^t x(n-D)$, where $a^t$ represents the transpose of the a vector and D represents a delay, and executable code that removes the synchronous noise by subtracting $a^t x(n-D)$ from $x(n)$ to provide a residual signal that captures impulse signals indicative of component fault. D may be selected from the group consisting of one or two. The probability distribution function for the health indicator function may be determined mathematically. The condition indicator functions may be made independent by dividing each of the condition indicator functions by an inverse covariance thereof. The condition indicator functions may be Rayleigh or Gaussian distribution functions. The component may be a split torque gearbox or a planetary based gearbox. The probability distribution function for the health indicator function may have a Nakagami distribution. The condition indicator functions may be correlated.

BRIEF DESCRIPTION OF DRAWINGS

Features and advantages of the present invention will become more apparent from the following detailed description of exemplary embodiments thereof taken in conjunction with the accompanying drawings in which:

FIG. 2 is an example representation of a data structure that includes aircraft mechanical data;

FIG. 3 is an example of parameters that may be included in the type-specific data portions when the descriptor type is an indexer;

FIG. 6 is an example of parameters that may be included in the type-specific data portions when the descriptor type is for a gear;

FIG. 7 is an example of parameters that may be included in the type-specific data portions when the descriptor type is a planetary type;

FIG. 8 is an example of parameters that may be included in the type-specific data portions when the descriptor type is bearing type;

FIG. 9 is an example of a data structure that includes analysis information;

FIG. 10 is a more detailed example of an embodiment of a header descriptor of FIG. 9;

FIG. 11 is an example of a descriptor that may be included in the acquisition descriptor group of FIG. 9;

FIG. 14 is an example of a descriptor that may be included in the signal average descriptor group of FIG. 9;

FIG. 15 is an example of a descriptor that may be included in the envelope descriptor group of FIG. 9;

FIG. 32 is a flow chart of steps of one embodiment for removing synchronous noise from measured values;

DETAILED DESCRIPTION OF VARIOUS EMBODIMENTS

Figure 1:
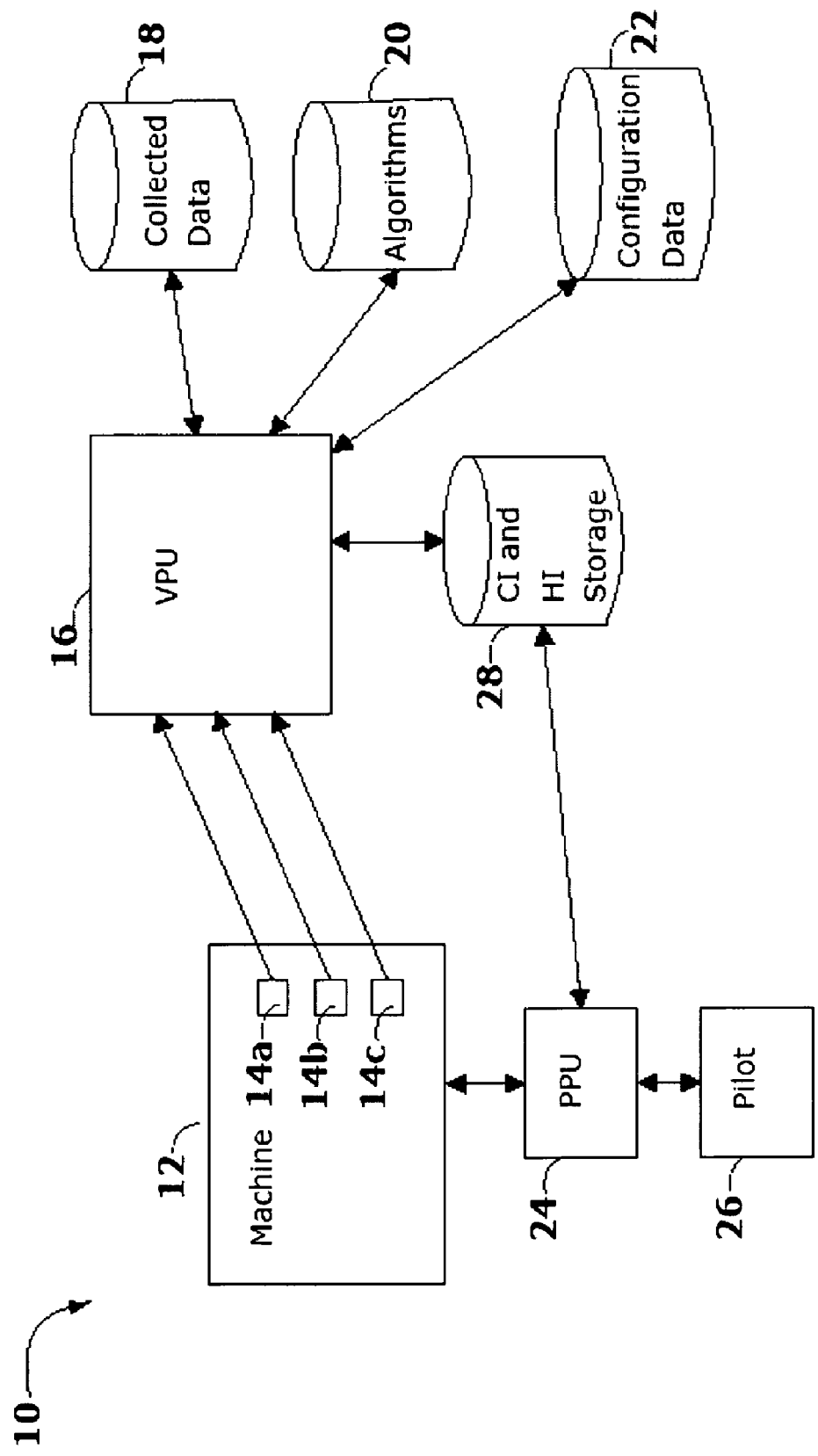
FIG. 1 is an example of an embodiment of a system that may be used in performing vibration analysis and performing associated monitoring functions.

Referring to FIG. 1, system 10 may be used in performing vibration analysis and monitoring of a machine such as a portion of an aircraft. The machine being monitored 12 may be a particular element within an aircraft. Sensors 14a through 14c are located on the machine to gather data from one or more components of the machine. Data may be collected by the sensors 14a through 14c and sent to a processor or a VPU16 for data gathering and analysis. The VPU16 analyzes and gathers the data from the Sensors 14a through 14c.

The VPU16 may also use other data in performing analysis. For example, the VPU16 may use collected data 18. One or more of the Algorithms 20 may be used as input into the VPU16 in connection with analyzing data such as may be gathered from the Sensors 14a through 14c. Additionally, configuration data 22 may be used by the VPU16 in connection with performing an analysis of the data received for example from the Sensors 14a through 14c. Generally, configuration data may include parameters and the like that may be stored in a configuration data file. Each of these will be described in more detail in paragraphs that follow.

The VPU16 may use as input the collected data 18, one or more of the algorithms 20, and configuration data 22 to determine one or more condition indicators or CIs. In turn, these condition indicators may be used in determining health indicators or HIs that may be stored for example in CI and HI storage 28. CIs describe aspects about a particular component that may be useful in making a determination about the state or health of a component as may be reflected in an HI depending on one or more CIs. Generally, as will be described in more detail in paragraphs that follow, CIs and HIs may be used in connection with different techniques in determining an indication about monitored components such as Machine 12. As described in more detail elsewhere herein, the configuration data may include values for parameters that may vary in accordance with the type of the component being monitored.

It should be noted that the collected data 18 may include data collected over a period of time from sensors such as 14a through 14c mounted on Machine 12. A user, such as a Pilot 26, may use a special service processor, such as the PPU24, connected to the Machine 12 to obtain different types of data such as the CI and HI values 28.

As described in connection with FIG. 1, the VPU16 may receive inputs from Sensors 14a through 14c. These sensors may be different types of data gathering monitoring equipment including, for example, high resolution accelerometers and index sensors (indexors) or tachometers that may be mounted on a component of Machine 12 at carefully selected locations throughout an aircraft. Data from these sensors may be sampled at high rates, for example, up to 100 kilohertz, in order for the VPU16 to produce the necessary CI and HI indicators. Data from these sensors and accelerometers may be acquired synchronously at precise intervals in measuring vibration and rotational speeds.

Generally, the different types of data gathering equipment such as 14a-14c may be sensors or tachometers and accelerometers. Accelerometers may provide instantaneous acceleration data along whatever axis on which they are mounted of a particular device. Accelerometers may be used in gathering vibration analysis data and accordingly may be positioned to optimally monitor vibration generated by one or more mechanical components such as gears, shafts, bearings or planetary systems. Each component being monitored may generally be monitored using two independent sensors to provide confirmation of component faults and to enable detection of sensor faults.

No accelerometer is completely isolated from any other component. Thus, the component rotational frequencies share as few common divisors as possible in order to maximize the effectiveness of the monitoring function being performed. For example, all gears being monitored should have differing number of teeth and all bearings should have differing numbers and sizes of balls or rollers. This may allow individual components to be spectrally isolated from each other to the extent that their rotational frequencies are unique.

The indexers (index sensors) or tachometers may also be used as a particular monitoring component 14a through 14c to gather data about a particular component of Machine 12. The indexers produce a periodic analog signal whose frequency is an integer multiple of the instantaneous rotation frequency of the shaft that they are monitoring. These signals may be generated magnetically using one or more evenly spaced metallic protrusions on the shaft passing by the fixed sensor. Alternatively, these may be monitored optically using a piece of optically reflective material affixed to the shaft. It should be noted that each index point should be fixed in time as precisely as possible. In connection with magnetic sensors, this may be accomplished for example by interpolating the zero crossing times of each index pulse and similarly for optical sensors by locating either rising or falling edges. Assuming the minimal play or strain in the drive train when something is under load, the relative position and rate of any component may be calculated using a single index or wave form.

Because of the high data rates and lengthy processing intervals, diagnostics may be performed, for example, on pilot command or on a predetermined flight regime or time interval.

Each of the algorithms 20 produces one or more CIs described elsewhere herein in more detail. Generally, the CI may yield useful information about the health of a monitored component. This condition indicator or CI as well as HI may be used in determining or predicting faults of different components.

It should be noted that the VPU16 is intended to be used in a wide variety of mechanical and electrical environments. As described herein, different components of an aircraft may be monitored. However, this is only one example of a type of environment in which the system described herein may be used. As known to those skilled in the art, the general principles and techniques described herein have much broader and general applicability beyond a specific aircraft environment that may used in an example here.

In connection with the use of CIs, the VPU16 uses the CIs as input and portions of the data such as, for example, used in connection with an algorithm to provide HIs. These are described in more detail in paragraphs that follow.

It should be noted that in a particular embodiment, each mechanical part being monitored may have one or more sensors associated with it where a sensor may include for example an accelerometer or a tachometer. Generally, accelerometers may be used, for example, to obtain data regarding vibrations and a tachometer may be used, for example, to gain information and data regarding rotation or speed of a particular object. Data may be obtained and converted from the time to the frequency domain.

A particular algorithm may provide one or more CIs. Each of the algorithms may produce or be associated with a particular CI. One or more CIs may be used in combination with a function to produce an HI for a particular part or type. As will be described in more detail herein, each of the algorithms may be associated or classified with a particular part or type. The CI generally measures vibrations and applies a function as described in accordance for each algorithm. Generally, vibration is a function of the rotational frequency in the amount of torque. Using torque and a particular frequency, a CI is appropriately determined in accordance with a selected algorithm for a part.

The algorithms 20 may be classified into four families or groups in accordance with the different types of parts. In this example, the families of algorithms may include shaft, gears, bearings, and planetary gears. Associated with each particular part being monitored may be a number of CIs. Each CI may be the result or output of applying a different one of the algorithms for a particular family. For example, in one embodiment, each gear may have an associated 27 CIs, each bearing may have 19 CIs, each shaft may have 22 CIs, and each planetary gear may have two or three CIs. It should be noted that each one of these numbers represents in this example a maximum number of CIs that may be used or associated with a particular type in accordance with the number of algorithms associated with a particular class or family. Generally, the different number of CIs that may be associated with a particular type such as a gear try to take into account the many different ways in which a particular gear may fail. Thus, a CI reflects a particular aspect or characteristic about a gear with regard to how it may fail. Different techniques used in computing CIs are described, for example, in "Introduction to Machinery Analysis and Monitoring, Second Edition", 1993, Penn Well Publishing Company of Tulsa, Okla., ISBN 0-87814-401-3, and "Machinery Vibration: measurement and analysis", 1991, McGraw-Hill Publishing, ISBN-0-07-071936-5.

For further discussion of determining CIs and HIs, and uses thereof in determining and predicting the health of a component in vibration-based diagnostic systems, see U.S. Pat. No. 6,651,012 to Bechhoefer, entitled "Method and Apparatus for Trending and Predicting the Health of a Component," U.S. Pat. No. 6,711,523 to Bechhoefer, entitled "Method and Apparatus for Determining a Condition Indicator for Use in Evaluating the Health of a Component," U.S. Pat. No. 6,728,658 to Bechhoefer, entitled "Method and Apparatus for Determining the Health of a Component Using Condition Indicators," U.S. Pat. No. 6,754,569 to Bechhoefer, entitled "Method and Apparatus for Normalizing Condition Indicators," U.S. Pat. No. 6,847,917 to Bechhoefer, entitled "Method and Apparatus for Selecting Condition Indicators in Determining the Health of a Component," and U.S. Pat. No. 7,136,794 to Bechhoefer, entitled "Method and Apparatus for Estimating Values for Condition Indicators," which are all hereby incorporated by reference.

Referring to FIG. 2, a data structure 50 is shown that includes aircraft mechanical data provided by one or more descriptors 56a-56n. In this embodiment there may be one descriptor for each sensor. A descriptor associated with a particular sensor includes the parameters relevant to the particular component being monitored. Each of the descriptors such as 56a includes three portions of data. The field 52 identifies a particular type of descriptor. Each of the descriptors also includes a common data portion 54 which includes data fields common to all descriptor types. Also included is a type specific data portion 56 which includes different data fields, for example, that may vary in accordance with the descriptor type 52.

Descriptor types may include, for example, an indexer, an accelerometer, a shaft, a gear, a planetary gear, or a bearing descriptor type value corresponding to each of the different types of descriptors. The common data portion 54 may include, for example, a name, part number and identifier. In this example, the identifier in the common data field 54 may uniquely identify the component and type.

Referring now to FIGS. 3 through 8, what will be described are examples of descriptor type specific parameters or information that may be included in a descriptor of a particular type, such as in area 56 of the data structure 50.

Referring now to FIG. 3, shown is an example of parameters that may be included in a descriptor 60 which is an indexer descriptor type. The parameters that may be included are a channel 62, a type 64, a shaft identifier 66, a pulses per revolution parameter 68, a pulse width parameter 70, and a frequency of interest 72 for this particular type of descriptor. It should be noted that the type in this example for the index or descriptor may be one of sinusoidal, pulse such as 1/rev, or optical. The shaft identifier 66 is that as may be read or viewed by the indexer that calculates the shaft rate. The pulse width 70 is in seconds as the unit value. Additionally, the frequency of interest 72 for this descriptor type is a nominal pulse frequency that is used in computing the data quality signal to noise ratio. The use of these particular data structures and parameters is described in more detail in paragraphs that follow.

Figure 4:
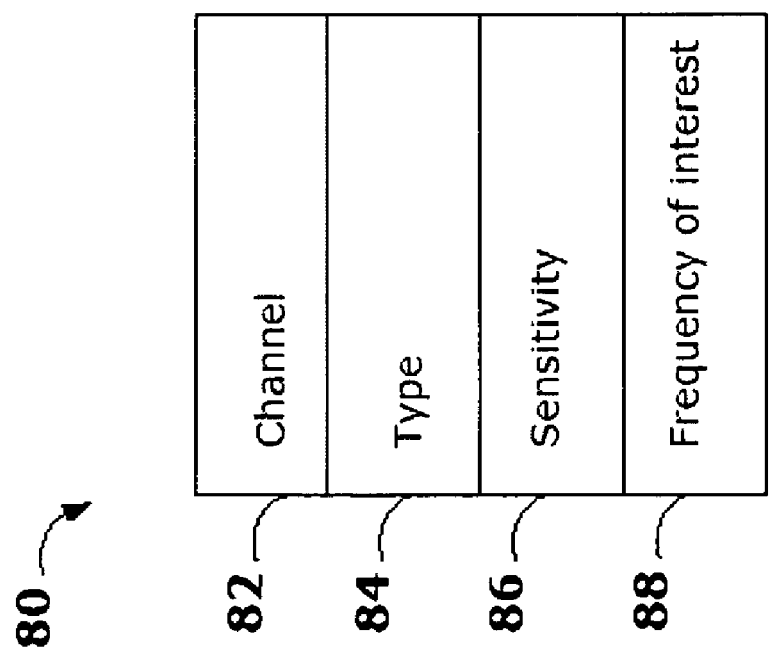
FIG. 4 is an example of parameters that may be included in the type-specific data portions when the descriptor type is an accelerometer.

Referring now to FIG. 4, shown is an example of the parameters that may be included in an accelerometer descriptor type 80. The descriptor for an accelerometer type may include the channel 82, a type 84, a sensitivity 86 and a frequency of interest 88. In this example for the accelerometer descriptor type, the type may be one of normal, or remote charge coupled. The frequency of interest may be used in computing the data quality signal to noise ratio. The frequency of interest for a gear is the mesh rate which may be calculated from the gear shaft rate and the number of teeth of the gear.

Figure 5:
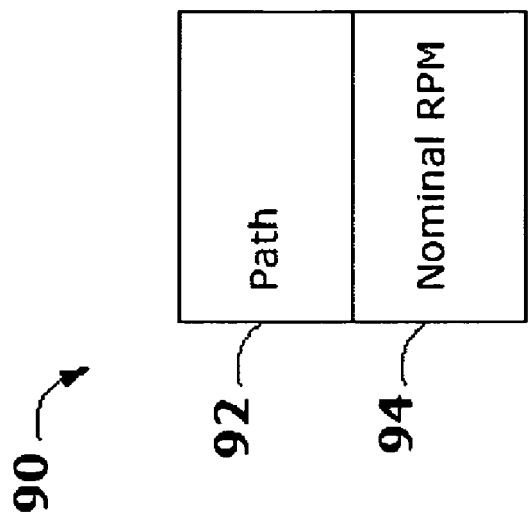
FIG. 5 is an example of parameters that may be included in the type-specific data portions when the descriptor type is a shaft.

Referring now to FIG. 5, shown is an example of descriptor type specific parameters or data that may be included when a descriptor type is the shaft descriptor. A shaft descriptor 90 includes path parameter or data 92 and nominal RPM data 94. The path data is an even length sequence of gear tooth counts in the mechanical path between the shaft in question and a reference shaft. The driving gears alternate with driven gears such that the expected frequency of a gear, shaft, bearing and the like may be determined based on an input shaft RPM.

Referring now to FIG. 6, shown is an example of data or parameters that may be included in a descriptor when the descriptor type is the gear descriptor. Included in the gear descriptor 100 is the shaft identifier 102 to which the gear is mounted and a parameter 104 indicating the number of teeth in the gear.

Referring now to FIG. 7, shown is an example of an embodiment of a planetary descriptor 110 identifying those parameters or data that may be included when the type is a planetary descriptor type. The planetary descriptor 110 may include an input shaft identifier 112, an output shaft identifier 114, a parameter indicating the number of planet gears 116, a parameter indicating the number of teeth on the planet gear, a parameter 120 indicating the number of teeth on the ring gear, and a parameter 122 indicating the number of teeth on the sun gear. It should be noted that the number of teeth on a planet gear relates to a planet carrier that is assumed to be mounted to the output shaft. Additionally, the ring gear is described by parameter 120 is assumed to be stationery and the sun gear 122 as related to parameter 122 is assumed to be mounted to the input shaft. It should be noted that the path between the input and the output shaft may be reduced to using a value S for the driving path tooth count and R+S as the driven path tooth count where R and S are the ring and sun tooth counts respectively. An example of a planetary type gear is described in more detail elsewhere herein.

Referring now to FIG. 8, shown is an example of a bearing descriptor 130. The bearing descriptor 130 may include descriptor type specific fields including a shaft identifier 132, a cage ratio 134, a ball spin ratio 136, an outer race ratio 138 and an inner race ratio 140. An example of a bearing is described in more detail elsewhere herein.

It should be noted that the data structures described in connection with FIGS. 2 through 8 are those that may be used in storing data obtained and gathered by a sensor such as 14a when monitoring a particular component of a machine 12. Data may be gathered and stored in the data structure for a particular descriptor or descriptors and sent to the VPU 16 for processing. It should be noted that a particular set of data may be gathered at a particular instance and time, for example, in connection with the synchronous data gathering described elsewhere herein. In connection with this, a data set may include multiple descriptors from sampling data at a particular point in time which is sent to the VPU 16.

What will now be described are those data structures that may be associated with an analysis definition that consists of a specific data acquisition and a subsequent processing of this data to produce a set of indicators for each of the desired components.

Referring now to FIG. 9, shown is an example of the data structure 150 that contains analysis data. Each instance of analysis data 150 as represented in the data structure includes a header descriptor 152 and descriptor groups noted as 164. In this example there are five descriptor groups although the particular number may vary in an embodiment. Each of the descriptor groups 154 through 162 as identified by the group identifier 164 includes one or more descriptors associated with a particular group type. For example, descriptor group 154 is the acquisition group that includes a descriptor for each sensor to be acquired. The accelerometer group 156 consists of a descriptor for each accelerometer to be processed. The shaft group 158 includes a descriptor for each shaft to be processed. The signal average group 160 includes a descriptor for each unique parameter set. The envelope group 162 includes a descriptor for each unique parameter.

Referring now to FIG. 10, shown is a more detailed example of a header descriptor 170. Parameters that may be included in a header descriptor 170 include: an analysis identifier 172, acquisition time out parameter 174 and processing time out parameter 176. In this example, the acquisition, time out and processing time out parameters are in seconds.

Referring now to FIG. 11, shown is an example of a descriptor that may be included in the acquisition group. A descriptor 180 included in the acquisition group may include a sensor identifier 182, a sample rate parameter in Hz 184, a sample duration in seconds 186, a gain control setting, such as "auto" or "fixed" 188, an automatic gain control (AGC) acquisition time in seconds 190, an automatic gain control (AGC) headroom factor as a number of bits 192 and a DC offset compensation enable 194.

Figure 12:
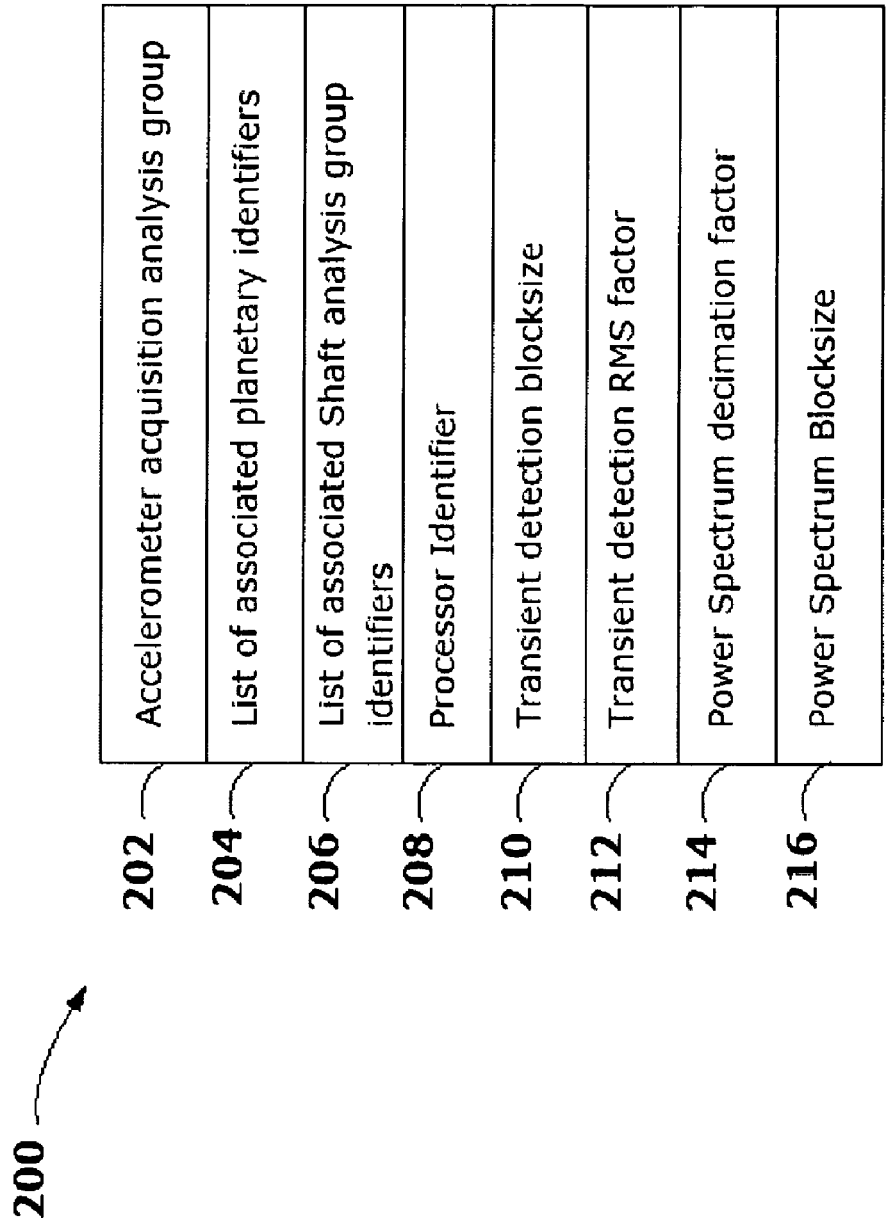
FIG. 12 is an example of a descriptor that may be included in the accelerometer group of FIG. 9.

Referring now to FIG. 12, shown is an example of a descriptor 200 that may be included in the accelerometer group. A descriptor in the accelerometer group may include a parameter that is an accelerometer acquisition analysis group identifier 202, a list of associated planetary identifiers to be processed 204, a list of associated shaft analysis group identifiers to be processed 206, a processor identifier 208, a transient detection block size 210, a transient detection RMS factor 212, a power spectrum decimation factor 214 specified as a power of 2 and a power spectrum block size also specified as a power of 2.

In one embodiment, the list of associated planetary identifiers 204 also includes two signal average analysis group identifiers for each planetary identifier, first identifier corresponding to the input shaft and a second corresponding to an output shaft.

It should be noted that the processor identifier 208 will be used in connection with assigning processing to a particular DSP or digital signal processor.

Figure 13:
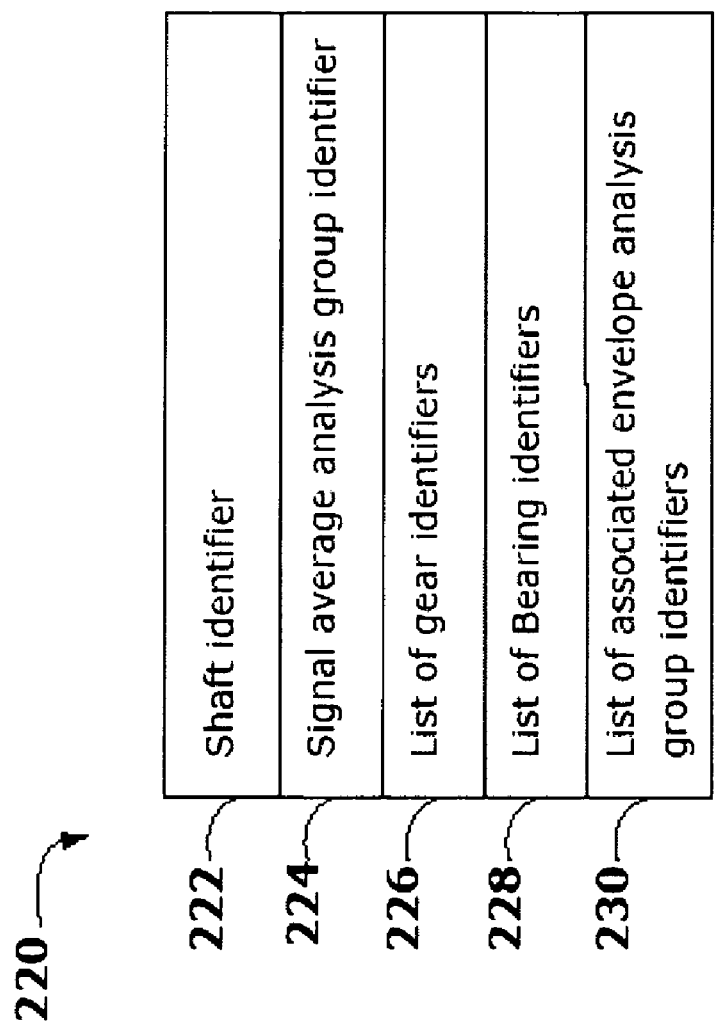
FIG. 13 is an example of a descriptor that may be included in the shaft descriptor group of FIG. 9.

Referring now to FIG. 13, shown is an example of an embodiment of a descriptor 220 that may be included in the shaft group. The descriptor 220 may include a shaft identifier 222, a signal average analysis group identifier 224, a list of gear identifiers to be processed 226, a list of bearing identifiers to be processed 228 and a list of associated envelope analysis group identifiers 230.

Referring now to FIG. 14, shown is an example of a descriptor 232 that may be included in the signal average group. It should be noted that the signal average group includes a descriptor for each unique parameter set. The signal average processing group is run for each accelerometer and shaft combination even if it has the same parameters as another combination. Each descriptor 232 may include a number of output points per revolution 234 and a number of revolutions to average 236.

Referring now to FIG. 15, shown is an example of a descriptor 240 that may included in the envelope group. It should be noted that the envelope group includes a descriptor for each unique parameter. It is not necessary to repeat an envelope processing for each bearing if the parameters are the same. Each descriptor 240 may include a duration parameter 242 specifying the seconds of raw data to process, an FFT size 244 which is a power of 2, a lower bound frequency in Hz 246, and an upper bound frequency, also in, Hz 248.

Figure 16:
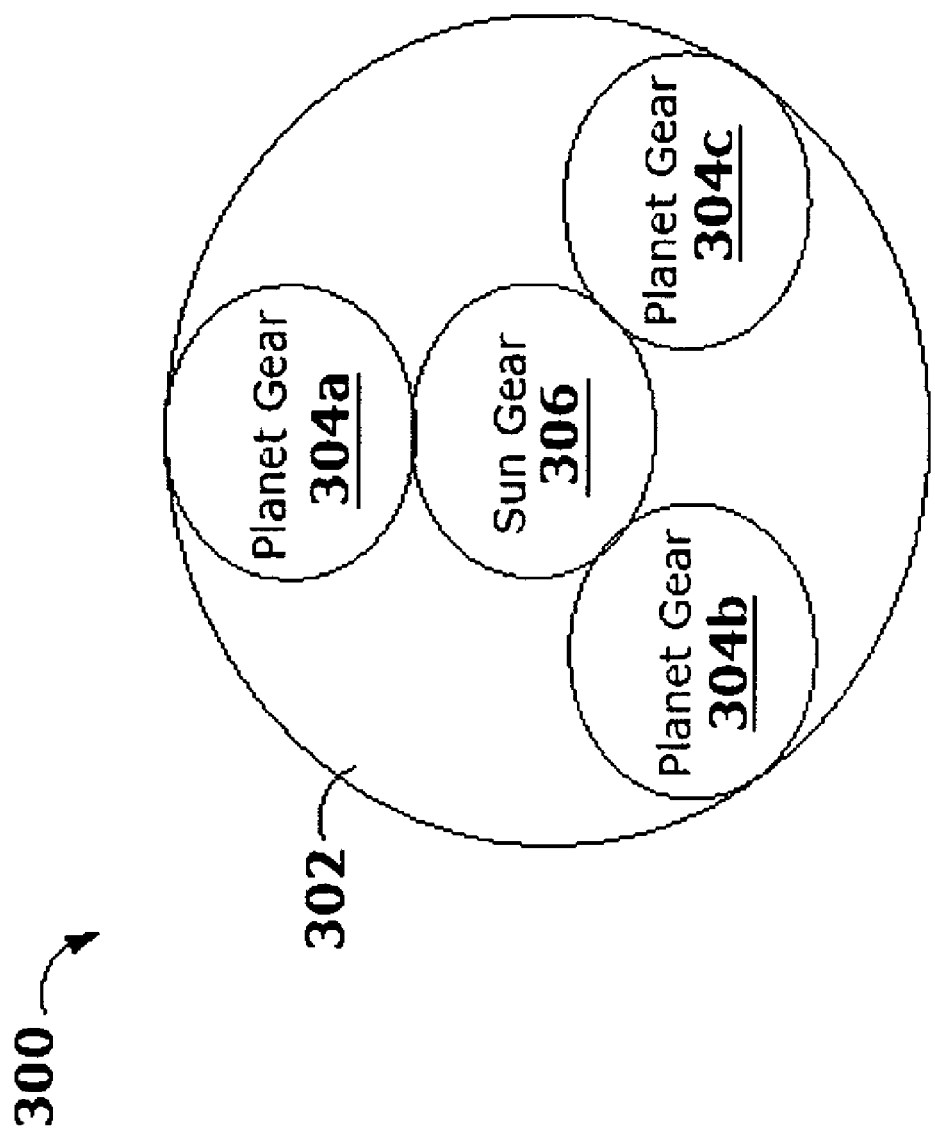
FIG. 16 is an example of a planetary gear arrangement.

Referring now to FIG. 16, shown is an example of an embodiment 300 of a planetary gear arrangement. Generally, a planetary gear arrangement as described in connection with the different types of gears and items to be monitored by the system 10 of FIG. 1 may include a plurality of gears as configured, for example, in the embodiment 300. Included in the arrangement 300 is a ring gear 302 a plurality of planet gears 304a through 304c and of sun gear 306. Generally, the gears that are designated as planets move around the sun gear similar to that as a solar system, hence the name of planet gear versus sun gear. The arrangement shown in FIG. 16 is a downward view representing the different types of gears included in an arrangement 300.

Figures 17A, 17B:
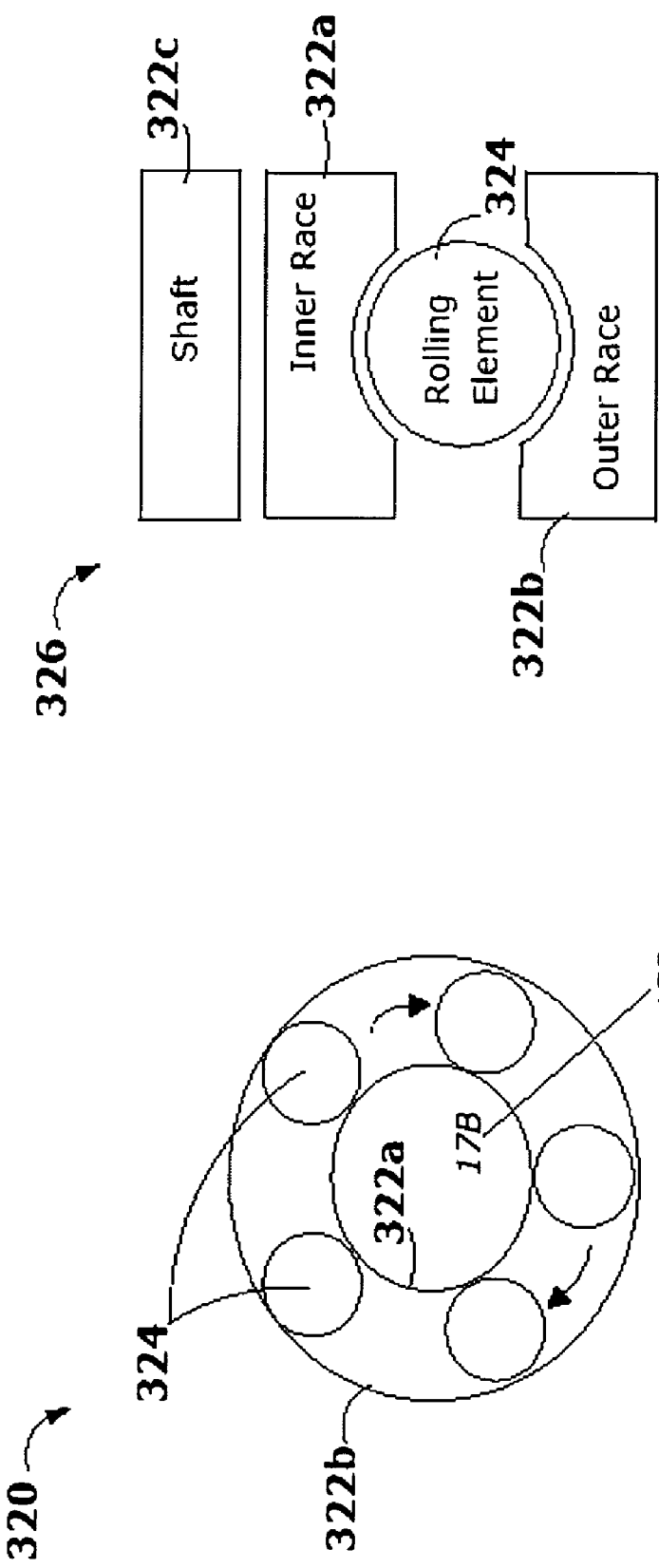
FIG. 17A is an example of an embodiment of a bearing.
FIG. 17B is an example of a cut along a line of FIG. 17A.

Referring now to FIG. 17A, shown is an example of an embodiment 320 of a bearing. The bearing 320 includes a ring or track having one or more spherical or cylindrical elements (rolling elements) 324 moving in the direction of circular rotation as indicated by the arrows. Different characteristics about such a structure of a bearing may be important as described in connection with this embodiment. One characteristic is an "inner race" which represents the circumference of circle 322a of the inner portion of the ring. Similarly, the "outer race" or circumference 322b representing the outer portion of the ring may be a consideration in connection with a bearing.

Referring now to FIG. 17B, shown is an example of a cut along line 17B of FIG. 17A. Generally, this is cut through the ring or track within which a bearing or bearings 324 rotate in a circular direction. The ball bearings move in unison with respect to the shaft within a cage that follows a track as well as rotate around each of their own axis.

Figure 18A:
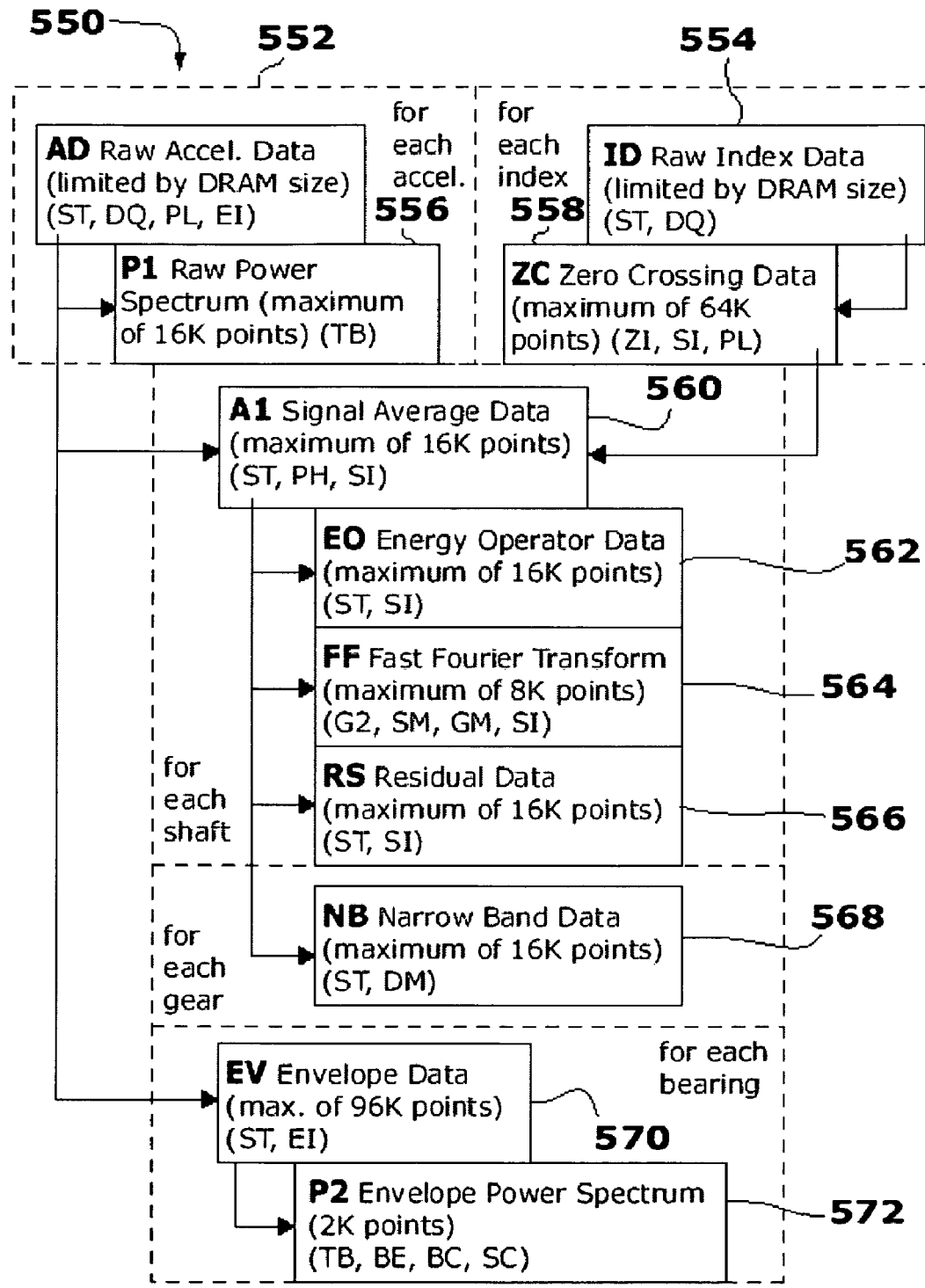
FIG. 18A is an example of a representation of data flow in vector transformations.

Referring now to FIG. 18A, shown is an example of a representation 550 of different transformations that may be performed and the associated data flow and dependencies for each particular sensor. The output of the transformations are transformation vectors and may be used in addition to analysis data or raw data, such as bearing frequency, mesh frequency, and the like, by an algorithm in producing a CI.

Referring to the representation 550, an in going arrow represents data flow input to a transformation. For example, the FF or Fast Fourier transform takes as an input data from the A1 signal average data transform. A1 has as input the accelerometer data AD. It should be noted that other embodiments may produce different vectors and organize data inputs/outputs and intermediate calculations in a variety of different ways as known to those skilled in the art.

Figure 18B:
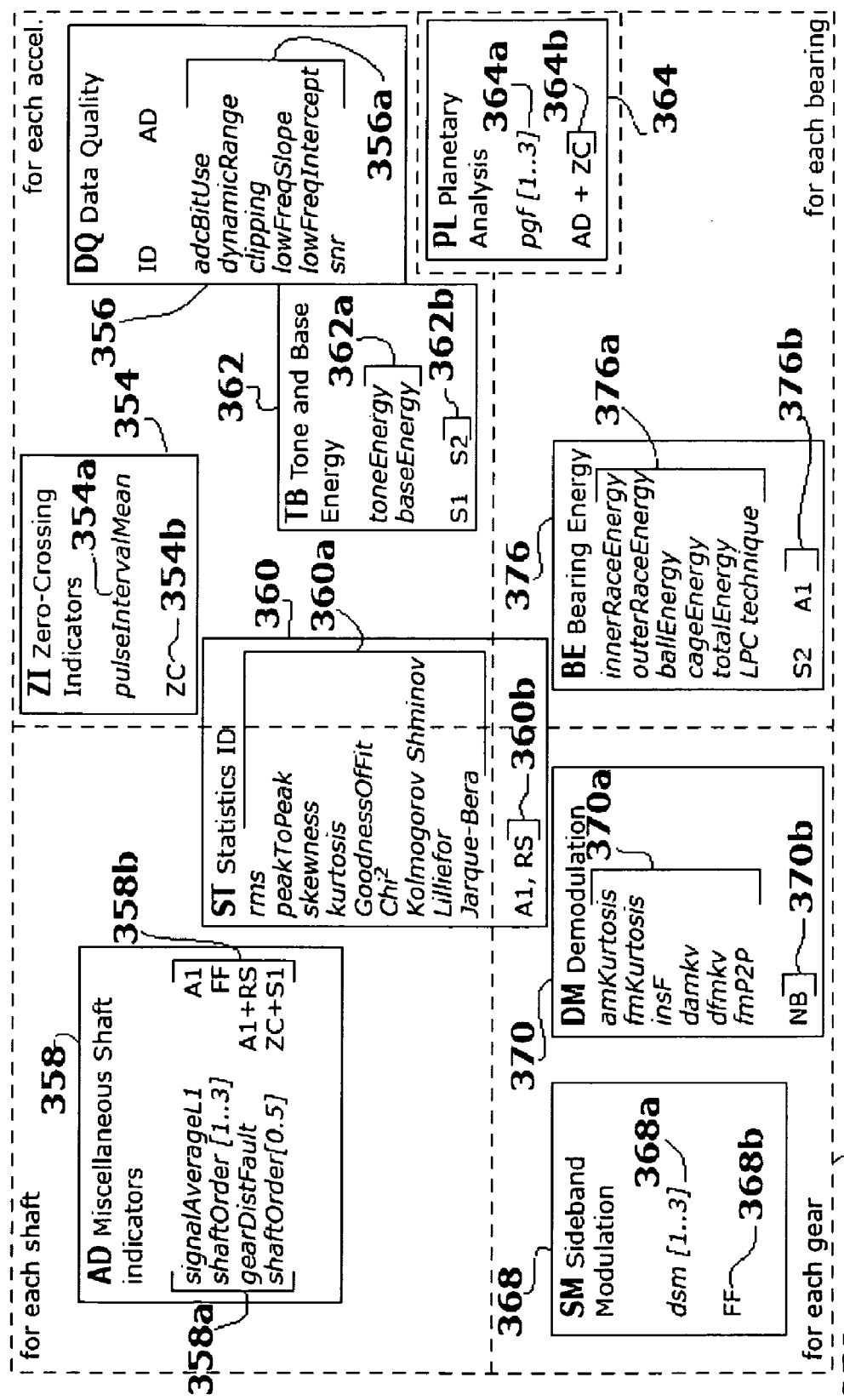
FIG. 18B is an example of a representation of some of the condition indictor (CI) algorithms that may be included in an embodiment, and some of the various inputs and outputs of each.

Referring now to FIG. 18B, shown is an example of a representation 350 relating algorithms, a portion of input data, such as some transformation vectors, and CIs produced for each type of component, that may be included in an embodiment. Other embodiments may use different data entities in addition to those shown in connection with FIG. 18B. As described elsewhere herein, each type of component in this example is one of: indexer, accelerometer, shaft, gear, planetary, or bearing. Certain algorithms may be used in connection with determining one or more CIs for more than one component type. It should be noted that a variety of different algorithms may be used and are known by one of ordinary skill in the art, as described elsewhere herein in more detail. The following are examples of some of the different techniques that may be used in producing CIs. Additionally, FIG. 18B illustrates an example of relationships between some algorithms, a portion of their respective inputs and outputs, as well as how the algorithms may be associated with different component types. However, it should be noted that this illustration is not all inclusive of all algorithms, all respective inputs and outputs, and all component types.

What will now be described are algorithms and the one or more CIs produced that may be included in an embodiment. It should be noted that the number and type of algorithms included may vary in accordance with an embodiment. Additionally, it should be noted that FIG. 18B may not include each and every input and output for an algorithm as described herein and other embodiments of the algorithms described generally herein may also vary.

The data quality (DQ) algorithm 356 may be used as a quality assurance tool for the DTD CI. DQ performs an assessment of the raw uncalibrated sensor data to insure that the entire system is performing nominally. DQ may be used to identify, for example, bad wiring connections, faulty sensors, clipping, and other typical data acquisition problems. The DQ indicator checks the output of an accelerometer for "bad data". Such "bad data" causes the SI to be also be "bad" and should not be used in determining health calculations.

What will now be described are the different indicators that may be included in an embodiment of the DQ algorithm. ADC Bit Use measures the number of ADC bits used in the current acquisition. The ADC board is typically a 16 bit processor. The log base 2 value of the maximum raw data bit acquired is rounded up to the next highest integer. Channels with inadequate dynamic range typically use less than 6 bits to represent the entire dynamic range. ADC Sensor Range is the maximum range of the raw acquired data. This range cannot exceed the operational range of the ADC board, and the threshold value of 32500 is just below the maximum permissible value of +32767 or −32768 when the absolute value is taken. Dynamic Range is similar to the ADC Sensor Range, except the indicator reports dynamic channel range as a percent rather than a fixed bit number. Clipping indicates the number of observations of clipping in the raw data. For a specific gain value, the raw ADC bit values cannot exceed a specific calculated value. Low Frequency Slope (LowFreqSlope) and Low Frequency Intercept (lowFreqInt) use the first 10 points of the power spectral density calculated from the raw data and perform a simple linear regression to obtain the intercept and slope in the frequency-amplitude domain. SNR is the signal to noise ratio observed in each specific data channel. A power spectral density is calculated from the raw uncalibrated vibration data. For each data channel, there are known frequencies associated with certain components. Examples include, but are not limited to, gear mesh frequencies, shaft rotation rates, and indexer pulse rates. SNR measures the rise of a known tone (corrected for operational speed differences) above the typical minimum baseline levels in a user-defined bandwidth (generally +/−8 bins).

The Statistics (ST) algorithm 360 is associated with producing a plurality of statistical indicators 360*a*. The Root-Mean-Square (RMS) value of the raw vibration amplitude represents the overall energy level of the vibration. The RMS value can be used to detect major overall changes in the vibration level. The Peak-To-Peak value of the raw vibrating amplitude represents the difference between the two vibration extrema. When failures occur, the vibration amplitude tends to increase in both upward and downward directions and thus the Peak-To-Peak value increases. The Skewness coefficient (which is the third statistical moment) measures the asymmetry of the probability density function (p.d.f.) of the raw vibration amplitude. Since it is generally believed that the p.d.f. is near Gaussian and has a Skewness coefficient of zero, any large deviations of this value from zero may be an indication of faults. A localized defect in a machine usually results in impulsive peaks in the raw vibration signal, which affects the tails of the p.d.f. of the vibration amplitude. The fourth moment (Kurtosis) of the distribution has the ability to enhance the sensitivity of such tail changes. It has a value of 3 (Gaussian distribution) when the machinery is healthy. Kurtosis values larger than 3.5 are usually an indication of localized defects. However, distributed defects such as wear tend to smooth the distribution and thus decrease the Kurtosis values.

The ST algorithm may be performed on the following vectors: AD raw accelerometer data, A1 signal average data, RS residual data, NB narrow band data, and EV envelope data and others, some of which are listed in 360*b*.

The Tone and base Energy algorithm(TB) 362 uses tone energy and base energy. Tone Energy is calculated as the sum of all the strong tones in the raw vibration spectrum. Localized defects tend to increase the energy levels of the strong tones. This indicator is designed to provide an overall indication of localized defects. "Strong tones" are determined by applying a threshold which is set based on the mean of all the energy contents in the spectrum. Any tones that are above this threshold are attributed to this indicator. The Base Energy measures the remaining energy level when all the strong tones are removed from the raw vibration spectrum. Certain failures such as wear, do not seem to affect the strong tones created by shaft rotation and gear mesh, the energy in the base of the spectrum could potentially be a powerful detection indicator for wear-related failures. Note that the sum of Tone Energy and Base Energy equals the overall energy level in the spectrum.

SI are miscellaneous shaft indicators. SO1 (Shaft Order 1 in g) is the once-per-rev energy in the signal average, and is used to detect shaft imbalance. SO2 (Shaft Order 2 in g) is the twice-per-rev energy in the signal average, and is used to detect shaft misalignment. GDF (Gear detector fault) may be an effective detector for distributed gear faults such as wear and multiple tooth cracks, and is a complement of the indicator signalAverageL1 (also known as gearLocalFault).

In addition to the specifically referenced vectors below, the SI algorithm takes input from the indexer zero-crossing vector (ZC).

The Demodulation analysis (DM) 370 is designed to further reveal side band modulation by using the Hilbert transform on either the narrow band signal (narrow band demodulation) or the signal average itself (wide band demodulation) to produce the Amplitude Modulation (AM) and Phase Modulation (FM) signals. The procedures involved to obtain such signals are:

Perform Hilbert transform on the narrow band signal (or signal average).

Compute the amplitude of the obtained complex analytic signal to obtain the AM signal.

Compute the phase angles of the analytic signal to obtain the FM signal.

Compute the instantaneous amplitude of the analytic signal to obtain the dAM signal.

Compute the instantaneous phase angles of the analytic signal to obtain the dFM signal.

The DM algorithm is performed on the band passed filtered data at a frequency of interest by taking a Hilbert Window function of the frequency domain data and converting the data back to the time domain.

The Sideband Modulation (SM) 368 analysis is designed to reveal any sideband activities that may be the results of certain gear faults such as eccentricity, misalignment, or looseness. CIs included in 368*a* are DSMn. DSMn is an indicator that characterizes the Degree of Sideband Modulation for the nth sideband (n=1, 2, and 3). The DSMn is calculated as the sum of both the nth high and low sideband energies around the strongest gear meshing harmonic. As indicated in 368*b*, the SM algorithm is performed on the Fast Fourier transform vector (FF).

The Planetary Analysis (PL) 364 extracts the Amplitude Modulation (AM) signal produced by individual planet gears and compares the "uniformity" of all the modulation signals. In general, when each planet gear orbits between the sun and the ring gears, its vibration modulates the vibration generated by the two gears. It is believed that when one of the planet gears is faulty, the amplitude modulation of that planet gear would behave differently than the rest of the planet gears. The procedure to perform this algorithm is to obtain signal averages for the input, output, and planet shafts. For each signal average:

Locate the strongest gear meshing harmonic.

Bandpass filter the signal average around this frequency, with the bandwidth equals to twice the number of planet gears.

Hilbert transform the bandpass filtered signal to obtain the AM signal.

Find the maximum (MAX) and minimum (MIN) of the AM signal.

Calculate the Planet Gear Fault (PGF) indicator as included in 364a according to the equation PGF=MAX(AM)/MIN(AM).

The inputs to the PL algorithm are the raw accelerometer data (AD) and the indexer zero-crossing data (ZC).

The Zero-Crossing Indicators (ZI) algorithm 354 is performed on the zero-crossing vector (ZC). The zero crossing indicators may be determined as follows:

$D_j = \ln_{j+1} - \ln_j$, $j=0 \ldots N-2$, the stored zero-crossing intervals pulseIntervalMean=Mean(D)

The Shaft Indicators (SI) algorithm 358 calculates miscellaneous shaft indicators included in 358a. SO1 (Shaft Order 1 in g) is the once-per-rev energy in the signal average, and is used to detect shaft imbalance. SO2 (Shaft Order 2 in g) is the twice-per-rev energy in the signal average, and is used to detect shaft misalignment.

SO3 (Shaft Order 3), is the three-per-rev energy in the signal average, and is used to detect shaft misalignment. The miscellaneous shaft indicators may also be included in an embodiment defined as follows $$p = numPathPairs$$

$$shaftRatio = \frac{\prod_{i=0}^{p-1} shaftPath_{2i}}{\prod_{i=0}^{p-1} shaftPath_{2i+1}} = \frac{driving}{driven}$$

$$indexRatio = \frac{\prod_{i=0}^{p-1} indexPath_{2i}}{\prod_{i=0}^{p-1} indexPath_{2i+i}} = \frac{driving}{driven}$$

$$driveRatio = \frac{indexRatio}{shaftRatio} \cdot pulsesUsed$$

$$shaftSpeed = \frac{60}{pulseIntervalMean \cdot driveRatio}$$

$$resampleRate = \frac{shaftSpeed}{60} \cdot pointsPerRev$$

$RS$ = residual data $A1$ = signal average $$signalAverageL1 = \frac{PtoP(A1)}{RMS(A1)}$$

$FF = FFT$ of the signal average $shaftOrder_j = \sqrt{FF_j}$, $j = 1 \ldots 3$ $$gearDistFault = \frac{Stdev(RS)}{Stdev(A1)}$$

As described elsewhere herein, gearDistFault (GDF) is an effective detector for distributed gear faults such as wear and multiple tooth cracks, and is a complement of the indicator signalAverageL1 (also known as gearLocalFault).

In addition to the specifically referenced vectors below, the SI algorithm takes input from the indexer zero-crossing vector (ZC) and may also use others and indicated above.

The following definitions for indicators may also be included in an embodiment in connection with the SI algorithm:

shaftpath is defined for the shaft descriptor indexPath is the path of the shaft seen by the indexer used for signal averaging numPathPairs is the number of path pairs defined for shaftPath and indexPath pulsesUsed is the number of pulses used per revolution of the indexer shaft pulseIntervalMean is the mean of the zero-crossing (ZC) intervals pointsPerRev is the number of output points per revolution in the signal average, The Bearing Energy (BE) algorithm 376 performs an analysis to reveal the four bearing defect frequencies (cage, ball spin, outer race, and inner race frequencies) that usually modulate the bearing shaft frequency. As such, these four frequencies are calculated based on the measured shaft speed and bearing geometry. Alternatively, the four frequency ratios may be obtained from the bearing manufacturers. The energy levels associated with these four frequencies and their harmonics are calculated for bearing fault detection. They are:

Cage Energy: the total energy associated with the bearing cage defect frequency and its harmonics. Usually it is detectable only at the later stage of a bearing failure, but some studies show that this indicator may increase before the others.

Ball Energy: the total energy associated with the bearing ball spin defect frequency and its harmonics.

Outer Race Energy: the total energy associated with the bearing outer race defect frequency and its harmonics.

Inner Race Energy: the total energy associated with the bearing inner race defect frequency and its harmonics.

The Total Energy indicator gives an overall measure of the bearing defect energies.

In one embodiment, one or more algorithms may be used in determining a CI representing a score quantifying a difference between observed or actual test distribution data and a normal probability distribution function (PDF) or a normal cumulative distribution function (CDF). These one or more algorithms may be categorized as belonging to a class of algorithms producing CIs using hypothesis tests ("hypothesis testing algorithms") that provide a measure of difference in determining whether a given distribution is not normally distributed. These hypothesis testing algorithms produce a score that is used as a CI. The score may be described as a sum of differences between an observed or actual test distribution function based on observed data and a normal PDF or normal CDF. An algorithm may exist, for example, based on each of the following tests: Chi-Squared Goodness of fit (CS), Kolmogorov-Smirnov Goodness of fit (KS), Lilliefors test of normality, and Jarque-Bera test of normality (JB). Other embodiments may also include other algorithms based on other tests for normality, as known to those of ordinary skill in the art. The hypothesis tests compare the test distribution to the normal PDF, for example as with CS test, or the normal CDF, for example as with the KS and Lilliefor tests.

What will now be described is an example in which the CS test is used in determining a score with a test distribution of observed actual data. In this example, the test distribution of observed data forms a Gamma (5,20) distribution function, having an alpha value of 5 and a beta value of 20. The mean of this Gamma (5,20) distribution is alpha*beta having a variance of alpha*beta$^2$. The Gamma (5,20) distribution function is a tailed distribution which graphically is similar to that of a normal distribution.

Figure 19:
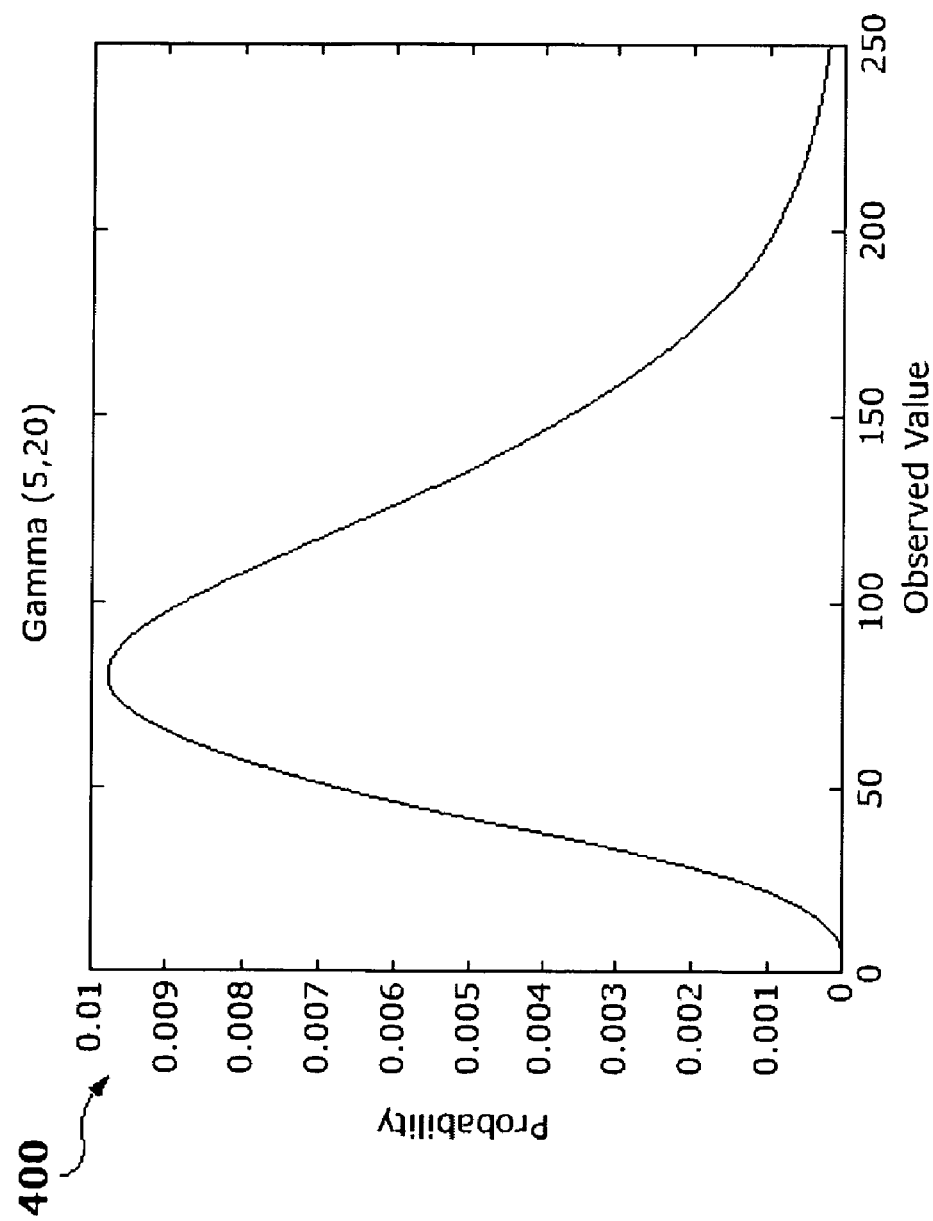
FIG. 19 is an example of a graphical representation of a probability distribution function (PDF) of observed data.

Referring now to FIG. 19, shown is an example of a graphical representation 400 of observed data.

Figure 20:
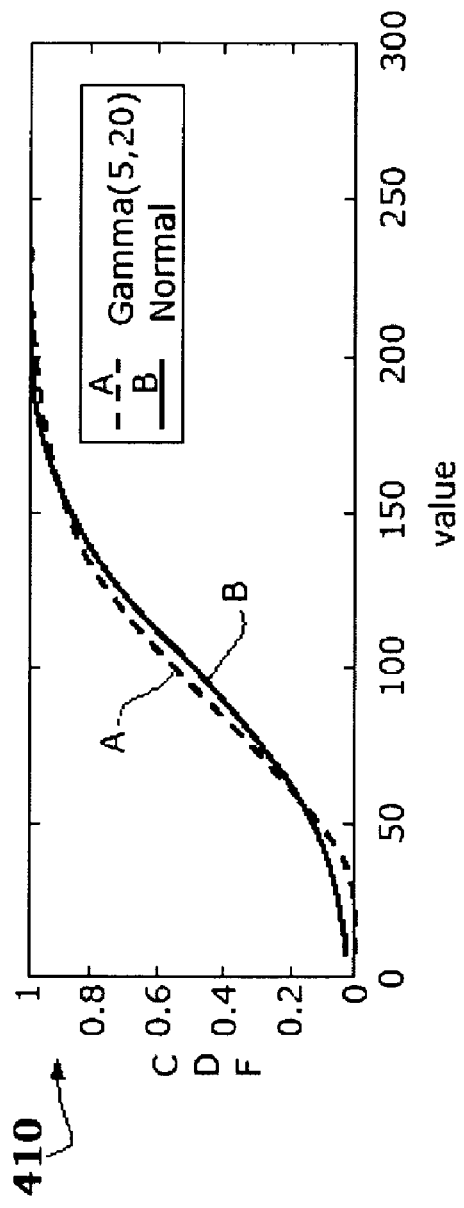
FIG. 20 is an example of a graphical representation of a cumulative distribution function (CDF) observed data following a gamma (5,20) distribution and the normal CDF.

Referring now to FIG. 20, shown is an example of a graphical representation 410 of the normal CDF and the Gamma (5,20) CDF of random data. Referring now FIG. 21, shown is an example of a graphical representation 420 of the difference between the normal CDF and the Gamma (5,20) CDF.

Figure 21:
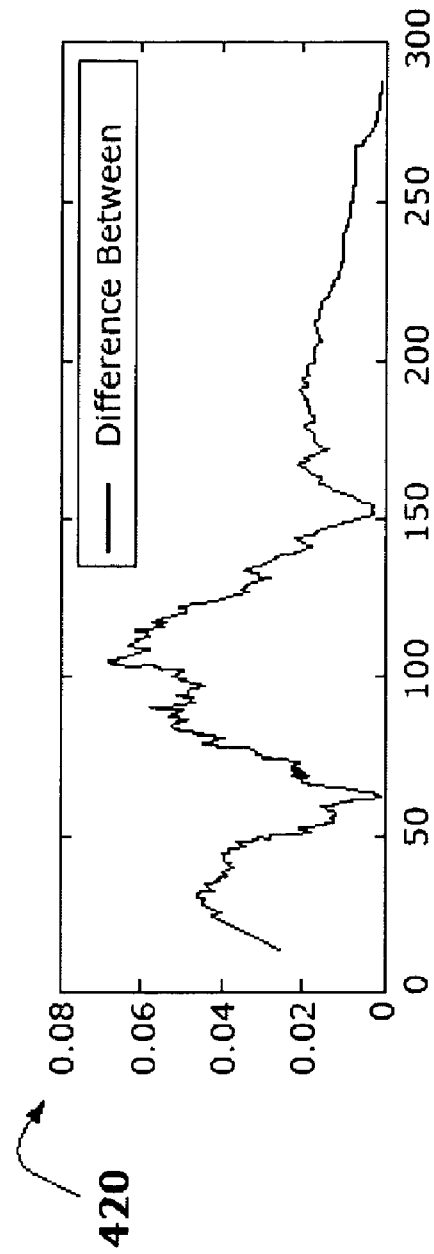
FIG. 21 is an example of a graphical representation of the difference between the two CDFs of FIG. 20.

In one embodiment, if there are 1000 test samples used in forming a single CDF, the graphical representation, for example, in FIG. 21 represents differences in 1000 instances where the difference between the expected value (Normal CDF) and the maximum deviation of the (in this case defined as the score) observed gamma CDF can exceed some critical value. The critical value is that statistic which represents some predefined alpha error (the probability that the test indicates the distribution is not normal when in fact it is normal—this is typically set at 5%.) If the score exceeds the critical value, the distribution is said to be not normal statistic. The score is the maximum deviation from this statistic or alpha value.

It should be noted that the sensitivity or goodness of the test increases as the number of samples or instances (degrees of freedom "n") increases approximately as the square root of "n". For example, in the case where 1000 instances or samples are used such that n=1000, the sensitivity or ability of this CI to be used in detecting gear faults, for example, is roughly 31 times more powerful than kurtosis in identifying a non normal distribution.

Figure 22:
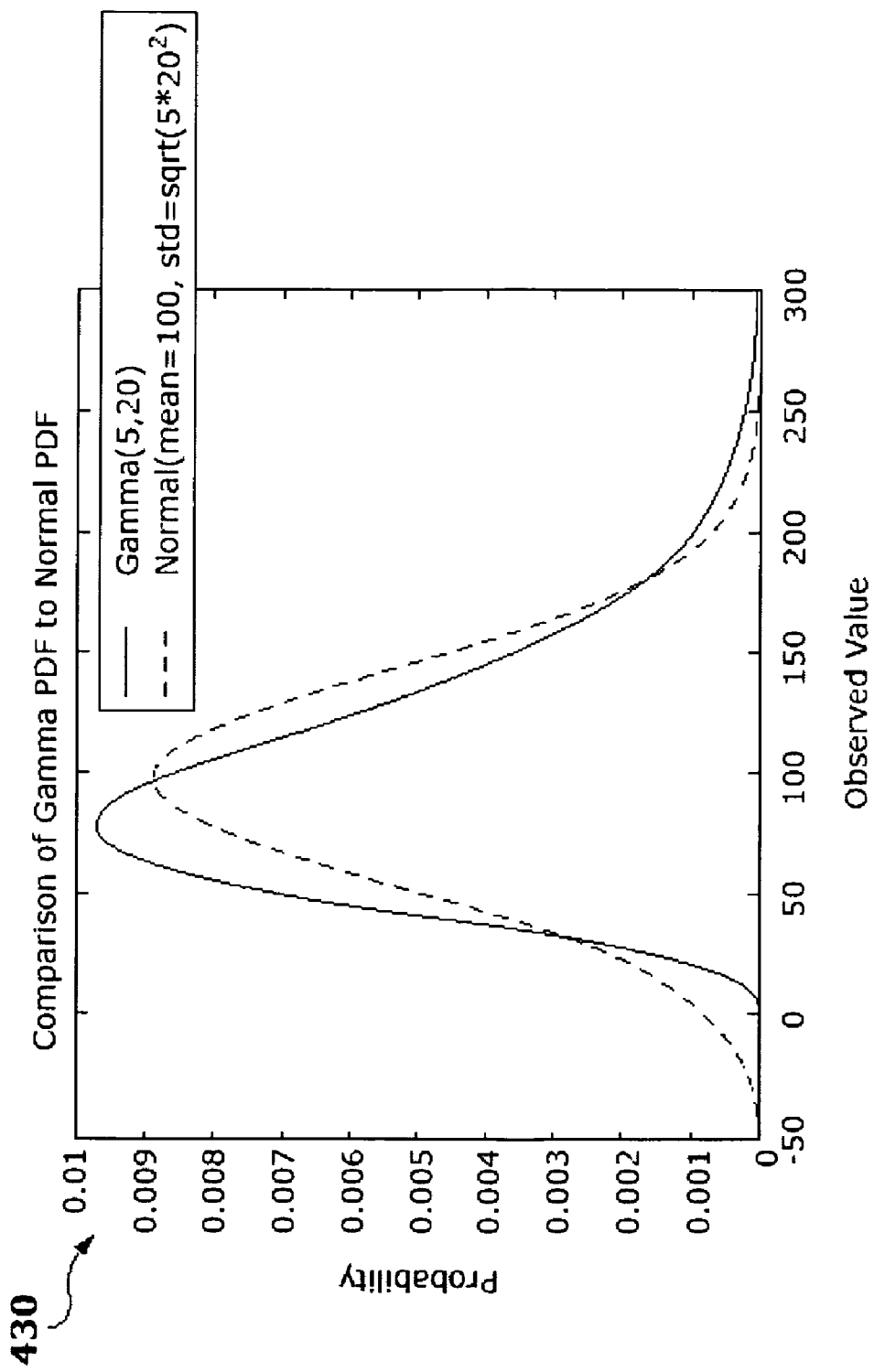
FIG. 22 is an example of a graphical representation of the PDF of observed data following a Gamma (5,20) distribution and a PDF of the normal distribution.

As another example, in the algorithm using the CS test, the normal PDF is used. Referring now to FIG. 22, shown is a graphical representation 430 of the normal PDF and the PDF of the Gamma (5,20) distribution. The representations of FIG. 22 are drawn as continuous lines rather than discrete intervals.

Figure 23:
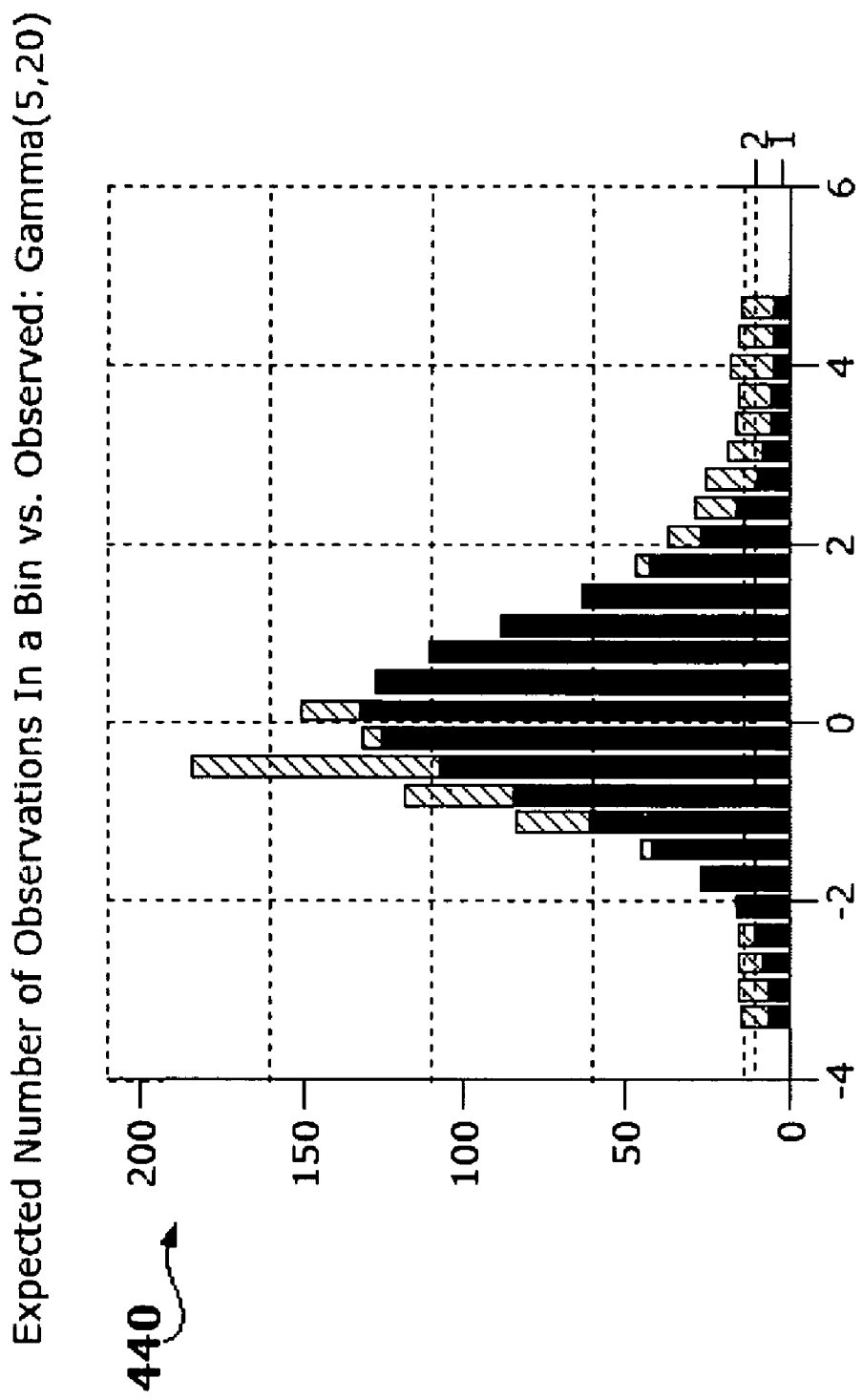
FIG. 23 is an example of another graphical representation of the two PDFs from FIG. 22 shown which quantities as intervals rather than continuous lines.

Referring now to FIG. 23, the quantities of the x-axis represented in FIG. 22 are shown in another representation 440 as being divided into discrete bins, intervals, or categories. For example, there may be 4 bins or intervals between any two integer quantities. Between 0 and 1, bin 1 includes values between [0,0.25), bin 2 includes values between [0.25, 0.50), bin 3 includes values between [0.50,0.75) and bin 4 includes values between [0.75, 1.0). For each bin, determine the number of observed and expected values, and their difference. Square each of the differences for each bin and then add all the differences and divide by the expected value for each bin. The CS test which sums all the differences for each category divided by the expected value for each category represented as:

$$\sum_{i=1}^{k} \frac{(fi - ei)^2}{ei}$$

for k categories or bins, k−1 degrees of freedom, fi is observed data and ei is expected data value or number in accordance with a normal distribution.

Figure 24A:
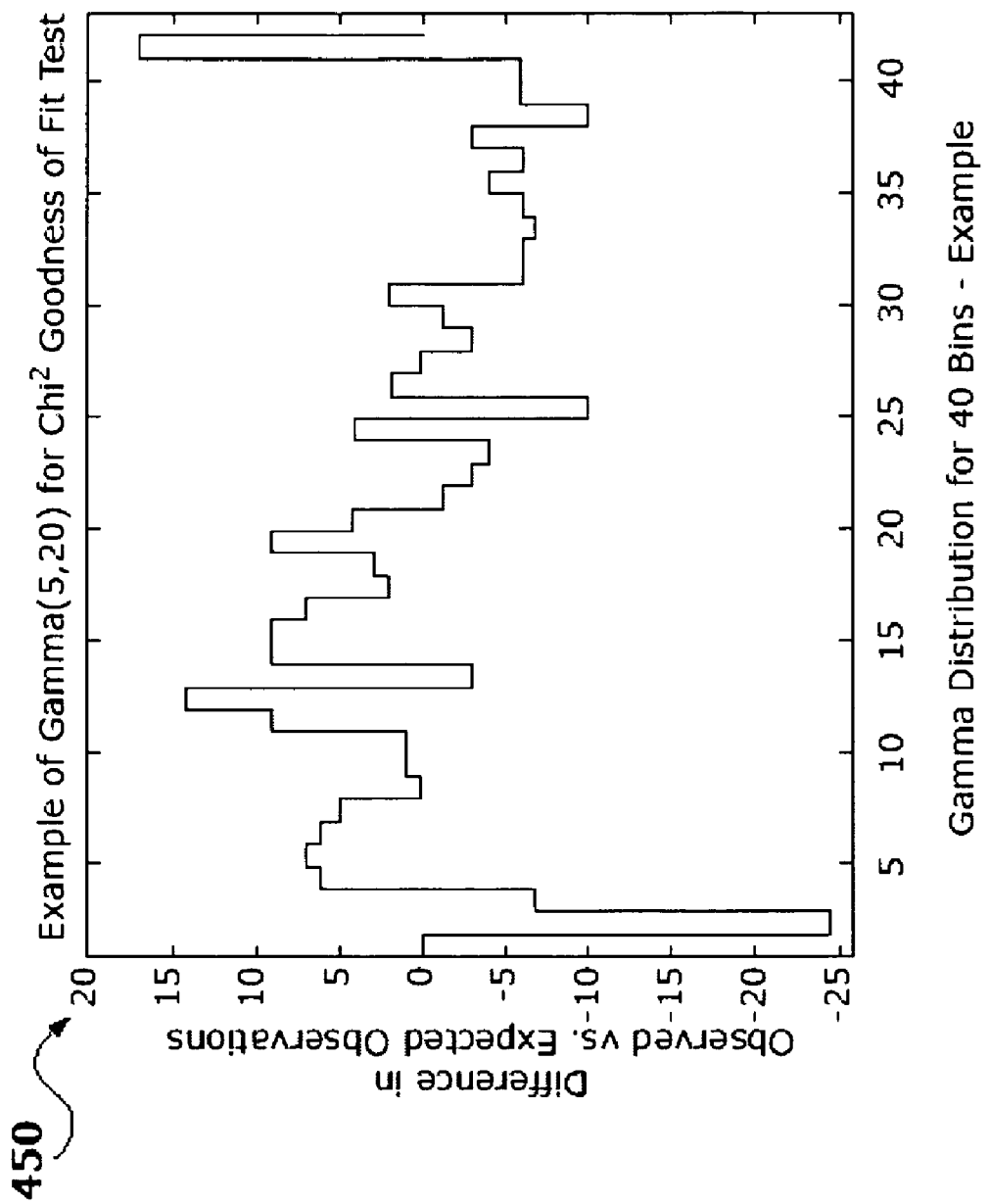
FIG. 24A is an example of a graphical representation of the differences between the two PDFs of observed data and the normally distributed PDF.

For each bin, take the difference between the observed and expected observation. Square this value and divided by expected number of observation. Sum over all bins. The statistic, the critical value is the $\chi^2$ at k−1 degrees of freedom may be, for example, 90.72 which is much greater than the 0.05 alpha value of a $\chi^2$, which is 54.57 for 39 degrees of freedom or 40 categories/bins. Thus, the observed data in this example as indicated by the statistic is not normally distributed. FIG. 24A represents graphically a difference between observed and expected values for each bin or interval of FIG. 23.

It should be noted that the foregoing algorithms provide a way of measuring both the skewness and kurtosis simultaneously by comparing the PDF or CDF of the test distribution against the PDF/CDF of a standard normal distribution in which a score is used as a CI as described above.

As known to those of ordinary skill in the art, other algorithms belonging to the hypothesis testing class may be used in computing CIs. The particular examples, algorithms, and tests selected for discussion herein are representations of those that may be included in the general class.

What will now be described is another algorithm that may be used in determining a CI in an embodiment of the system of FIG. 1. This may be referred to as an impulse determination algorithm that produces a CI indicating an amount of vibration that may be used in detecting a type of fault. The impulse determination algorithm takes into account the physical model of the system. One type of fault that this technique may be used to detect is a pit or spall on either: gear tooth, inner bearing race, outer bearing race or bearing roller element. This technique uses a model designed to detect this type of fault where the model is based on knowledge of the physical system. For example, if there is a pit or spall on a bearing, this may produce a vibration on a first bearing which may further add vibrations to other components connected to or coupled to the bearing.

In one embodiment, a model can be determined for a particular configuration by using configuration data, for example. In one configuration, for example, a signal received at a sensor may be a superposition of gear and bearing noise that may be represented as a convolution of gear/bearing noise and a convolution of the Gear/Bearing signal with the gearbox transfer function. Given this, if one type of fault is a pit or spall on either a: gear tooth, inner bearing race, outer bearing race or bearing roller element, a model that is designed to look for this type of fault can take advantage of knowledge of the physical system.

The impulse determination algorithm uses Linear Predictive Coding (LPC) techniques. As known to those skilled in the art, LPC may be characterized as an adaptive type of signal processing algorithm used to deconvolute a signal into its base components. In the case of a pit/spall fault, the base signal components are an impulse train generated by the fault hitting a surface (e.g gear tooth with geartooth, inner race with roller element, etc) and the bearing/case transfer function. The bearing, gear and case have there own transfer functions. Convolution here is transitive and multiplicative. As such, LPC techniques may be used to estimate the total convolution function of the total vibration that may be produced.

For example, in this arrangement, the total amount of vibration representing the total impulse signal generated by a configuration may be represented as:

$$[\text{impulse}] \otimes f(\text{Gear}) \otimes f(\text{Bearing}) \otimes f(\text{Case}) = \\ [\text{impulse}] \otimes [f(\text{Gear}) \otimes f(\text{Bearing}) \otimes f(\text{Case})]$$

in which $\otimes$ represents the convolution operation.

It should also be noted that convolution is a homomorphic system such that it is monotonically increasing and that logarithmic transformations hold. Thus the relationship of c=a*b also holds for Log c=Log a+Log b. A "dual nature" of convolution is used in following representations to equate operations using convolution in the time domain to equivalent multiplication operation in the frequency domain.

If "y" represents the total response of all elementary responses, and "h" represents the response of the system for a series of elementary input impulses "imp" such that y is the convolution of imp and h, then this may be represented as:

$$y = imp \otimes h$$

and then converting "y" and "h" each, respectively, to the frequency domain represented as "Y" and "H", as may be represented by the following:

$$Y = \Im(y), H = \Im(h)$$

taking the Fourier transform (FFT) of each where H represents the transfer function. The convolution in the time domain may be equated to a multiplication in the frequency domain represented as:

$$Y = IMP \cdot H$$

in which IMP is the Fourier transformation of imp into the frequency domain. Above, imp is in the time domain.

The convolution in the time domain is equivalent to multiplication in the Frequency Domain. Referring to the homomorphic property of convolution, it follows that:

$$\log(Y) = \log(IMP) + \log(H),$$

therefore $$\log(IMP) = \log(Y) - \log(H),$$

$$IMP = \exp(\log(Y) - \log(H))$$

and finally $$imp = \Im^{-1}(IMP)$$

Using the foregoing, the system transfer function "H" may be estimated for the Gear/Bearing and Case to recover the impulse response allocated with a Gear or Bearing pit/spall fault. The estimation of this transfer function "H" may be accomplished using Linear Predictive Coding (LPC) techniques. LPC assumes that the Transfer Function is a FIR filter, and as such, the auto-correlation of the time domain signal may be used to solve for the filter coefficients in a minimum sum of square error sense.

Using the LPC model, there is an impulse that is convoluted with a FIR filter, such that:

$$y[n] = a_1 x[n-1] + a_2 x[n-2] + a_3 x[n-3] + \ldots$$

LPC techniques may be used to estimate the coefficients $a = (a_1 \ldots a_n)$ for an order p in a minimum sum of square error sense, n=p+1. The standard least squares error estimators may be used, wherein $y = y[1, 2, \ldots n]$, and x is the time delayed signal, in which:

$$x = \begin{bmatrix} x[n-1, n-2, \ldots n-p] \\ x[n-2, n-3, \ldots n-p-1] \\ \vdots \end{bmatrix}$$

where $a = (x^T x)^{-1} x^T y$. These values for a1 ... an may be used with the following equation:

$$y_{hat} = ax, b = (y - y_{hat})^2 \text{ and the estimator of error B is:}$$
$$\Sigma_{all} b$$

Y may also be expressed as:

$$Y = FFT(y[1, 2, \ldots n])$$

in which y[1 ... n] are values in the time domain expressed in the frequency domain as a Fourier transform of the time domain values. Y represents current time vector measurements in the frequency domain.

In terms of a and B, the transfer function H may be estimated and represented as a/B, (freq. Domain). Note that "a" is a vector of the values a1 ... an obtained above.

The homomorphic property of convolution as described above may be used to estimate the impulse as represented in:

$$IMP = \exp(\log(Y) - \log(H))IMP$$

If there is no fault, the impulse, for example, may be characterized as "white noise". As the fault progresses, the impulse or the value of H becomes larger. The CI is the power spectral density at a bearing passing frequency for a bearing fault, or a mesh frequency for a gear fault. Other CIs based on the foregoing value may be a "score" of the Lilifers test for normality, or other such test.

In the foregoing, a pit or spall may cause a vibration or tapping. Subsequently, other elements in contact with the ball bearing may also vibrate exhibiting behavior from this initial vibration. Thus, the initial vibration of the pit or spall may cause an impulse spectrum to be exhibited by such a component having unusual noise or vibration.

The value of IMP as may be determined using the IMP Equation above represents the impulse function that may be used as a "raw" value and at a given frequency and used as an input into an HI determination technique. For example, the IMP at a particular frequency, since this the spectrum, determined above may be compared to expected values, such as may be obtained from the stored historic data and configuration data. An embodiment may also take the power spectrum of this raw impulse spectrum prior to being used, for example, as input to an HI calculation where the power spectrum is observed at frequencies of interest, such as the inner race frequency. For example, if the impulse function is within some predetermined threshold amount, it may be concluded that there is no fault.

Figure 24B:
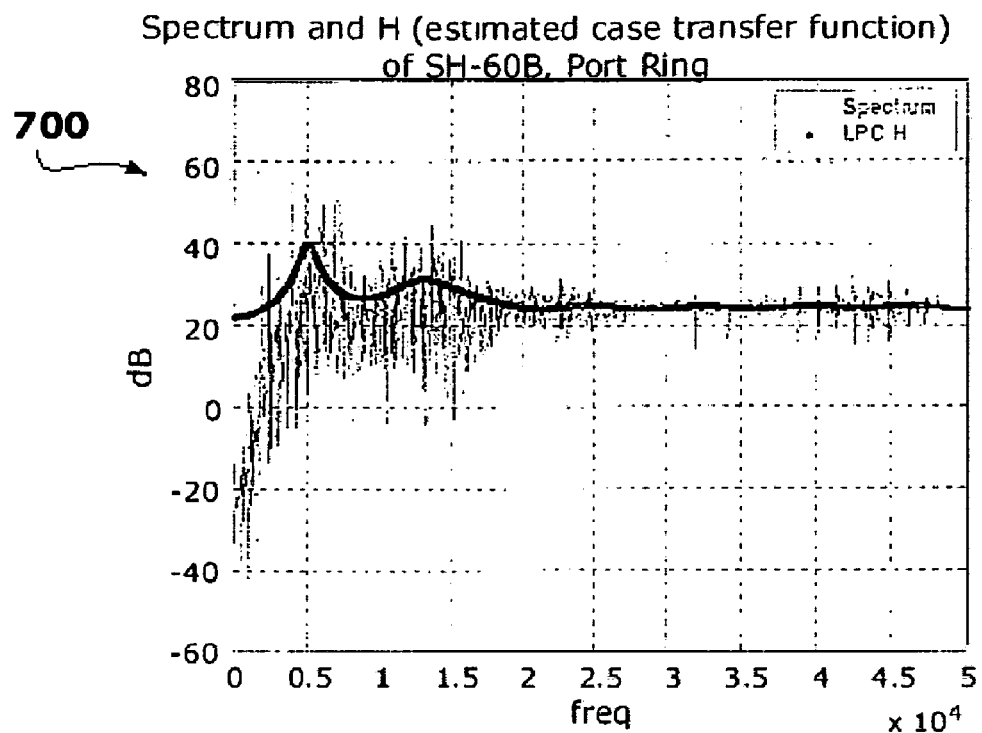
FIGS. 24B-24D are examples of a graphical data displays in connection with a healthy system.
Figure 24C:
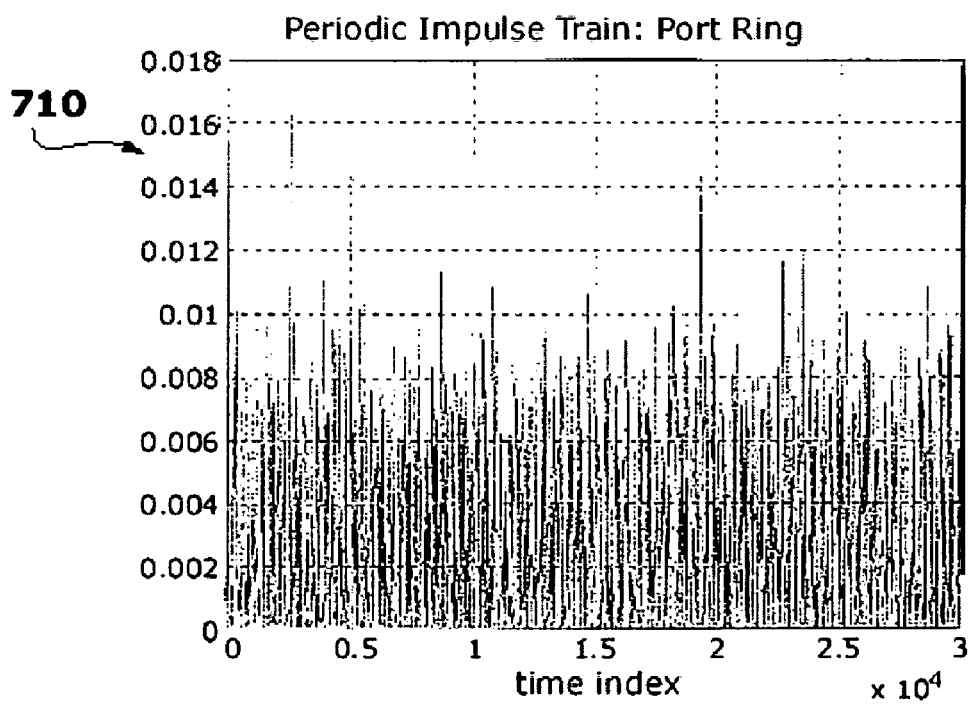

What is shown in the FIG. 24B and FIG. 24C are relative to a healthy system, such as a main gearbox, for example, such as in connection with a planetary race fault of an SH-60B U.S. Navy Helicopter built by Sikorsky.

The FIG. 24B representation 700 shows an impulse train in the frequency domain of the healthy system.

It should be noted that an embodiment may estimate the transfer function H using LPC using different techniques. An embodiment may estimate the transfer function H using an autocorrelation technique (AutoLPC). An embodiment may also estimate the transfer function H using a covariance technique (CovLPC). Use of autocorrelation may use less mathematical operations, but require more data than using the covariance. Alternatively, use of the covariance technique may use more mathematical operations but require less data. As the amount of available data increases, the autocorrelation LPC result converges to the covariance LPC result. In one example, data samples are at 100 KHz with 64,000 data points used with the autocorrelation technique due to the relatively large number of data points.

FIG. 24C representation 710 shows the data of 700 from FIG. 24B in the time domain rather than the frequency domain.

Figure 24D:
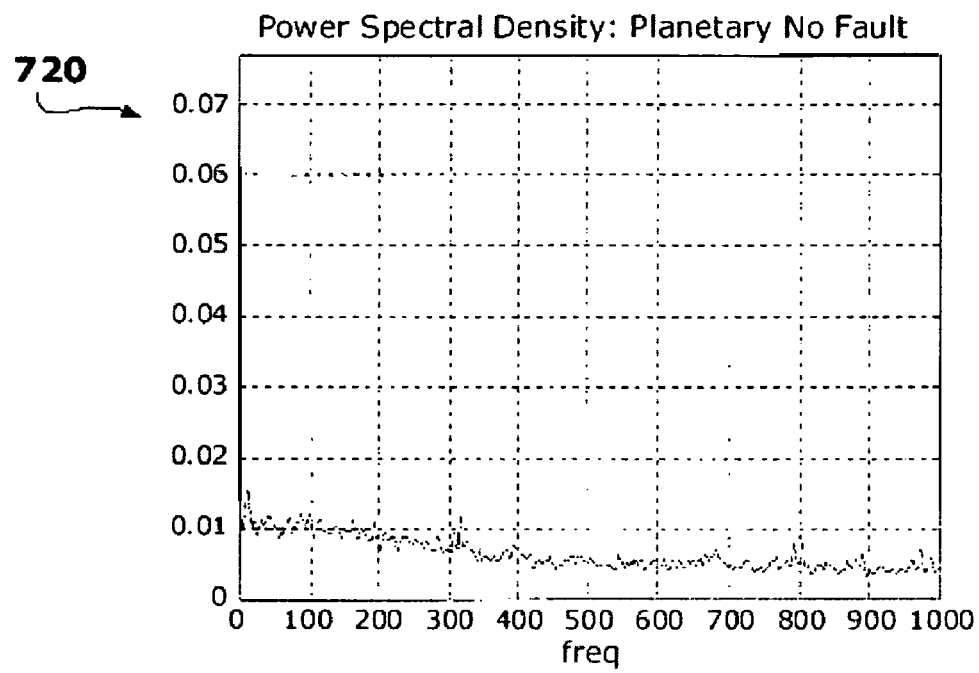

FIG. 24D representation 720 shows the power spectral density of the above figures as deconvolved time data of frequency v. dB values in a healthy system.

The foregoing FIGS. 24B-24D represent data in a graphical display in connection with a healthy system. Following are three additional graphical displays shown in FIGS. 24E-24G in connection with an unhealthy system, such as a starboard ring channel which exhibit data that may be expected in connection with a pit or spall fault.

Figure 24E:
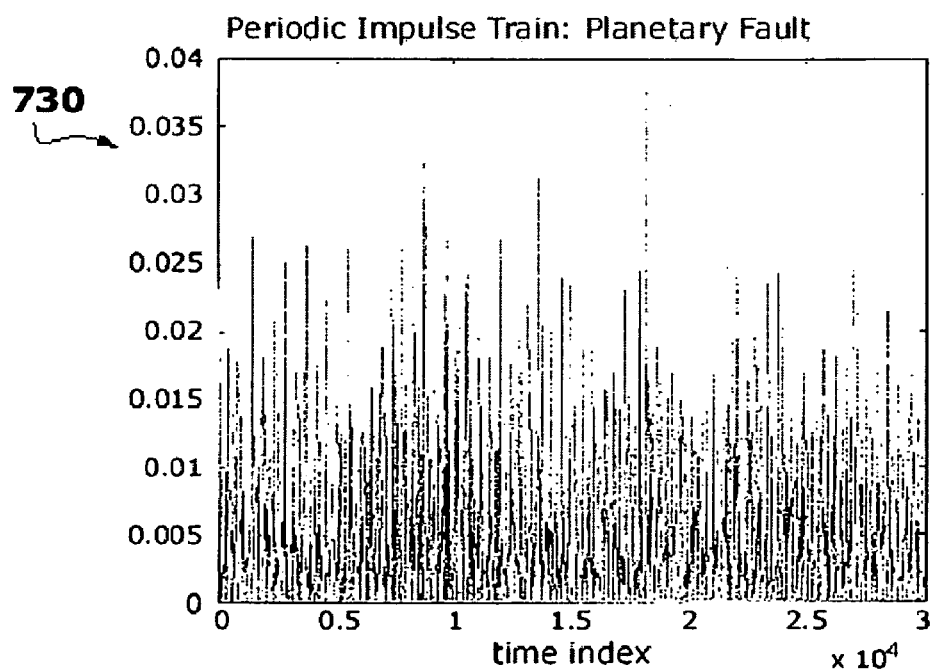
FIGS. 24E-24G are examples of graphical data displays in connection with a system having a fault.
Figure 24F:
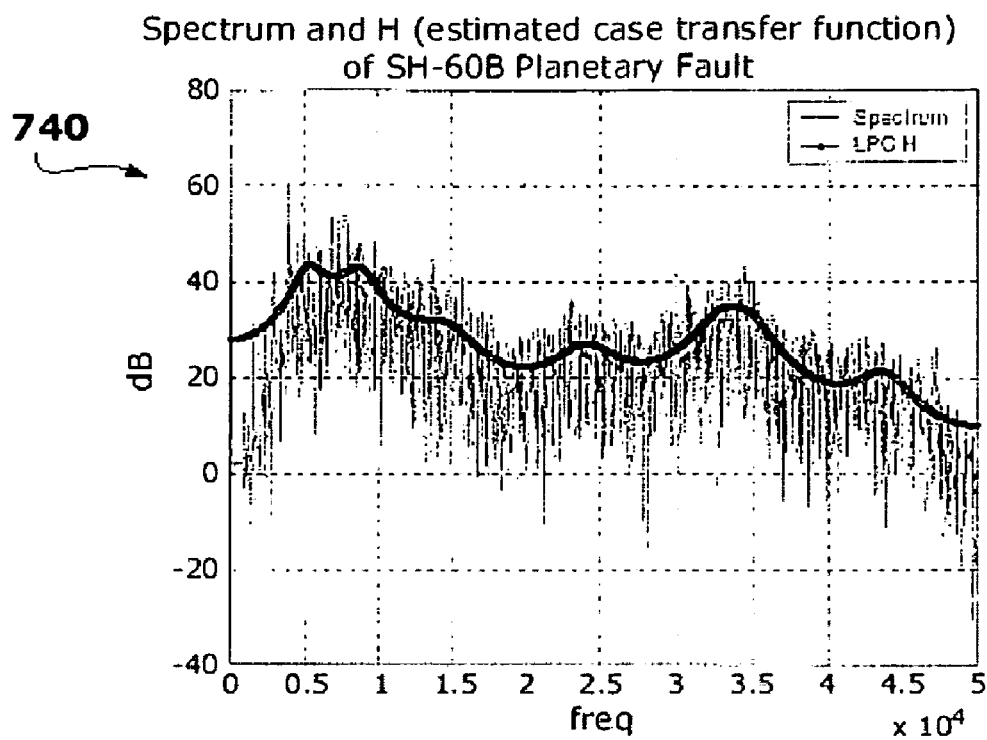

FIG. 24E, representation 730, illustrates an impulse train as may be associated with an unhealthy system in the time domain. FIG. 24F, representation 740, illustrates a graphical display of the impulse train in the frequency domain.

Figure 24G:
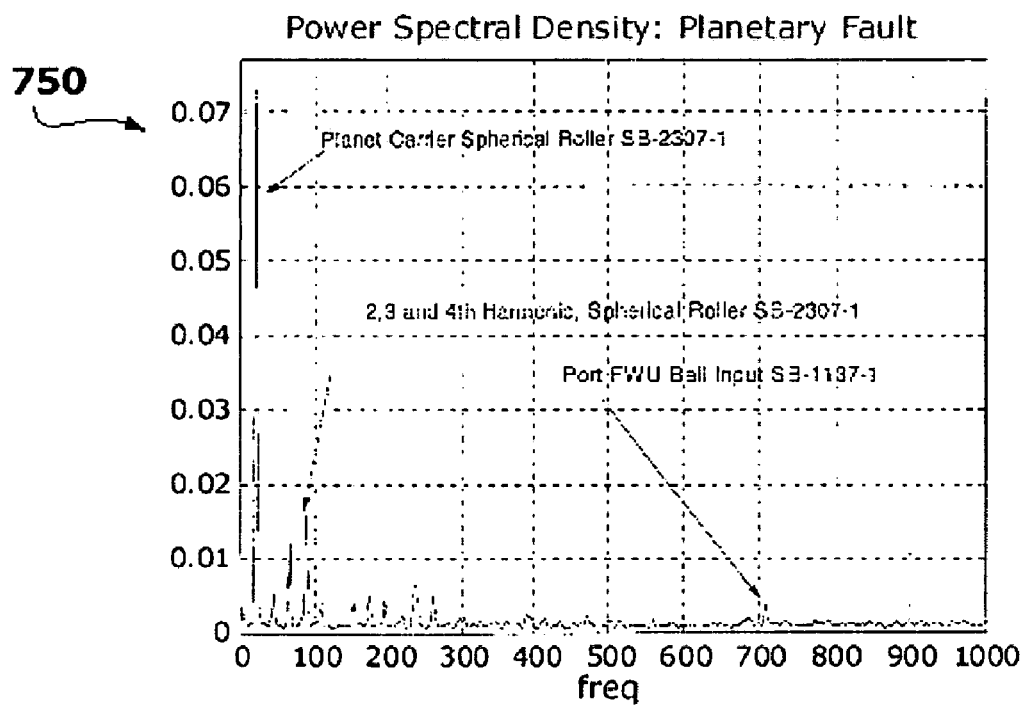

In FIG. 24G, shown is an illustration 750 is a graphical representation of the power spectrum of the impulse train represented in connection with the other two figures for the unhealthy system identified by a period impulse train associated with an inner race bearing fault. In this example, a spike may be viewed in the graphical display as well as the harmonics thereof.

It should be noted that other algorithms and CIs in addition to those described herein may be used in producing CIs used in techniques in connection with HIs elsewhere herein.

Figure 25:
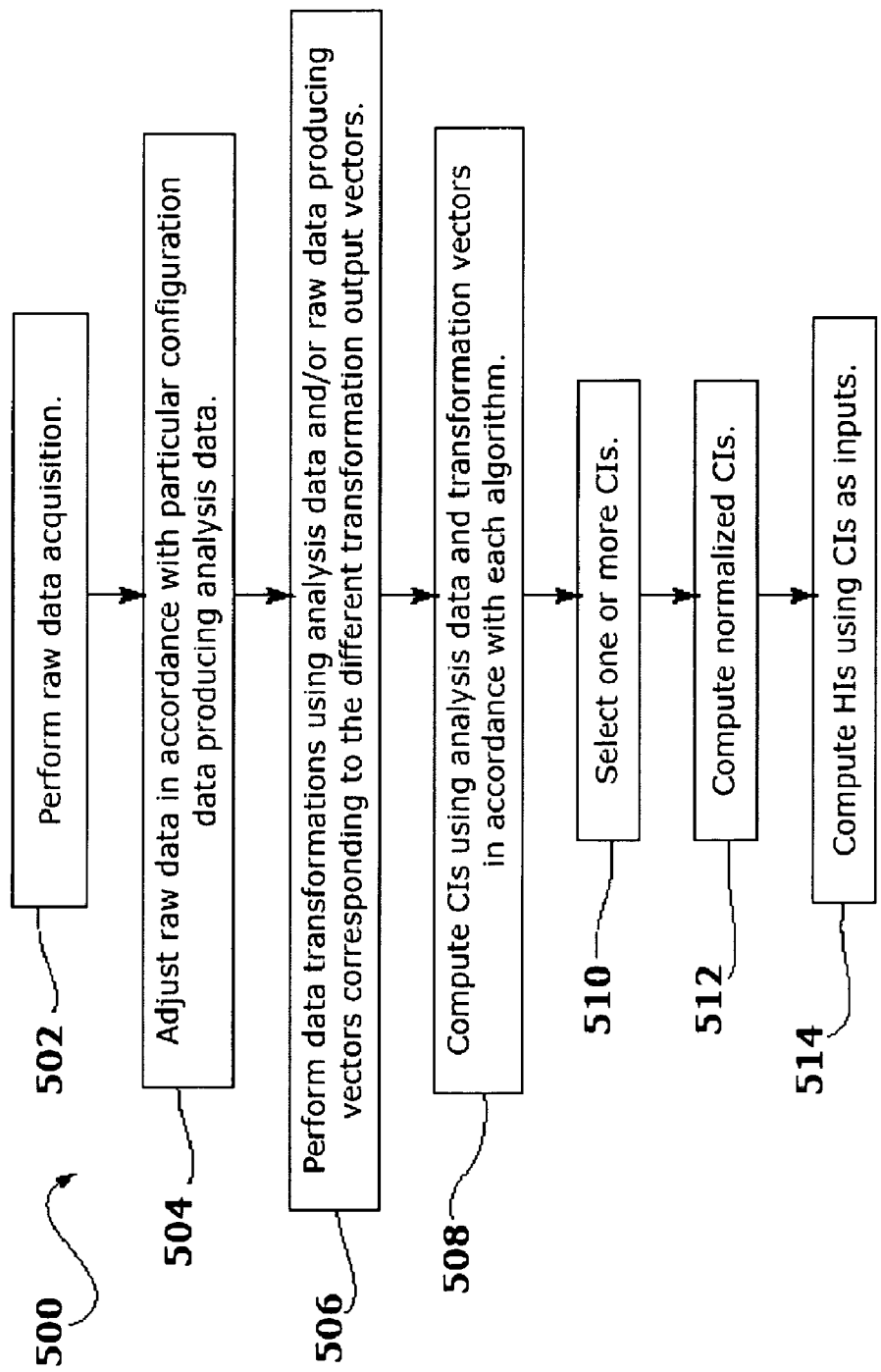
FIG. 25 is a flowchart of steps of one embodiment for determining health indicators (HIs)

What will now be described is one embodiment in which these CIs may be used. Referring now to FIG. 25, shown is a flow chart of steps of one embodiment for determining the health of a part as indicated by an HI. At step 502, raw data acquisition is performed. This may be, for example, issuing appropriate commands causing the VPU to perform a data acquisition. At step 504, the raw data may be adjusted, for example, in accordance with particular configuration information producing analysis data as output. It is at step 504, for example, that an embodiment may make adjustments to a raw data item acquired as may be related to the particular arrangement of components. At step 506, data transformations may be performed using the analysis data and other data, such as raw data. The output of the data transformations includes transformation output vectors. At step 508, CIs are computed using the analysis data and transformation vector data as may be specified in accordance with each algorithm. At step 510, one or more CIs may be selected. Particular techniques that may be included in an embodiment for selecting particular CIs is described elsewhere herein in more detail. At step 512, CIs may be normalized. This step is described in more detail elsewhere herein. At step 514, the selected and normalized CIs are used in determining HIs. Particular techniques for determining HIs are described in more detail elsewhere herein.

In an embodiment, due to the lengthy processing times, for example, in executing the different algorithms described herein, HI computations may not be executed in real time. Rather, they may be performed, for example, when a command or request is issued, such as from a pilot or at predetermined time intervals.

The hardware and/or software included in each embodiment may vary in one embodiment, data acquisition and/or computations may be performed by one or more digital signal processors (DSPs) running at a particular clock speed, such as 40 MHz, having a predetermined numerical precision, such as 32 bits. The processors may have access to shared memory. In one embodiment, sensors may be multiplexed and data may be acquired in groups, such as 8. Other embodiments may vary the number in each group for data sampling. The sampling rates and durations within an acquisition group may also vary in an embodiment. Data may be placed in the memory accessed by the DSPs on acquisition. In one embodiment, the software may be a combination of ADA95 and machine code. Processors may include the VPU as described herein as well as a DSP chip.

What will now be described are techniques for normalizing CIs in connection with determining HIs providing more detailed processing of step 512 as described in connection with flowchart 500.

Transmission error (T.E.) depends upon torque. Additionally, vibration depends upon the frequency response of a gear. As such, the CI, which also depends upon T.E. and vibration, is a function (generally linear) of torque and rotor speed (which is frequency), and airspeed as this may change the shape of the airframe. Thus, techniques that may be used in connection with determining the "health state" or HI of a component may normalize CIs to account for the foregoing since HIs are determined using CIs.

For each bearing, shaft and gear within a power train, a number of CIs may be determined. An embodiment may compare CI values to threshold values, apply a weighting factor, and sum the weighted CIs to determine an HI value for a component at a particular time. Because data acquisitions may be made at different torque (e.g. power setting) values, the threshold values may be different for each torque value. For example, an embodiment may use 4 torque bands, requiring 4 threshold values and weights for each CI. Additionally, the coarseness of the torque bands will result in increased, uncontrolled system variance. Alternatively, rather than use multiple threshold values and have an uncontrolled variance, an embodiment may use a normalization technique which normalizes the CI for torque and rotor RPM (Nr), and airspeed, expressed as a percentage, for example, in which a percentage of 100% is perfect. Use of these normalized CIs allows for a reduction of configuration such that, for example, only one threshold is used and variance may also be reduced.

The normalization technique that will now be described in more detail may be used in connection with methods of HI generation, such as the hypothesis testing method of HI generation that are also described in more detail elsewhere herein.

It should be noted that a deflection in a spring is linearly related to the force applied to the spring. The transmission may be similar in certain aspects to a large, complex spring. The displacement of a pinion and its corresponding Transmission Error (T.E.) is proportional to the torque applied. T.E. is a what causes vibration, while the intensity of the vibration is a function of the frequency response $(N_r)$, where frequency is a function of RPM. Thus, vibration and the corresponding CI calculated using a data acquisition are approximately linearly proportional to torque, $N_r$ (over the operating range of interest) and/or airspeed although at times there may be a linear torque*$N_r$ interaction effect. For example, gear box manufacturers may design a gearbox to have minimum T.E. under load, and a graphical representation of T.E. vs. Torque is linear, or at least piece wise linear. It should be noted that test data, for example used in connection with a Bell helicopter H–1 loss of lube test, shows a relationship between CI and torque suggesting linearity. Additionally, tests show that airspeed is also relevant factor. Other embodiments may take into account any one or more of these factors as well as apply the techniques described herein to other factors that may be relevant in a particular embodiment or other application although in this example, the factors of torque, airspeed and Nr are taken into account.

An equation representing a model minimizing the sum of square error of a measured CI for a given torque value in a healthy gear box is:

$$CI = B_0 + B_1 * \text{Torque} + B_2 Nr + B_3 \text{Airspeed} + T.E \quad \text{(Equation 1)}$$

The order of the model may be determined by statistical significance of the coefficients of Equation 1. In the previous equation, the T.E. of a "healthy" component may have, for example, a mean of zero (0) with some expected variance. It should be noted that if the model fits well for the lower order. Higher order coefficients are not required and may actually induce error in some instances. The following example is built as a first order model, higher orders may be solved by extension of that explained in the first order model. This model, written in matrix format is: y=B×x where $$y = \begin{bmatrix} CI_1 \\ \vdots \\ CI_n \end{bmatrix}, B = [B_0 \ \ldots \ B_n] \text{ and } x = \begin{bmatrix} 1 & t_1 & N_{R1} & \text{Airspeed1} \\ 1 & \ldots & \ldots & \ldots \\ 1 & t_n & N_{Rn} & \text{Airspeed}n \end{bmatrix}$$

Each of the CIs included in the vector y is a particular recorded value for a CI from previous data acquisitions, for example, as may be stored and retrieved from the collected data 18. Also stored with each occurrence of a CI for a data acquisition in an embodiment may be a corresponding value for torque (t), Nr, and Airspeed. These values may also be stored in the collected data 18.

The model coefficients for B may be estimated by minimizing the sum of square error between the measured CI and the model or estimated CI using the observed performance data Solving the foregoing for the unbiased estimator of $B=(x^Tx)^{-1}x^Ty$. The variance of B is:

$$\text{Var}(B) = E(b-B)(b-B)^T = \sigma^2(x^Tx)^{-1}$$

where b is an unbiased estimator of B. The unbiased estimator of $\sigma^2$ is $s^2$, which may be determined by the following:

$$s^2 = \frac{e^T e}{n-p-1} = \frac{(y-\hat{y})^T(y-\hat{y})}{n-p-1} = \frac{y^T y - b^T x^T y}{n-p-1}$$

In the vector B from y=xB, coefficient $B_0$ represents the mean of the data set for a particular component which, for example, may be represented as an offset value. Each of the other values B1 . . . Bn are coefficients multiplied by the corresponding factors, such as airspeed, torque, and Nr.

The foregoing B values or coefficients may be determined at a time other than in real-time, for example, when flying a plane, and then subsequently stored, along with corresponding X information, for example, in the collected data store 18. These stored values may be used in determining a normalized CI value for a particular observed instance of a CIobs in determining an HI. The normalized CI may be represented as:

$$CI_{normalized} = T.E. = CIobs - (B^*x)$$

where CIobs represents an instance of a CI being normalized using previously determined and stored B and x values. Threshold values, as may be used, for example, in HI determination, may be expressed in terms of multiples of the standard deviation Warning=$B_0+3^*\sigma^2(x^tx)^{-1}$, Alarm=$B_0+6^*\sigma^2(x^tx)^{-1}$. It should be noted that a covariance that may be determined as:

$$\Sigma = s^2(x^tx)^{-1} \text{ where } s^2 \text{ is calculated as noted above.}$$

As described elsewhere herein, the foregoing techniques are based upon a healthy gear characterized as having noise that is stationary and Gaussian in which the noise approximates a normal distribution.

What will now be described are techniques that may be used in determining an HI using the normalized CI values as inputs using a hypothesis test method of HI generation. It should be noted that CI values other than normalized CI values may be used in connection with HI determination techniques described herein.

It should be noted that an embodiment may use CI values that are not normalized in connection with the HI determination techniques described herein. In this instance, multiple torque bands may be used, one for each CI or group of CIs belonging to different torque bands. Additionally, a larger covariance matrix may be used as there may be a larger variance causing decrease in separation between classes.

For any generic type of analysis (gear, bearing, or shaft), a subset of the diagnostics indicators or CIs is selected. The CIs which are best suited to specify the fault indication may be developed over time through data analysis. Faults may be calculated at the component level and an HI may be calculated for a given component. If there is a component fault, then there is a sub-assembly fault, and therefore a drive train fault.

The technique for HI determination may be referred to as Hypothesis testing technique for HI determination which minimizes the occurrence of a false alarm rate, or incorrectly diagnosing the health of a part as being included in the alarm classification when in fact the part is not in this particular state. In one embodiment, three classes of health indication may be used, for example, normal, warning and alarm classifications with alarm being the least "healthy" classification. Other embodiments may use the techniques described herein with a different number of classes. As described elsewhere herein, the class of a part indicating the health of the part may be determined based on measured vibrations associated with the part. Additionally, the technique described herein may use a transformation, such as the whitening transformation to maximize the class distributions or separation of values thus decreasing the likelihood or amount of overlap between the classes. In particular, this maximization of class separation or distance attempts to minimize the misclassification of a part. A description of the whitening transformation used in herein in following paragraphs may be found, for example, in "Detection, Estimation and Modulation Theory", Harry L. Van Trees, 1968, John Wiley & Sons, New York Library of Congress Catalog Card Number 67-23331.

Using the Hypothesis Testing method of HI generation, the HI or classification h(X) of a vector of normalized CI values denoted as X may be determined in which, as discussed elsewhere herein in more detail, X may be normalized Using the hypothesis testing technique, a determination is made as to which class (normal, warning or alarm) X belongs. In our instance, there are three classes. However, a first determination using the hypothesis testing may be performed using a first class corresponding to normal, and a second class corresponding to not normal. If the determination is normal, then testing may stop. Otherwise, if determination is made that the testing results are "not normal", a further or second determination using the hypothesis testing may be performed to determine which "not normal" class (alarm or warning) X belongs. Thus, the hypothesis testing technique may be performed more than once in accordance with the particular number of classes of an embodiment. For three classes, there are two degrees of freedom such that if the sample X is not from A or B classes, then it is from Class C.

X may belong to class $\omega_1$ or $\omega_2$, such that:

$$q_1(X) \underset{\omega_2}{\overset{\omega_1}{\lessgtr}} q_2(X)$$

The notation $$\underset{\omega_2}{\overset{\omega_1}{\lessgtr}}$$

means that if $q_1(X)$ is greater than $q_2(X)$, choose class 2, $\omega_2$, or if $q_1(X)$ is less than $q_2(X)$, choose class 1, $\omega_1$. In the foregoing, $q_1$ is the a posteriori probability of $\omega_1$ given X, which can be computed, using Bayes theorem in which $q_i = P_i p_i(X)/p(X)$, where p(X) is the mixed density function.

The mixed density function is the probability function for all cases where $q_i$ is the unconditional probability of "i" given the probability of "i" conditioned on the mixed density function.

Substituting the foregoing representation of each $q_1$ and $q_2$, since p(X) is common to both, now:

$$P_1 p_1(X) \underset{\omega_2}{\overset{\omega_1}{\lessgtr}} P_2 p_2(X)$$

or as a likelihood as:

$$l(X) = \frac{p_1(X)}{p_2(X)} \underset{\omega_2}{\overset{\omega_1}{\lessgtr}} \frac{P_2}{P_1}$$

The likelihood function ratio is a quantity in hypothesis test. The value $P_2/P_1$ is the threshold value. In some instances, it may be easier to calculate the minus log likelihood ratio. In this case, the decision rule becomes (e.g. now called the discriminate function):

$$h(X) = -\ln l(X) = -\ln p_1(X) + \ln p_2(X) \underset{\omega_2}{\overset{\omega_1}{\lessgtr}} \ln \frac{P_2}{P_1}$$

Assume that the $p_i(X)$'s are normally distributed with mean or expected values in vectors $M_i$, and covariance matrix $\Sigma_i$. This assumption may be determined without loss of generality in that, any non-normal distribution can be whitened, as with the whitening transformation described elsewhere herein, with the appropriate power transform, or by increasing the sample size to the point where the sample size is very large. Given this, the decision rule becomes:

$$h(X) = -\ln l(X)$$
$$= \frac{1}{2}(X - M_1)^T \sum_1^{-1}(X - M_1) - \frac{1}{2}(X - M_2)^T \Sigma_2^{-1}(X - M_2) +$$
$$\frac{1}{2} \ln \frac{|\Sigma_1|}{|\Sigma_2|} \underset{\omega_2}{\overset{\omega_1}{\lessgtr}} \ln \frac{P_2}{P_1}$$

Recall that maximization of distance between the two classes is desired to minimize the chance of a false alarm or misclassification of a part as broken when it is actually normal.

A function Z is defined as Z=X−M, (e.g. a shift where X is the measured CI data and M is the mean CI values for a class), so that:

$d_z^2(z)=Z^T\Sigma^{-1}Z$ (this distance is the n dimensional distance between two distributions).

Note that $\Sigma$ represents the covariance. It may be determined that a particular Z maximizes the distance function, subject to $Z^T Z=I$, the identity matrix.

Using a standard Lagrange multiplier, $\mu$, to find the local extrema (e.g. the maximum) a partial derivative is obtained with respect to Z in the following:

$$\partial/\partial Z\{Z^T\Sigma^{-1}Z-\mu(Z^TZ-I)\}=2\Sigma^{-1}Z-2\mu Z$$

where $\Sigma$ is the eigenvector of X, which may then be set to zero to find the extrema and solving for Z:

$\Sigma^{-1}Z=\mu Z$ or $\Sigma Z=\lambda Z$ where $\lambda=1/\mu$. In order that a non-null Z exits, $\lambda$ must be chosen to satisfy the determinant:

$$|\Sigma-\lambda I|=0.$$

Note that $\lambda$ is the eigenvalue of X and $\Sigma$ is the corresponding eigenvector. $\Sigma$ is a symmetric n×n matrix (e.g. a covariance matrix), there are n real eigenvalues ($\lambda_1 \ldots \lambda_2$) and n real eigenvectors $\phi_1 \ldots \phi_n$. the characteristic equation is: $\Sigma\Phi=\Phi\Lambda$, and $\Phi^T\Phi=I$ where $\Phi$ is an n×n matrix consisting of n eigenvectors and $\Lambda$ is a diagonal matrix of eigenvalues (e.g. the eigenvector matrix and eigenvalue matrix, respectively).

Y, representing the coordinated shifted value of X, may be represented as:

$$Y=\Phi^T X,$$

having a covariance matrix of y, $\Sigma_y=\Phi^T\Sigma_x\Phi=\Lambda$ where $\Sigma_x$ represents the covariance of the vector of matrix x. Continuing, the whitening transformation may be defined such that:

$$Y=\Lambda^{-1/2}\Phi^T X=(\Phi\Lambda^{-1/2})^T X, \Sigma_y=\Lambda^{-1/2}\Phi^T\Sigma_x\Phi\Lambda^{-1/2}=$$
$$\Lambda^{-1/2}\Lambda\Lambda^{-1/2}=I,$$

Thus the transformation that maximizes that distance between distribution or classes is:
$A=\Lambda^{-1/2}\Phi^T$ as shown above.

Using this value of A, define $$A^T\Sigma_1 A=I, A^T\Sigma_2 A=K, \text{ and } A^T(M_2-M_1)=L \text{ and}$$

$(\Sigma_1^{-1}\Sigma_2^{-1})^{-1}$ transformed to a diagonal matrix $\Lambda$ by A that may be represented as:

$$\Lambda=A^T[A(I-K^{-1})A^T]^{-1}A=(I-K^{-1})^{-1}$$

which may be substituted into the discriminate function defined above:

$$h(X)=\tfrac{1}{2}Y^T\Lambda^{-1}Y-[(-K^{-1}L)^T]Y+[-\tfrac{1}{2}L^T K^{-1}L-\tfrac{1}{2}\ln|K|-\ln P_2/P_1]$$

Thus, if the above is less than the threshold, for example, ln $P_2/P_1$), then the component is a member of the normal or healthy class. Otherwise, the component is classified as having an HI in the broken class, such as one of alarm or warning. In the latter case, another iteration of the hypothesis testing technique described herein may be further performed to determine which "broken" classification, such as alarm or warning in this instance, characterizes the health of the component under consideration.

In the foregoing technique for hypothesis testing, values, such as the a posteriori probabilities $q_1$ and $q_2$, may be obtained and determined prior to executing the hypothesis testing technique on a particular set of CI normalized values represented as X above. As known to those of ordinary skill in the art, Bayes theorem may be used in determining, for example, how likely a cause is given that an effect has occurred. In this example, the effect is the particular CI normalized values and it is being determined how likely each particular cause, such as a normal or broken part, given the particular effects.

It should be noted that operating characteristics of a system define the probability of a false alarm (PFA) and the probability of detection (PD). The transformation used to maximize the distance function optimizes the discrimination between classes. However, the threshold value selected given a discriminate function may be used in determining the PD and PFA. In some embodiments, the cost of a false alarm may be higher than the cost of a missed detection. In these instances, the PFA may be set to define threshold values, and then accept the PD (e.g., a constant false alarm rate (CFAR) type of process). The distance function is a normal density function, based on the conditional covariance of the tested values under consideration. Given that, the PFA may be determined as:

$P_F = P(H_0 H_1)$, which means the probability that the sufficient statistic is greater than some threshold is the integral of the threshold to infinity of a normal PDF.

$$P_{FA} = \int_\alpha^\infty p_{1|H_O}(l|H_O) dL = \int_\alpha^\infty 1/2\pi \exp(-x^2/2) dx$$

where
the lower integral limit of $\alpha = \ln(P_1/P_2)/d + d/2$, and, as before $d^2 = (M_2-M_1)^T \Sigma_1 31\ 1(M_2-M_1)$ In this example, the threshold may be the $\ln(P_2/P_1)$. This integration is the incomplete gamma function. Conversely, the probability of a detection (PD) is:

$$P_D = \int_\infty^\alpha p_{1|H_1}(l|H_1) dL = \int_\infty^\alpha 1/2\pi \exp(-(d)^2/2) dx$$

but now $\alpha = \ln(P_2/P_1)/d + d/2$, and $d^2 = (M_1-M_2)^T \Sigma_2^{-1}(M_1-M_2)$ Note, the distance function is relative to the condition (e.g. H.sub.0 or H.sub.1) being investigated.

Figure 26:
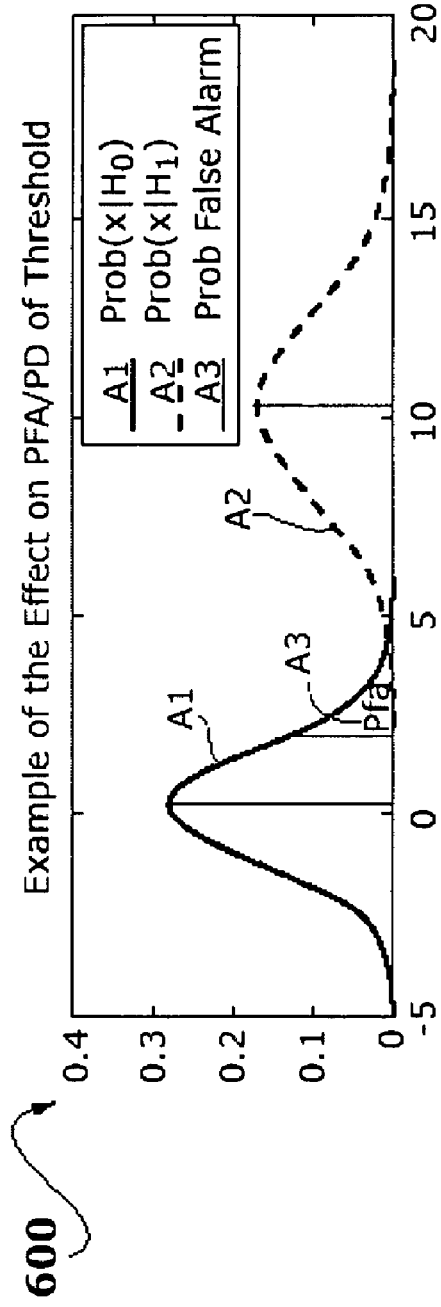
FIG. 26 is a graphical illustration of the probability of a false alarm (PFA) in one example.

Referring now to FIG. 26, shown is an example of a graphical illustration of the probability of a false alarm PFA represented by the shaded region A3 which designates the overlap between the distribution of class H0, denoted by the curve formed by line A1, and class H1, denoted by the curve formed by line A2.

Figure 27:
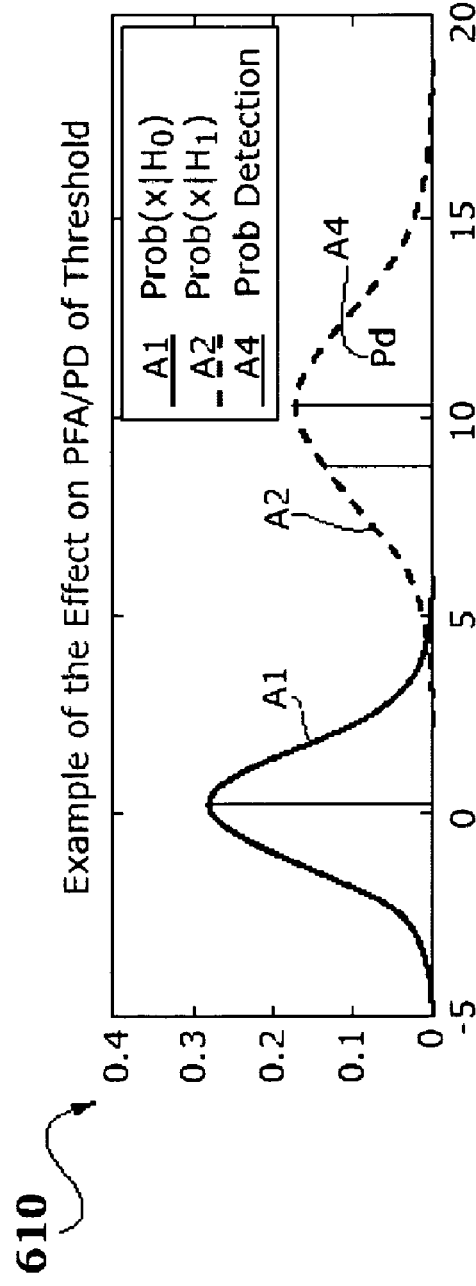
FIG. 27 is a graphical illustration of the probability of detection (PD) in one example.

Referring now to FIG. 27, shown is an example of a graphical illustration of the probability of an appropriate detection (PD) represented as area A4 as belonging to class represented by H1 as represented by the curve formed by line A2.

Figure 28:
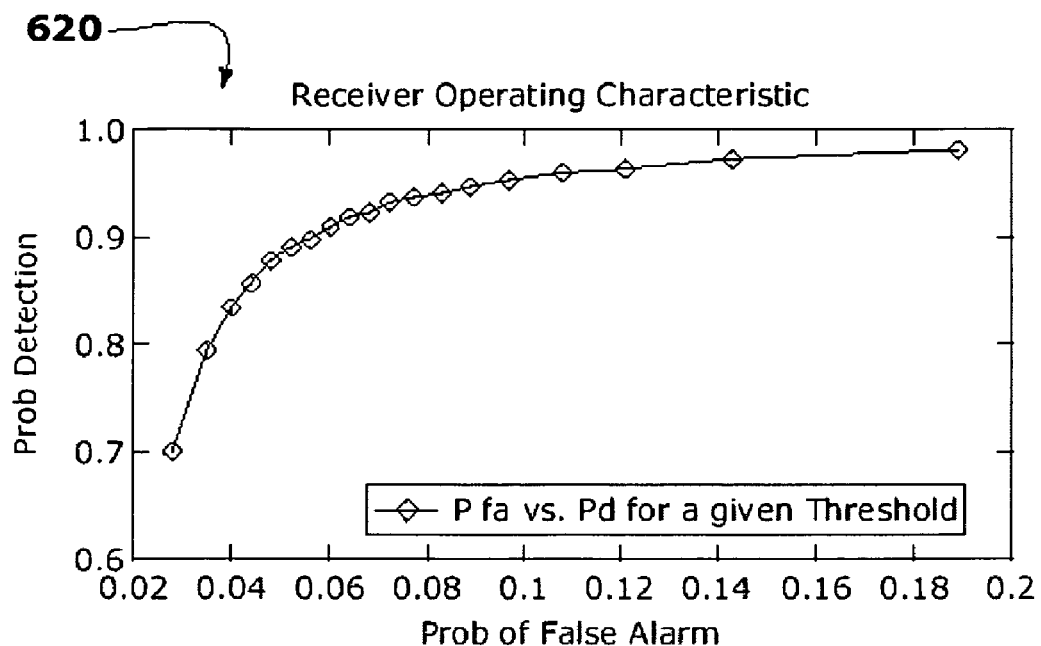
FIG. 28 is a graphical illustration of the relationship between PD and PFA and threshold values in one embodiment.

Referring now to FIG. 28, shown is a graphical illustration of a relationship in one embodiment between the PFA and PD and the threshold value. Note that as the threshold increases, the PD increases, but also the PFA increases. If the performance is not acceptable, such as the PFA is too high, an alternative is to increase the dimensionality of the classifier, such as by increasing the population sample size, n. Since the variance is related by 1/sqroot(n), as n increases the variance is decreased and the normalized distance between the distributions will increase. This may characterize the performance of the system. The likelihood ratio test used herein is a signal to noise ratio such that the larger the ratio, (e.g., the larger the distance between the two distributions), the greater the system performance. The process of taking an orthonormal transformation may be characterized as similar to the of a matched filter maximizing the signal to noise ratio.

Figure 29:
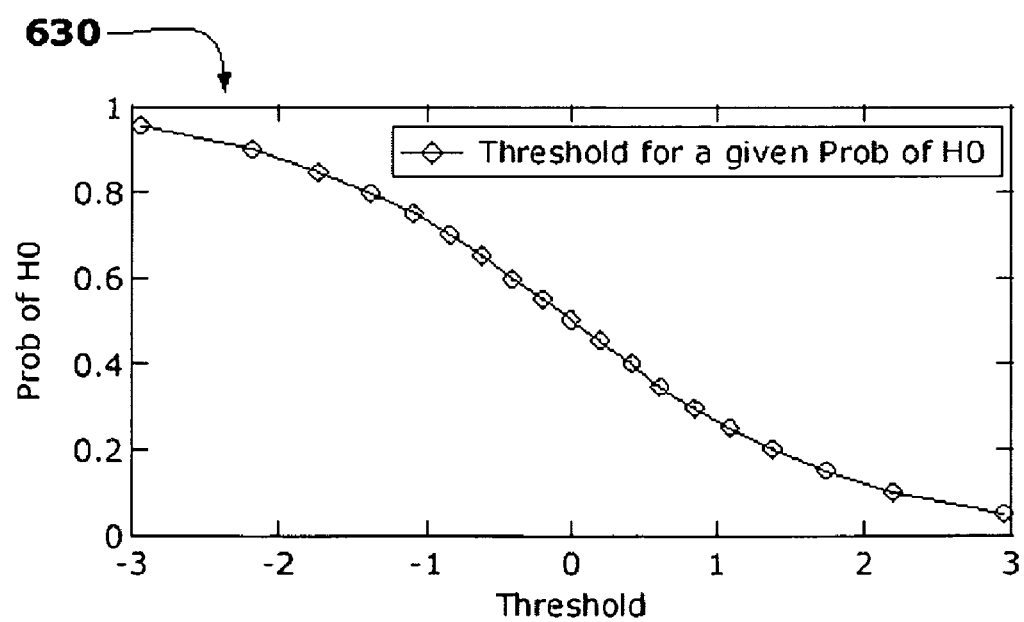
FIG. 29 is an graphical illustration of the probability of Ho and threshold values in one embodiment.

Referring now to FIG. 29, shown is an example of a graphical illustration of how the threshold may vary in accordance with the probability of determining class H0.

It should be noted that false alarm rate and detection rate are two factors that may affect selection of particular values, such as thresholds within a particular system. In the example embodiment described herein, false alarm rate is a determining factor, for example, because of the high cost associated with false alarms and the fact that they may corrode confidence when a real fault is detected. It should be noted that other embodiments and other applications may have different considerations. Further in this example of the system of FIG. 1, certain factors may be considered. An acceptable false alarm rate, for example, such as 1 false alarm per 100 flight hours, is established. An estimate of the number of collection opportunities per flight hours may be determined, such as four data collections. A number of HIs may be selected for the system, such as approximately 800. A confidence level may be selected, such as that there is a 90% probability that a false alarm rate is less than 1 per 100 flight hours.

In this example, it should be noted that each HI is a an independent classification event such that the law of total probability may give the system alarm rate using the foregoing:

System PFA = $1/(100*4*800) = 3.1250*10^{-6}$.

It should also be noted that in the foregoing, when the covariance of two classes is approximately the same, or for example, unknown for a class, the logarithm likelihood ratio test for classification may be simplified in that the model may be reduced to a linear rather than quadratic problem having the following model:

$$(M_2 - M_1)^T \Sigma^{-1} X + \frac{1}{2}(M_1^T \Sigma^{-1} M_1 - M_2^T \Sigma^{-1} M_2) \underset{\omega_2}{\overset{\omega_1}{\lessgtr}} \ln \frac{P_2}{P_1}$$

If the covariance is whitened, the model simplifies further (assuming the appropriate transformation is made to the means and measured values).

$$(M_2 - M_1)^T X + \frac{1}{2}(M_1^T M_1 - M_2^T M_2) \underset{\omega_2}{\overset{\omega_1}{\lessgtr}} \ln \frac{P_2}{P_1}$$

What will now be described are techniques that may be used in connection with selecting a subset of CIs, such as selection of normalized CIs, for example, under consideration for use in determining a particular HI.

If we have a two or more classes (such as alarm, warning and normal classifications), feature extraction, or determining which CIs to use in this embodiment, may become a problem of picking those CIs or features that maximize class separability. Note that separability is not a distance. As described elsewhere herein, an eigenvector matrix transformation may be used in maximizing the distance between two functions or distribution classes. However, this same technique may not be applicable when some of the information (e.g. dimensionality) is being reduced. For example, in the following test case, three features, or CIs, are available, but only two are to be selected and used in determining HI classification. The distributions are:

$$Cov_1 = \begin{bmatrix} 1 & -.5 & .5 \\ -.5 & 2 & .8 \\ .5 & .8 & 2.5 \end{bmatrix}, M_1 = \begin{bmatrix} 0 \\ 0 \\ 0 \end{bmatrix},$$

$$Cov_2 = \begin{bmatrix} 1 & .7 & .7 \\ .7 & 2.5 & 1 \\ .7 & 1 & 2.5 \end{bmatrix}, M_2 = \begin{bmatrix} 3 \\ -1 \\ 3 \end{bmatrix}$$

When looking at the eigenvalues of the whitening transformation (1.9311, 3.0945, 0.4744), the maximum distance of the distribution is an axis y (e.g. $2^{nd}$ dimension, the distribution was whitened and the project dimension (e.g. x, y or z) was plotted), but this axis has the minimum separability. Using this as one of the two features will result in higher false alarm rates than another feature. This may identify the importance of feature selection in maximizing the separability.

The problem of separability may be characterized as a "mixed" problem in that differences in means may be normalized by different class covariance. If the mean values are the same, or the covariance are the same, techniques such as the Bhattacharyya Distance may be used to measure class separability. However, same mean or covariance values may not be likely and thus such techniques may not be applicable. Statistical tools developed in discriminant analysis may be used to estimate class separability.

A measure of within class scatter may be represented as the weighted average of the class co variance:

$$S_w = \sum_{i=1}^{L} P_i \Sigma_i,$$

for each class I, where Pi is the probability of the occurrence of the covariance $\Sigma_1$ for that class. In one embodiment, there may be two classes, such as healthy or unhealthy. When considering the unhealthy status, for example, when performing a second round of hypothesis testing described herein, there may be alarm and warning classes.

A measure of between class scatter, Sb, may be represented as the mixture of class means:

$$S_b = \sum_{i=1}^{L} P_i (M_i - M_0)(M_i - M_0)^T, \ M_0 = \sum_{i=1}^{L} P_i M_i.$$

Note that M0 represents the mean or expected value of the classes and Mi−M0 is a difference or variation from the expected value for the classes under consideration. The formulation for a criteria for class separability may result in values that are larger when the between class scatter is larger, or when the within class scatter is smaller. A typical criteria for this is J=diag($S_w^{-1} S_b$), where In general, $S_w$ is not diagonal. One technique takes the whitening transformation of $S_w$ where $A^T S_w A = I$, then define the whitening transformation of Sb as:

$$S_{bw} = A_T S_b A.$$

Now taking the diagonal of the foregoing Sbw gives a better representation of the class separability of each feature.

In summary, CIs may be selected in accordance with the technique described above to obtain and examine the diagonals of the "whitened" Sb, represented as Sbw. Let X be a matrix where rows and columns represent different CIs having a covariance matrix Σ. An embodiment may use normalized CIs and select a portion of these for use. An embodiment may also use CIs however, those selected should belong to the same torque band.

As described elsewhere herein, let A represent the corresponding eigenvalue matrix and Φ as the corresponding eigenvector matrix for the CI matrix X. Then, A, as described elsewhere herein in connection with the whitening transformation, may be represented as:

$$A = \Lambda^{-1/2} \Phi^T$$

where A is the transformation matrix that whitens the covariance Σ. If Sb is defined as above as the between mean covariance of the classes, the whitening matrix A may be used to normalize the differences and give a distance between the mean values of the different classes, such that $$Sbw = A^T Sb A$$

where Sbw represents the "whitened" Sb. The diagonals of Sbw may then be sorted in descending order in which each diagonal represents an approximation of the size of the separation between features or CIs. Thus, selection of a subset of "n" features or CIs from a possible "m" maximum CIs included in X may be determined by selecting the "n" largest diagonals of the matrix Sbw. In particular, the diagonal entry 1,1 corresponds to the first column of the covariance matrix and the first CI in the vector X, entry 2,2 to the second column of the covariance matrix and the second CI in the vector X being considered, and so on.

Once a particular HI is determined at a point in time, it may be desired to use techniques in connection with trending or predicting HI values of the component at future points in time. Techniques, such as trending, may be used in establishing, for example, when maintenance or replacement of a component may be expected. As described elsewhere herein, techniques may be used in determining an HI in accordance with a vector of CI values having expected CI values included in vector M, for a given HI classification, i, having a covariance matrix $\Sigma_1$. One technique uses a three state Kalman filter for predicting or trending future HI values.

The Kalman filter may be used for various reasons due to the particular factors taken into account in the embodiment and uses described herein. It should be noted that other systems embodying concepts and techniques described herein may also take into account other noise factors. In one embodiment, the Kalman filter may be preferred in that it provides for taking into account the noise of a particular arrangement of components. There may be noise corruption, such as indicated, for example, by the covariance matrices described and used herein. It may be desirous to filter out such known noise, such as using the Kalman filter, providing for smoothing of data values.

The Kalman filter provides a way to take into account other apriori knowledge of the system described herein. In particular, the health of a component, for example, may not change quickly with time. The difference between the health of a component at a time t, and time t+delta may not be large. This technique may also be used in connection with determining future HIs of a particular part, for example, where the part is old. A part may have reached a particular state of relatively bad health, but still a working and functional part. The techniques described herein may be used with an older part, for example, as well as a newer part.

In the arrangement with the Kalman filter, state reconstruction may be performed using the Ricatti equation, as known to those of ordinary skill in the art. The technique that is described herein uses a three-state Kalman filter of HI, and the first and second derivatives thereof with respect to changes in time, denoted, respectively, $dt^2$ and $dt^3$. The Ricatti equation in this instance uses a [1×3] vector of time values rather than a single value, for example, as may be used in connection with a single state Kalman filter. What will now be described are equations and values that may be used in determining a future value of a particular HI. Let:

$$H = [1 \ 0 \ 0]$$

$$\Phi = \begin{bmatrix} 1 & dt & dt^2/2 \\ 0 & 1 & dt \\ 0 & 0 & 1 \end{bmatrix}$$

$$Q = 2\sigma^2 \bar{t} \begin{bmatrix} dt^3/2 & dt^2/2 & \bar{t} \\ dt^2/2 & dt & 1 \\ \bar{t} & 1 & 1/\bar{t} \end{bmatrix}$$

$$X = \begin{bmatrix} HI\_est \\ \dot{HI} \\ \ddot{HI} \end{bmatrix}$$

in which:

σ is the power spectral density of the system,
R is the measurement error,
P is the covariance, Q is the plant noise,
H is the measurement matrix,
K is the Kalman gain, and
Φ is the state transition matrix.

H may be characterized as the Jacobian matrix. Since the value of a single HI is desired, only the first entry in the H vector is 1 with remaining zeroes. There are n entries in the n.times.1 vector H for the n state Kalman filter. Similarly, the X vector above is column vector of 3 HI entries in accordance with the three-state Kalman filter. The end value being determined is the vector X, in this instance which represents a series of HI values, for which the first entry, HI_est in the vector X is the one of interest as a projected HI value being determined. Within the vector X, HI represents the first derivative of HI_est and HI represents the second derivative of HI_est. t represents the average amount of time between measurements or updating of the HI value. In other words, if dt represents a measurement or delta value in units of time between HI determinations, and this is performed for several instances, t represents the average of the delta values representing time changes.

In another embodiment, the functional relationship associated with Paris' law for fatigue crack growth can be used as a basis for determining a health indicator data based on future time.

Paris' law has been used to determine a rate of crack growth as a component is subjected to repetitive fatigue conditions. As a material, such as a metal coupon, is subjected to repetitive or cyclic fatigues, or forces, such as a repetitive or cyclic bending force, a crack can develop in the material. Paris' law can be used to predict the growth rate of the generated crack in the material. As such, Paris' law can also be used to determine the length of the generated crack, i.e., the crack length, after a particular number of cycles of the bending force have occurred. For example, consider a coupon of metal where the size and shape of the sheet, as well as one or more characteristics of the composition of the metal, are known. The exemplary metal coupon can be subjected to a repetitive or cyclic bending where characteristics of the bending are also known. Given these conditions, Paris' law can be used to predict the growth of a crack, such as the change in the length of a crack that may develop in the metal, as a result of each bending cycle.

The determination of the change in crack length given a number of bending cycles, more generally known as fatigue cycles, can also provide information that can assist in determining when a failure of a material will occur, since a relationship can exist between crack length and failure. Further, when Paris' law is applied to a synchronous system, i.e., where the fatigue cycles occur at regular intervals of time, the change in crack length can be determined at a particular time, and a future time can be established. As such, where the characteristics of the material and the fatigue being placed on the material are known, Paris' law can be used to predict the crack length in the material at a given number of fatigue cycles or at a given time in synchronous systems.

Paris' law can be described mathematically as:

$$d\alpha/dN = D(\Delta K)^m$$

where $\alpha$ is the half crack length, N is the number of fatigue cycles, $d\alpha/dN$ is the rate of change of the half crack length with respect to the number of fatigue cycles, D is a material constant of the crack growth equation and a crack geometry, and m is an exponent that may be selected based on the material type to be analyzed. Also in the above, $\Delta K$ is the range of a stress intensity factor K, where K may be based on a loading state. In this regard, $\Delta K$ can be described mathematically as $\Delta K = 2\sigma\alpha(\pi\alpha)^{1/2}$, where $\sigma$ is the gross strain and $\alpha$ is a geometric correction factor.

While effective application of Paris' law is possible in closely-controlled laboratory-type settings, application of Paris' law to real world conditions can be problematic because many of the material characteristics and the fatigue characteristics may not be accurately known. As such, in order to make use of the functional relationship present in Paris' law in real world applications, substitutions and manipulations of the variables involved can be utilized. In an embodiment, various means can be used to determine the variables or the substitutions for the variables to implement a functional relationship between future time and health indicators, where the functional relationship is determined by utilizing Paris' law as a basis.

According to various exemplary embodiments, assumptions and manipulations can be applied to Paris' law to determine a future time. For example, the Paris' law exponent m can be set to various values depending on the exemplary embodiment that may be utilized. However, in situations where the stress or force on a component is substantially constant throughout the failure of the component, the Paris' law exponent may be set to two. Exemplary components where the stress or force on the component may be constant throughout the failure of the component may include wing spars, wing panels, gears, shafts, some shaft couplings, and the like. Further, in situations where the stress or force on a component decreases throughout the failure of the component (e.g., in situations where the component is no longer supporting some or all the stress or load), the Paris' law exponent may be set to one-half. Exemplary components where the stress or force on the component may decrease throughout the failure of the component may include bearings, spline shaft couplings, and the like.

Regardless of the selected value, in some embodiments, the exponent can be tested such that the best model fit is chosen. For example, the geometric correction factor $\alpha$ can be set to one. After performing the substitutions, where the exponent of the crack growth equation is set to two and the geometric correction factor is set to one, Paris' law can reduce to:

$$d\alpha/dN = D(4\sigma^2\pi\alpha)$$

Since, as discussed above, in synchronous systems the number of cycles can be used to determine a time to a particular crack length, the equation can be solved for the number of fatigue cycles N resulting in:

$$N = (1/(D(4\sigma^2\pi\alpha)))(\ln(\alpha_f) - \ln(\alpha_0))$$

where $\alpha_f$ is the future crack length and $\alpha_o$ is the current, measured crack length. In this form, and considering a synchronous system, the time until a desired crack length occurs can be calculated and, by association, a future time can be determined. However, since crack length cannot easily be measured, and a desired crack length may not be known with respect to a future time, an additional substitution with respect to crack length can be utilized.

According to various exemplary embodiments, a health indicator can be substituted for crack length in Paris' law. A relationship can exist between component failure and health indicators where the health indicators are based upon, for example, vibration data and damage to components. As such, component health can be used as a surrogate for crack length in Paris' law, and future time can be determined as a function of the health indicator of a component. To condition the health indicator for this use, the health indicator can be normalized to within a range of values including a threshold value. The threshold value can be a value selected within the range of values, such that when the threshold value is reached or exceeded action can be taken with respect to the related component, such as, for example, maintenance can be performed. For example, a threshold value of 0.9 can be selected where the health indicator ranges from 0.0 to 1.0. Exceeding the threshold value can indicate that a high probability exists that the component may be damaged. Using such a conditional health indicator in conjunction with Paris' law can result in a determination of future time with respect to a particular component based on a prediction of when the health indicator will reach the threshold value. Note that the use of such conditioning to indicate a need for maintenance is merely exemplary and other conditioning definitions or policies may be utilized.

What will now be presented are equations representing the relationships between the above quantities as may be used in determining a value of X(1) for predicting or estimating an HI value at a future point in time given a current HI value.

$$X_{t|t-1} = \Phi X_{t-1|t-1} \quad \text{(Equation T1)}$$

$$P_{t|t-1} = \Phi P_{t-1|t-1} \Phi^T + Q \quad \text{(Equation T2)}$$

$$K = P_{t|t-1} H^T (H P_{t|t-1} H^T + R) \quad \text{(Equation T3)}$$

$$P_{t|t} = (I - KH) P_{t|t-1} \quad \text{(Equation T4)}$$

$$X_{t|t} = X_{t|t-1} + K(\text{HI} - H X_{t|t-1}) \quad \text{(Equation T5)}$$

Note that the subscript notation above, for example, such as "t|t−1" refers to determining a value of at a time t conditioned on the measurement at a time of "t−1". Similarly, "t|t" refers to, for example, determining an estimate at a time "t" conditioned on a measurement of time "t".

The current HI determined, for example, using other techniques described herein, may be input into Equation T5 to obtain a projected value for HI_est, the best estimate of the current HI. To project the expect HI "n" units of time into the future, input the number of units of time "dt" into $\Phi$ (as described above), and use the state update equation (Equation T1) where now Equation T1 becomes: $X_{t+dt|t} = \Phi X_{t|t}$. This allows the best prediction of HI_est any number of units of time into the future where HI_est is desired. It should be noted that as set forth above, the linear matrix operation such as $\Phi X$ is equivalent to an integration from t to dt of the state of X, where X represents the vector of HI values set forth above.

Different values may be selected for initial conditions in accordance with each embodiment. For example, an initial value for P representing the covariance may be (1/mean time value between failures). An embodiment may use any one of a variety of different techniques to select an initial value for P. Additionally, since P converges rapidly to an appropriate value and the time between data acquisitions is small in comparison to the mean failure time, selecting a particularly good initial value for P may not be as important as other initial conditions. A value for a may be selecting in accordance with apriori information, such as manufacturer's data on the mean time between component parts' expected failure time. For example, for a transmission, the mean failure time may be approximately 20,000 hours. The spectral density may be set to (1/20,000).sup.2. It should be noted that the failure rates may be generally characterized as an exponential type of distribution. The mean time between expected failures is a rate, and the variance is that rate to the second power. R may also be determined using apriori information, such as manufacturer's data, for example, an estimated HI variance of manufacturer's data of a healthy component. Q may be characterized as the mean time between failures and dt (delta change in time between readings). As the value of dt increases, Q increases by the third power.

Input data used in the foregoing trending equations may be retrieved from collected data, for example, as may be stored in the system of FIG. 1.

In determining HIs, for example, as in connection with the system of FIG. 1 for particular components, HIs may be derived using one or more CIs. In calculating CIs, data acquisitions may occur by recording observed data values using sensors that monitor different components. There may be a need for estimating data used in connection with CI calculations, for example, in instances in which there may be too little or no observed empirical data. For example, in connection with a power train, there may be a need to obtain estimated data, for example, for each bearing, shaft and gear within the power train to calculate CIs. However, insufficient empirical data may exist in connection with gear or bearing related measurements, such as, for example, those in connection with a gear or bearing related measurements, such as, for example, those in connection with a gear or bearing fault due to the rare occurrence of such events. In such instances, mean and threshold values may be derived using other techniques.

Because the envelope may consist of real and imaginary frequencies, the magnitude for nominal components may be modeled using a Rayleigh distribution. Thus, it may be possible to set thresholds for bearing vibration data by knowing or calculating the standard deviation of the data collected when the bearing components are healthy and by having a target positive false alarm rate.

It is also possible to extend the techniques described herein to take into account the covariance of related, but different, CI. For example, in the case of CI's associated with different orders of shaft vibration data, generally when vibrations associated with one shaft order increase, then vibrations associated with other shaft orders also increase.

It would be useful to be able to use the Raleigh distribution in connection with multiple related CI's. The following equation, like the similar equation above, represents that probability of vibration energy being measured as M or less when a component is healthy. However, in this case, M is an n×1 matrix representing n related CI's and F(M) is the probability that one of the values for the matrix M will exceed a threshold.

$$F(M) = 1 - \exp(-0.5 M^T \Sigma^{-1} M)$$

where $\Sigma^{-1}$ represents the inverse of the covariance matrix. Determination of $\Sigma$ given values of data corresponding to healthy components is described below.

Since M is a matrix, setting the thresholds for each matrix value is a little more complicated than in the one dimensional case (no assumed covariance) described above. However, this may be done by first assuming that the threshold values are a scalar value, X, multiplied by the average (mean) value for each element. If M0 is an array of mean values and M1 is an array of thresholds, then:

$$M1 = X * M0$$

M0 may be easily determined. X may be determined using the following equation:

$$X = \sqrt{2 \cdot \ln(1 - \text{PFA}) / (M0^T \Sigma^{-1} M0)}$$

where PFA is the probability of a false alarm when a component is healthy (i.e., a value used for F(M)).

The covariance may be based on the underlying Gaussian distributions (e.g. Beta, β). The value of β for a given CI and it's correlation to the other CI's may be estimated from nominal (healthy) component data. Note that there may be a relationship between expected value and variance in the Rayleigh distribution. Because expectation may be more consistent (e.g. converges faster) than variance, the expected value of a CI may be used to calculate $\beta$:

$$\beta_i = E[CI_i]/\sqrt{\pi/2}$$

where $E[CI_i]$ is the expected value (average value) for $CI_i$.

The correlation can be calculated by first estimating the Rayleigh covariance (defined as COV and distinct underlying Gaussian covariance $\Sigma$)

$$COV_{i,j} = \frac{\sum_{n=1}^{numsamples}(CI_{i,n} - E[CI_i])*(CI_{j,n} - E[CI_j])}{numsamples}$$

then correlation is:

$$\rho_{i,j} = COV_{i,j}/\sigma_i\sigma_j$$

where $\sigma_i$ is the standard deviation of $CI_i$ and $\sigma_j$ the standard deviation of $CI_j$.

Finally, the Gaussian covariance is then:

$$\Sigma_{i,j} = \rho_{i,j}\beta_i\beta_j$$

Note that, the Bayes Classifier used in connection with the Guasian distribution, as discussed above, may be extended to be used in connection with any distribution, including the Rayleigh distribution described herein.

In some cases, a relative measure of damage is more convenient for display than a raw CI value, or a log likely function. For example, it is possible to have a paradigm that provides that a part is damaged when the Health Indicator (HI) reaches 0.75. In such a case, it is relatively simple to use a log likely ratio to scale to the decision value. Since the log likely decision rules may have a threshold at zero, a simple rearrangement of the values, appropriately scaled, map the log likely function to a linear or quadratic HI function. Note that the Bayes classifier, as described elsewhere herein, is quadratic. Thus, the linear implementation of it is:

$$HI = \left[m^T(1/2(\Sigma_1^{-1} - \Sigma_0^{-1}))m \Big/ \ln\left(\frac{|\Sigma_0|}{|\Sigma_1|}\right)\right]^{.5} * 0.75$$

Note also that if there is a requirement that the system maintain some nominal false alarm rate, it is possible to define n-dimensional Rayleigh hypothesis test as follows:

$H_o$: HI<0.75 (e.g. the component in not in warning or alarm) vs.

$H_1$: HI>=0.75. (e.g. the component is in warning or alarm)

In some cases, it is possible to normalize the measured magnitude CI by the standard deviation of the CI. As the transformed CI now has a variance of 1, the $\sigma$=sqrt(1/(2-pi/2))=1.5264. If n number of CI were so normalized, the result would be n identical distributions, and a function that is another function of distributions. In order for the distribution to be independent, it is possible to remove any correlation and provide:

$$HI = \sqrt{M^T\Sigma^{-1}M}$$

or the square of the inner product of the measured CI and the inverse covariance.

The HI may have a distribution, such as a Nakagami distribution, defined as follows:

$$f(x) = 2/\Gamma(m)(m/\Omega)^m x^{2m-1} \exp(-mx^2/\Omega)$$

where x represents a measured value, m is the ratio of moments (sometimes called the fading figure) and $\Omega = E[x^2]$. If m=1, the Nakagami reverts to Rayleigh.

Interestingly, $\sigma$ may be calculated as follows:

$$\sigma = \sqrt{1/(2-\pi/2)} = 1.5264$$

and thus E[M] is determined as follows:

$$E[M] = 1.5264 * \sqrt{\pi/2} = 1.913$$

For n Rayleigh CI's, the mean value of the function of the distribution E[M]*n, and the variance (being normalized to one) is just n. From this, the Nakagami m is: m=E[M]/2 and $\Omega$=(variance*2)². Based on this, it is possible to calculate the probability distribution function for the n-Rayleigh hypothesis test, a cummulative distribution function, and a critical value for an expected false alarm rate.

In some cases, when a shaft (or similar component) becomes faulted, the measured shaft orders may no longer be zero. The Rayleigh distribution, as noted, assumes that the underlying Gaussian distribution has a zero mean. As such, it may be useful to assume a different model for a damaged component. This different model may be used for analysis once measured values have exceeded the thresholds set according to use of the Rayleigh distribution on data corresponding to healthy components as discussed elsewhere herein.

One possible function that may be used, a Rice distribution, is the following:

$$P(M) = M/\beta^2 \exp(-(M^2+s^2)/2\beta^2)I_o(Ms/\beta^2)$$

where $I_0$ is the 0-th order Bessel function of the first kind. The related cumulative distribution function is:

$$F(M) = 1 - Q_1(s/\beta, M/\beta)$$

where $Q_1$ is Marcum's Q function.

The expected value, M, and standard deviation, $\sigma$, of the Rice distribution is:

$$m = \sqrt{1.2\pi}((1+t)I_0(t/2) + tI_1(t/2))$$

and $$\sigma = \sqrt{2\beta^2 + s^2 - m^2}$$

where $t = \frac{1}{2} \times (s/\beta)^2$.

Estimating the non-centrality and $\beta$ may be provided by using the maximum likelihood estimator of the Rice distribution. This is an optimization problem to minimize the error of the log Rice distribution with the observed data.

In a general case, any function that maps one or more CI into an HI can be classified as a health algorithm. If the underlying distribution of the CI is known, the probability distribution function of the HI can be calculated. Given this, the mean value, variance and threshold for the HI can be set. As an example, a maximum of a set of independent, identical distributions is an Order Statistic (OS). The OS is a function of distributions, and can be found using known technique of the method of moment. The probability distribution function of the OS may be provided by:

$$g(x) = n[F(x)]^{n-1}f(n)$$

where n is the number of identical distributions being sampled.

Once the measured CIs are normalized by dividing by the CI standard deviation, the distributions are identical. The Rayleigh distribution shape parameter, $\beta$, is the variance in the underlying Gaussian distributions. The measured variance for the Rayleigh distribution is a function of $\beta$: $\sigma^2 = (2-\pi/2)*\beta^2$. Thus, dividing the CI by the standard deviation of the CI, the distribution are identical with:

$$\beta = \sqrt{(1/(2-\pi/2))} = 1.5264$$

The assumption of independence is not as strong. Independence requires that the correlation coefficients between CI be zero. Correlation coefficient may be defined as:

$$\rho_{x,y} = \frac{\sigma_{x,y}^2}{\sigma_x \sigma_y}$$

That said, in order to state that there is no covariance, (e.g. correlation is zero and that CI are independent), it is necessary to prove that $\rho$ is zero.

It is possible to define the null hypothesis as: $H_o$ $\rho=0$, and an alternative hypothesis: $H_1$ $\rho>0$. A testing procedure may then be verified using the known Pearson Produce Moment Correlation Coefficient as follows:

$$t = \rho\sqrt{n-2}/\sqrt{1-\rho^2}$$

where t is a t-statistic with n−2 degrees of freedom. Simply stated, if the confidence ($\alpha$) is 0.025 percent (e.g. only 2.5 percent chance that t>t-statistic(0.975,df) or t<t-statistic(0.25,df), the null hypothesis may be rejected. For large sample sizes (n>40), the t statistic may approach the Gaussian distribution. For shaft, it has been empirically determined that there is significant correlation between the shaft orders.

It is possible to calculate the covariance for a component across all aircraft (e.g. the grand covariance) and test this against each aircraft. As an example, the correlation coefficient associated with the covariance of an engine input shaft on an H-60 utility helicopter is:

$$\rho_{1,2}=0.1635, \rho_{1,3}=0.20, \rho_{2,3}=0.06,$$

Based on this, it is possible to test the hypothesis that the covariance for each aircraft is the same as the covariance (e.g correlation) across all aircraft: $H_o\rho_k=\rho_{Grand}$, (the populations represented by the two samples are equal) vs. the alternative hypothesis: $H_1\rho_k\,!=\rho_{Grand}$ (the populations are not equal). The test that may be used is:

$$z = \frac{z_{r1} - z_{r2}}{\sqrt{\frac{1}{n_1-3} - \frac{1}{\sqrt{n_2-3}}}}$$

where $z_{r1}$ is the Fisher transformed value for the correlation from the first population, and $z_{r2}$ is the Fisher transformed value for the correlation from the second population. The z is a normal Gaussian statistic. The following table shows values for an input shaft from a helicopter:

| A/C | Z $\rho_{1,2}$ | Z $\rho_{1,3}$ | Z $\rho_{2,3}$ |
|---|---|---|---|
| A/C 1 | −1.26312 | 0.08357 | 0.437397 |
| A/C 2 | −0.83769 | 0.61812 | −0.68272 |
| A/C 3 | 1.67684 | 2.334278 | 2.347031 |
| A/C 4 | 1.75394 | −1.72067 | 0.294251 |
| A/C 5 | −0.03613 | 1.24205 | −0.33697 |
| A/C 6 | −0.09852 | 1.86508 | 0.447039 |
| A/C 7 | −1.42555 | −0.95239 | 0.044004 |
| A/C 8 | 0.423071 | 0.17419 | 2.007472 |
| A/C 9 | −1.44741 | −0.88177 | −1.0162 |
| A/C 10 | −0.4552 | 4.21417 | −1.56725 |

The underlined statistics reject the null hypothesis (e.g. covariance is statistically different). It must be noted that, predominately, the covariance across aircraft are similar. Given that, the correlation is relatively small (see above). While this violates the condition of independence for the order statistic, it does not have a significant effect on the distribution OS when correlation is low, as is the case with the shaft.

It should be noted that it may be difficult to quantify analytically the effect of correlation. However, it may be possible to provide an experiment and derive the probability distribution function under correlation and compare the probability distribution function to the OS. It may be difficult to construct a correlated Rayleigh distribution, so a Gaussian may be used. The coloring process may be performed by multiplying a random Gaussian distribution by an inverse whitening matrix, then taking the OS of this correlated distribution. While the probability distribution functions are different, the critical values may be nearly the same.

In cases where the CI distribution is a Rayleigh distribution (such as for shafts), the probability density function is:

$$f(x)=x/\beta^2 \exp(-x/2\beta^2)$$

The Rayleigh cumulative distribution function is the integral of the probability distribution function:

$$F(x)=1-\exp(-x^2/2\beta^2)$$

(Note: F(x) is the same as F(M) used elsewhere herein).

Substituting the f(x), F(x) into the OS function gives an OS probability distribution function of:

$$f(x)=3[1-\exp(-x^2/2\beta^2)]^2 x/\beta^2 \exp(-x^2/2\beta^2)$$

The expected value and variance may then be explicitly be calculated as follows:

$$E[x] = \int_0^\infty x f(x) dx,$$

$$E[x^2] = \int_0^\infty x^2 f(x) dx,$$

$$V[x] = E[x^2] - E[x]^2$$

Using $\beta$ of 1.5264, the expected value is 2.785 and the variance is 0.784.

The OS PFA (probability of false alarm give a healthy) is one minus the cumulative distribution function. While there may be no close form inverse cumulative distribution function, it is a relatively simple procedure to select a threshold value x such that the PFA is any desired value.

It is possible to map the OS to an HI. Knowing the OS probability distribution function and cumulative distribution function, it is possible to tailor the health algorithm to provide a desired PFA. For example, consider a case where the best 5% components have zero HI (e.g. HI will track 95% of all components—the best 5% are not an issue). Additionally, it is desired that the system have a PFA for alarm of $10^{-3}$ (e.g. the HI reports Warning, when in fact the component is good with a probability of $10^{-3}$). Finally, alarm is defined at a HI value of 0.9. The two critical values are found using the cumulative distribution function. The cumulative distribution function for 0.05 is 1.463, while the PFA (1-CDF) for $10^{-3}$ is a value: 6.1. The HI algorithm becomes:

$$HI = \frac{[\max(so1/\sigma_{so1}, so2/\sigma_{so2}, so3/\sigma_{so3}) - 1.463]*.9}{(6.1 - 1.463)}$$

The HI mean value and variance are then:

$$E[HI]=(2.785-1.463)*(0.9/(6.1-1.463)=0.26$$

$$V[HI]=0.784*(0.9/(6.1-1.463))^2=0.029$$

In addition, knowing the probability distribution function for the HI value for nominal (healthy) components, it is possible to evaluate the performance of the system when one or more of the components have some wear. For example, it is possible to evaluate the PFA when a component is not nominal: e.g. when the true magnitude of the HI for the component is no longer zero, but some real value which does not require maintenance, say 2 Gs. While damaged, the component may not yet be in a state that requires repair. Note that, since the component does not require maintenance, a maintenance indication would be a false alarm. In this type of model, the Real and Imaginary parts of the Fourier transform associated with SO1, SO2 or SO3 may no longer zero. For example, the distribution may be:

$$Re \sim N(g_1, \beta)$$

$$Im \sim N(g_2, \beta)$$

where the true eccentricity is:

$$s = \sqrt{g_1^2 + g_2^2}$$

This distribution is related to the Rayleigh, and is known as the Rice distribution, described above.

Assuming that for a SO1 defect that the β is constant and that the SO1 variance from an engine input shaft has a value of 0.8881 (taken from historic data), then since the normalized SO1 value will be larger than the SO2/SO3 values (e.g. because the component is defective), it will drive the order statistic to approaching the Rice distribution. It is then possible to calculate the PFA (e.g. 1-CDF) using the Rice cumulative distribution function, with an s of 2G's, and a critical value of 5.7 G's. The 5.7 G's value is the critical value for a Rayleigh distribution exceeding 6.1 with normalized beta of 1.5264. The PFA would then be: 0.0085. If the SO1 was 4 G's, the PFA would be 0.148. Note that, as the component becomes more damaged, the probability of false alarm increases. This can be problematic for automated decision tools.

It is possible to make some simplifying assumptions as follows: The time between acquisitions is relatively constant (e.g., about eight per hour) so that T (delta time) may be set at eight per hour=0.125 hr. As noted elsewhere herein, the HI variance (e.g. measurement noise) may be calculated to be 0.029. The acceleration (i.e., how fast the system evolves) may be set to a value of 0.00005 by assuming that health for a damaged component would change from 0 to 1 in 100 hours, implying at rate of change of 0.01/hr. Acceleration is that: $0.5*0.01^2$, or 0.00005. The filter gain, K, may then be determined to be 0.0488, 0.0097, 0.0005 which is hard coded into the application. This reduced the HI variance to $0.0204*(0.0488)^2 = 4.8858e^{-5}$, greatly smoothing the HI.

Figure 30:
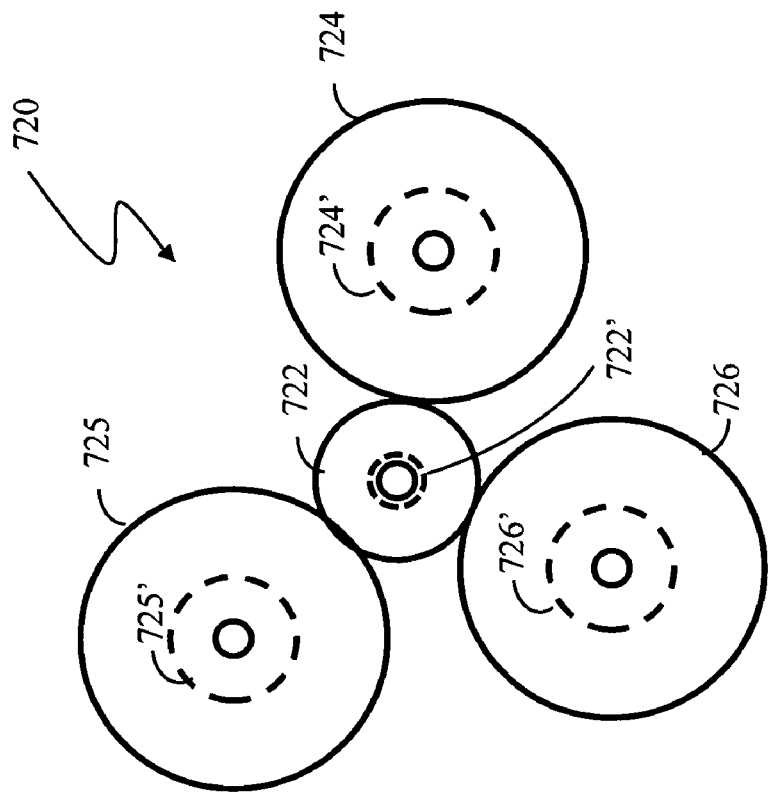
FIG. 30 illustrates a drive side of a split torque gearbox.

In some instances, a split torque gearbox (STG) may be used instead of a traditional planetary gearbox. In some cases, the STG saves weight, can be more reliable, have reduce transmission noise, and improved efficiency. However, in some cases there may be no condition based monitoring data on for STGs. Furthermore, gear diagnostics may use time synchronous averages to separates in frequency gears that are physically close, but the effect of a large number of synchronous components (gears or bearing) in close proximity may significantly reduce the fault signal (increase signal to noise) and therefore reduce the effectiveness of current gear analysis algorithms Referring to FIG. 30, an input side 720 of an STG is shown as including an input spur gear 722, having forty teeth, driving three, input spur idler gears 724-726, each having seventy-two teeth. The input spur gear 722 may be coupled to an input drive shaft 722' that is coupled to a rotating power source (not shown). Each of the input spur idler gears 724-726 may be coupled to a corresponding shaft 724'-726'.

Figure 31:
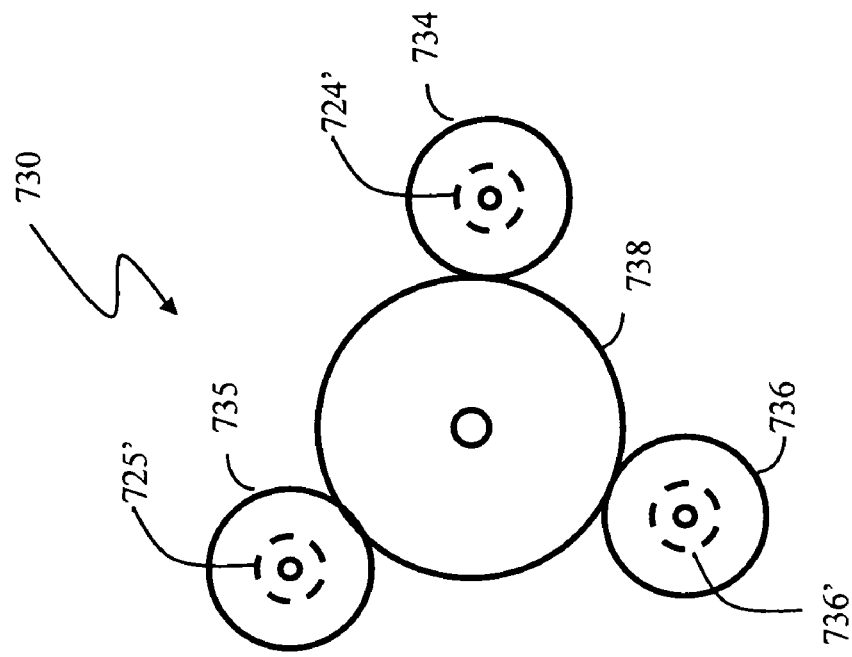
FIG. 31 illustrates a driven side of a split torque gearbox.

Referring to FIG. 31, an output side 720 of the STG is shown as including the shafts 724'-726' that drive three output spur idler gears 734-736, each of which has forth-eight teeth. The output spur idler gears 734-736 may drive a single output spur gear 738. An accelerometer (not shown) may be mounted to detect vibrations from the input drive shaft 722 while three more accelerometers (not shown) may each be mounted to detect vibrations from each of the shafts 724'-726'. Irrespective of the type of analysis used to detect faults, it is useful to first remove synchronous noise from the signals measured by the accelerometers to obtain the signal of interest. This is described in detail below.

The system can be modeled using the following equation:

$$x(n) = s(n) + y(n) + v(n)$$

where s(n) is the signal of interest, y(n) is the signal associated with gear mesh, shafts (e.g. synchronous noise), and v(n) is random noise. The signal x(n) is the measured data. In an embodiment herein, x(n) is measured 100,000 times each second.

The synchronous interfering signal, y(n), may be relatively large compared to the signal of interest, s(n). It is necessary to remove the interfering signal y(n) from x(n) while preserving the signal of interest s(n). However, in principle, y(n) cannot be measured directly. Thus, it is necessary to determine y(n) a different way. In an embodiment herein, it is possible to estimate y(n) using an optimal linear estimator since y(n) and x(n) (which is measured) are correlated, as described below.

It may be assumed that the random noise signal, v(n), is white noise and is not correlated with the signal of interest, s(n). It may also be assumed that s(n) is wideband and has a relatively short correlation length while y(n) has a relatively long correlation length.

The measured values may be represented as a vector x(n). In an embodiment herein, y(n) may be estimated from the vector x(n) as follows:

$$y(n) \approx a^t x(n-D)$$

where a is also a vector that acts as a filter (see discussion below) and D is a delay of one or two sample points. Of course, $a^t$ represents the transpose of the a vector. Using the equation above, then $$s(n) - v(n) = x(n) - a^t x(n-D)$$

Thus, it is possible to obtain the signal of interest, s(n) and the white noise v(n) by subtracting $a^t x(n-D)$ from the measured value, x(n). Once the influence of y(n) has been removed, it is possible to apply any of the other techniques discussed herein to the result. That is, the techniques discussed herein operate on s(n)+v(n) to calculate CIs, determine HIs, etc.

The a vector may be determined using the following formula:

$$a = -r \cdot R^{-1}$$

where r is an autocovariance vector and R is a covariance vector and $R^{-1}$ is the inverse of R.

The vector R can be determined by the following:

$$R = x(n-D) \cdot x^t(n-D)$$

where $x^t$ is the transpose of the x vector. Thus, the R vector (and thus the inverse of the R vector) can be determined directly from the measured data.

Similarly, the r vector can also be determined directly from the measured data as follows:

$$r = x(n-D) \cdot x(n)$$

Once R and r have been determined, it is a simple matter to determine a and then determine $a^t x(n-D)$.

The technique described above filters out periodic noise such as the meshing of gear teeth and/or the noise from bearings to that the result is a combination of random noise, v(n), and the signal of interest, which can then be processed according to any one of a the number of techniques described herein. In an embodiment herein, the signal of interest, s(n), is close to zero when no components are faulted so that the result of subtracting the estimate of y(n) (i.e., $a^r x(n-D)$) from x(n) is random noise. Accordingly, the presence of a strong signal much greater than the random noise, v(n), would tend to indicate the presence of a fault. For example, a chipped gear tooth could cause a strong periodic signal to be present that is not filtered out when the estimate of y(n) is subtracted from x(n).

Referring to FIG. 32, a flow chart 750 illustrates steps performed in connection with filtering y(n) from the measured values of x(n) and performing CI/HI calculations on the result thereof. Processing begins at a first step 752 where the data is obtained. Obtaining data is described elsewhere herein and includes, for example, obtaining digital values from accelerometer signals. In an embodiment herein, the system obtains 200,000 data points in two seconds, but obviously other data collection rates and durations are possible.

Following the step 752 is a step 754 where the autocovariance vector, r, is determined, as described in more detail elsewhere herein. Following the step 754 is a step 756 where the covariance vector, R, is determined, as described in more detail elsewhere herein. Note that both R and r can be determined in the same programming loop that iterates through x(n) from n equals from one to the number of data points minus D. Following the step 756 is a step 758 where the a vector is determined, as described elsewhere herein.

Following the step 758 is a step 762 where y(n) is estimated using the formula $a^r x(n-D)$, as described elsewhere herein. Following the step 762 is the step 764 where the estimated value for y(n) is subtracted from x(n), as described elsewhere herein. Following the step 764 is a step 766 where CIs and HIs are calculated using any appropriate technique, including any of the techniques discussed elsewhere herein, such as determining probability distribution functions for the condition indicator functions based on the measured values where, for example, the condition indicator functions are Rayleigh distribution functions, and then determining a probability distribution function for the health indicator function based on the probability distribution functions for the condition indicator functions. Following the step 766, processing is complete.

Figure 33:
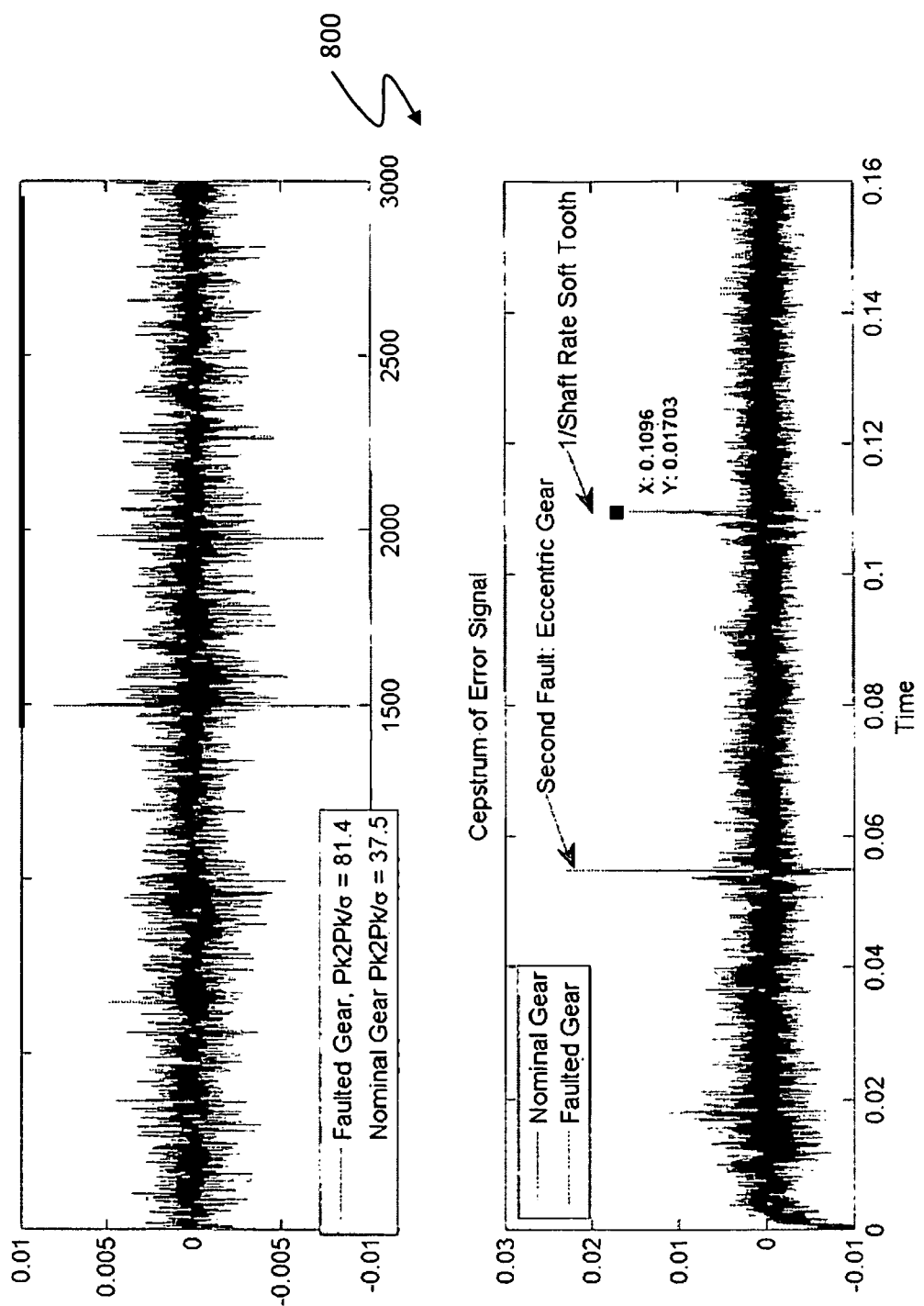
FIG. 33 illustrates an effect of processing to reveal a fault component according to an embodiment of the system described herein.

Referring to FIG. 33, a diagram 800 illustrates the effects of providing the processing described herein. The top graph of the diagram 800 shows measurements provided for two gearboxes: one having no faults and the other with an input pinion having a soft tooth and an eccentric gear. As illustrated by the top graph, the unprocessed vibration signals from both look very similar and it is difficult to distinguish between the signals from the two different gearboxes. The bottom graph of the diagram 800 shows the result of providing the processing described herein. As can be seen from the bottom graph, the result of providing the processing described herein is that the faulted gearbox exhibits significant signal components corresponding to the faults. The signal components that were lost in the synchronous noise are revealed when the synchronous noise is filtered out.

It is possible to extend setting thresholds for specific CI's to apply to any generalized probability distribution (e.g. non-Gaussian distribution) and any health indicator (HI) algorithm to allow setting a probability of false alarm (PFA) for a component taking into account the interaction of n number of condition indicators (CI's).

Figure 34:
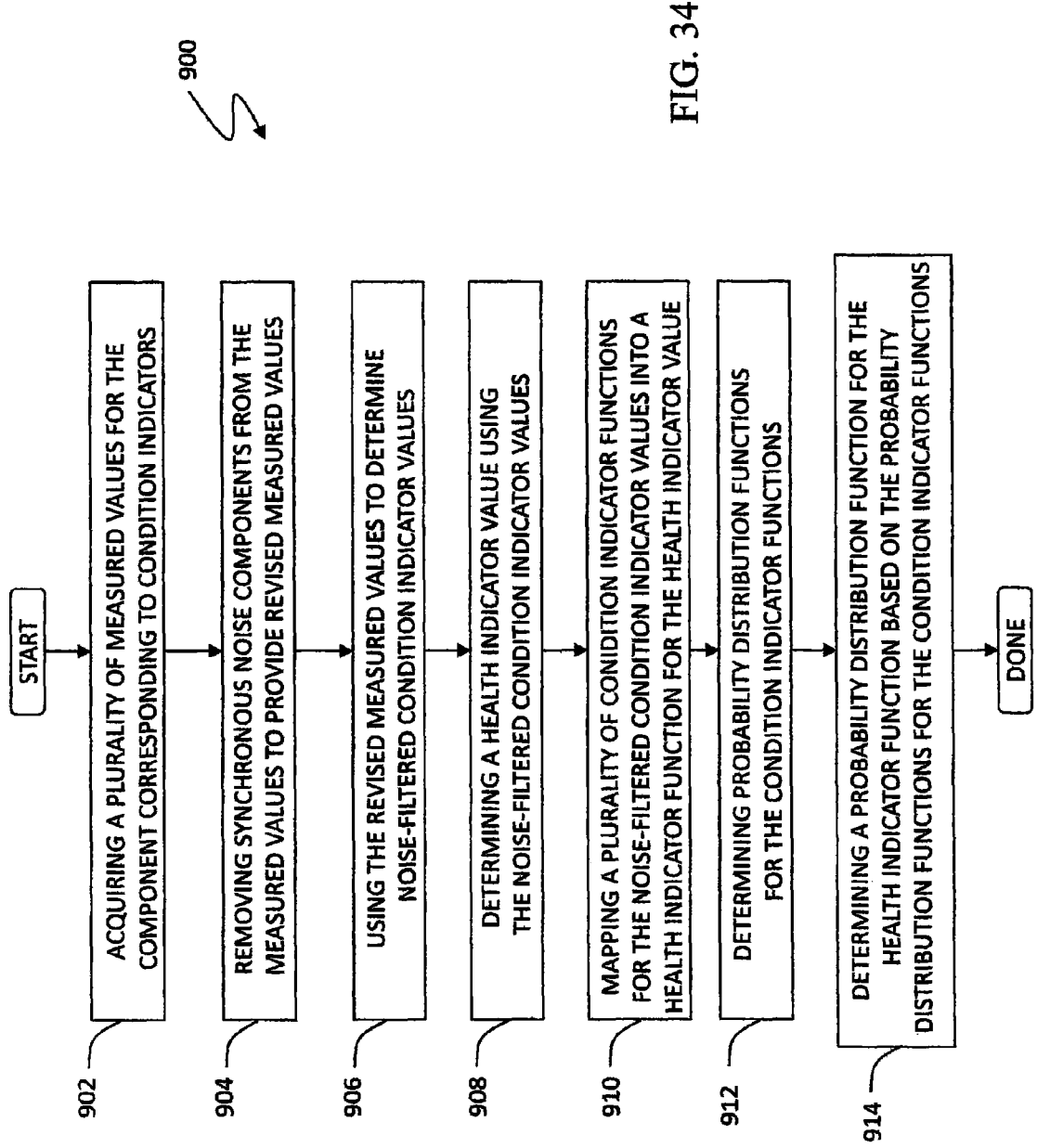
FIG. 34 is a flow chart of steps of an embodiment for a method for determining health of a component in which condition indicators are quantified in the presence of synchronous noise.

FIG. 34 is a flow chart 900 of steps of an embodiment for a method for determining health of a component in which condition indicators are quantified in the presence of synchronous noise. At a step 902, a plurality of measured values of the component are acquired corresponding to condition indicators. At a step 904, synchronous noise components are removed from the measured values to provide revised measured values. At a step 906, the revised measured values are used to determine noise-filtered condition indicator values. At a step 908, a health indicator value is determined using the noise-filtered condition indicator values. At a step 910, a plurality of condition indicator functions for the noise-filtered condition indicator values are mapped into a health indicator function for the health indicator value. At a step 912, probability distribution functions for the condition indicator functions are determined. At a step 914, a probability distribution function for the health indicator function is determined based on the probability distribution functions for the condition indicator functions.

Various embodiments discussed herein may be combined with each other in appropriate combinations in connection with the system described herein. Additionally, in some instances, the order of steps in the flow charts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of determining health of a component, comprising:
   using at least one processor to perform processes including:
   acquiring a plurality of measured values for the component corresponding to condition indicators;
   removing synchronous noise components from the measured values to provide revised measured values; and
   using the revised measured values to determine noise-filtered condition indicator values;
   determining a health indicator value using the noise-filtered condition indicator values;
   mapping a plurality of condition indicator functions for the noise-filtered condition indicator values into a health indicator function for the health indicator value;
   determining probability distribution functions for the condition indicator functions; and
   determining a probability distribution function for the health indicator function based on the probability distribution functions for the condition indicator functions.

2. The method, according to claim 1, wherein removing synchronous noise components includes determining a predicted value of the synchronous noise components using covariance and autocovariance of the measured values.

3. The method, according to claim 1, wherein removing synchronous noise components from the measured values to provide the revised measured values includes:
   determining an autocovariance vector r where r=x(n−D)·x(n) and where x represents the measured values and D represents a delay;
   determining a covariance vector R where R=x(n−D)·x(n−D) and where x represents the measured values and D represents a delay;
   determining a vector a where a=−r·R$^{-1}$ and where R$^{-1}$ is the inverse of R;
   estimating the synchronous noise components using a$^t$x(n−D), where a$^t$ represents the transpose of the a vector and D represents a delay; and
   removing the synchronous noise components by subtracting a$^t$x(n−D) from x(n) to provide a residual signal that captures impulse signals indicative of component fault.

4. The method, according to claim 3, wherein D is selected from the group consisting of one or two.

5. The method, according to claim 1, wherein the probability distribution function for the health indicator function is determined mathematically.

6. The method, according to claim 1, wherein the condition indicator functions are made independent by dividing each of the condition indicator functions by an inverse covariance thereof.

7. The method, according to claim 6, wherein the condition indicator functions are at least one of: Rayleigh distribution functions and Gaussian distribution functions.

8. The method, according to claim 1, wherein the component is one of: a split torque gearbox and a planetary based gearbox.

9. The method, according to claim 1, wherein the probability distribution function for the health indicator function has a Nakagami distribution.

10. The method, according to claim 1, wherein the condition indicator functions are correlated.

11. A non-transitory computer readable storage medium storing software that, when executed by at least one processor, determines health of a component, the software comprising:
   executable code that acquires a plurality of measured values for the component corresponding to condition indicators;
   executable code that removes synchronous noise components from the measured values to provide revised measured values; and
   executable code that uses the revised measured values to determine noise-filtered condition indicator values;
   executable code that determines a health indicator value using the noise-filtered condition indicator values;
   executable code that maps a plurality of condition indicator functions for the noise-filtered condition indicator values into a health indicator function for the health indicator value;
   executable code that determines probability distribution functions for the condition indicator functions; and
   executable code that determines a probability distribution function for the health indicator function based on the probability distribution functions for the condition indicator functions.

12. The non-transitory computer readable storage medium, according to claim 11, wherein the executable code that removes synchronous noise components includes executable code that determines a predicted value of the synchronous noise components using covariance and autocovariance of the measured values.

13. The non-transitory computer readable storage medium, according to claim 11, wherein the executable code that removes the synchronous noise components includes:
   executable code that determines an autocovariance vector r where r=x(n−D)·x(n) and where x represents the measured values and D represents a delay;
   executable code that determines a covariance vector R where R=x(n−D)·x(n−D) and where x represents the measured values and D represents a delay;
   executable code that determines a vector a where a=−r·R$^{-1}$ and where R$^{-1}$ is the inverse of R;
   executable code that estimates the synchronous noise components using a$^t$x(n−D), where a$^t$ represents the transpose of the a vector and D represents a delay; and
   executable code that removes the synchronous noise components by subtracting a$^t$x(n−D) from x(n) to provide a residual signal that captures impulse signals indicative of component fault.

14. The non-transitory computer readable storage medium, according to claim 13, wherein D is selected from the group consisting of one or two.

15. The non-transitory computer readable storage medium, according to claim 11, wherein the probability distribution function for the health indicator function is determined mathematically.

16. The non-transitory computer readable storage medium, according to claim 11, wherein the condition indicator functions are made independent by dividing each of the condition indicator functions by an inverse covariance thereof.

17. The non-transitory computer readable storage medium, according to claim 16, wherein the condition indicator functions are at least one of: Rayleigh distribution functions and Gaussian distribution functions.

18. The non-transitory computer readable storage medium, according to claim 11, wherein the component is one of: a split torque gearbox and a planetary based gearbox.

19. The non-transitory computer readable storage medium, according to claim 11, wherein the probability distribution function for the health indicator function has a Nakagami distribution.

20. The non-transitory computer readable storage medium, according to claim 11, wherein the condition indicator functions are correlated.

* * * * *